(12) United States Patent
Iwamoto et al.

(10) Patent No.: US 10,670,277 B2
(45) Date of Patent: Jun. 2, 2020

(54) OVEN

(71) Applicant: Samsung Electronics Co., Ltd., Suwon-si, Gyeonggi-do (KR)

(72) Inventors: Kiyoshi Iwamoto, Yokohama (JP); Yasushi Urai, Yokohama (JP); Shigeki Hayashi, Yokohama (JP); Seiji Sato, Yokohama (JP); Toshihiro Doi, Yokohama (JP); Kazutoshi Takenoshita, Yokohama (JP); Yurika Kida, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 16/077,428

(22) PCT Filed: Feb. 10, 2017

(86) PCT No.: PCT/KR2017/001500
§ 371 (c)(1),
(2) Date: Aug. 10, 2018

(87) PCT Pub. No.: WO2017/138781
PCT Pub. Date: Aug. 17, 2017

(65) Prior Publication Data
US 2019/0049119 A1    Feb. 14, 2019

(30) Foreign Application Priority Data

Feb. 12, 2016    (JP) .................................. 2016-024939
Feb. 17, 2016    (JP) .................................. 2016-027667
(Continued)

(51) Int. Cl.
*F24C 15/00*      (2006.01)
*F24C 14/00*      (2006.01)
(Continued)

(52) U.S. Cl.
CPC .............. *F24C 15/005* (2013.01); *C09D 1/00* (2013.01); *C09D 5/16* (2013.01); *F24C 14/00* (2013.01)

(58) Field of Classification Search
CPC .......... F24C 15/005; F24C 14/00; C09D 5/16; C09D 1/00
See application file for complete search history.

(56) References Cited

U.S. PATENT DOCUMENTS 6,225,604 B1 *    5/2001    Whipple, Jr. ........... F24C 14/02
                                                                126/21 A
6,410,890 B1 *    6/2002    Kohlstrung ........... F24C 14/005
                                                                126/20
(Continued)

FOREIGN PATENT DOCUMENTS

GB         1197067 A      7/1970
JP         S62-186133 A      8/1987
(Continued)

OTHER PUBLICATIONS

Supplementary European Search Report dated Dec. 17, 2018 in connection with European Patent Application No. 17 75 0473, 11 pages.
(Continued)

*Primary Examiner* — David J Laux

(57) ABSTRACT

Provided is an oven having an improved structure for keeping a cooking chamber clean. The oven includes a main body, a cooking chamber provided inside the main body, a main heater disposed inside the cooking chamber, a fan disposed inside the cooking chamber to circulate air heated by the main heater, a coating film formed on at least a part of a cooking chamber inner wall and having a liquid repellency, and a contaminant collecting portion having a liquid repellency smaller than that of the coating film and
(Continued)

provided on the cooking chamber inner wall with which air circulated by the fan collides.

19 Claims, 55 Drawing Sheets

(30) Foreign Application Priority Data

| Feb. 17, 2016 | (JP) | ................................. 2016-027669 |
| Apr. 28, 2016 | (JP) | ................................. 2016-091953 |
| Jan. 24, 2017 | (JP) | ................................. 2017-010770 |

(51) Int. Cl.
  *C09D 1/00* (2006.01)
  *C09D 5/16* (2006.01)

(56) References Cited

U.S. PATENT DOCUMENTS

| 8,173,942 | B2* | 5/2012 | Wiseman | ............. H05B 6/6405 |
| | | | | 126/198 |
| 8,193,470 | B1* | 6/2012 | Harlamert | ............. F24C 14/005 |
| | | | | 126/20 |
| 2003/0213792 | A1* | 11/2003 | Bellassai | ................. A21B 3/04 |
| | | | | 219/401 |
| 2008/0223357 | A1* | 9/2008 | Bartelick | .................. B08B 9/00 |
| | | | | 126/21 A |
| 2009/0078291 | A1* | 3/2009 | Kang | .................... F24C 14/005 |
| | | | | 134/22.1 |
| 2009/0266243 | A1* | 10/2009 | Lee | .......................... F24C 7/08 |
| | | | | 99/357 |
| 2013/0178568 | A1* | 7/2013 | Meuler | ................ C09D 5/1625 |
| | | | | 524/269 |
| 2013/0280542 | A1* | 10/2013 | Herbolsheimer | ..... C23C 16/029 |
| | | | | 428/448 |

FOREIGN PATENT DOCUMENTS

| JP | 2004-190902 A | 7/2004 |
| JP | 2010-063526 A | 3/2010 |
| JP | 2015-175545 A | 10/2015 |
| KR | 10-2007-0091635 A | 9/2007 |
| KR | 10-2010-0087625 A | 8/2010 |
| WO | 2008/044844 A2 | 4/2008 |
| WO | 2012/084733 A1 | 6/2012 |
| WO | 2013/119561 A1 | 8/2013 |

OTHER PUBLICATIONS

ISA/KR, "International Search Report and Written Opinion of the International Searching Authority," International Application No. PCT/KR2017/001500, dated May 17, 2017, 18 pages.

* cited by examiner

|  | SAMPLE 1 | SAMPLE 2 | NO COATING FILM |
|---|---|---|---|
| 4 CHICKENS | LEVEL 0.0  | LEVEL 0.2  | LEVEL 1.2  |
| 20 CHICKENS | LEVEL 1.1  | LEVEL 1.2  | LEVEL 3.2  |
| 40 CHICKENS | LEVEL 2.7  | LEVEL 3.2  | LEVEL 4.8  |

COATING IMPLEMENTATION STATUS

CONTAMINATION COMPARISON RESULT
ACCORDING TO THE PRESENCE OF COATING

BEFORE ADDING VIBRATION

AFTER ADDING VIBRATION

BEFORE ADDING VIBRATION

AFTER ADDING VIBRATION

BEFORE CLEANING

AFTER CLEANING

BEFORE CLEANING

AFTER CLEANING 43  44  61  44

100

44    44j    44

61  44

44,61

OVEN

CROSS-REFERENCE TO RELATED APPLICATIONS AND CLAIM OF PRIORITY

This application is a 371 National Stage of International Application No. PCT/KR2017/001500 filed Feb. 10, 2017, which claims priority to Japanese Patent Application No. 2016-024939 filed Feb. 12, 2016, Japanese Patent Application No. 2016-027667 filed Feb. 17, 2016, Japanese Patent Application No. 2016-027669 filed Feb. 17, 2016, Japanese Patent Application No. 2016-091953 filed Apr. 28, 2016, and Japanese Patent Application No. 2017-010770 filed Jan. 24, 2017, the disclosures of which are herein incorporated by reference in their entirety.

BACKGROUND

1. Field

The present disclosure relates to an oven, more particularly, to an oven having an improved structure for keeping a cooking chamber clean.

2. Description of Related Art

In the conventional electric oven, when a surface of an inner wall of the oven is contaminated by oil or the like discharged from a food to be cooked, a user has cleaned the oven on his/her own by using a detergent and a brush, or an inside of the oven has been heated to a high temperature and an oil stain or the like has been cleaned by a cleaning method called Pyro Cleaning by pyrolysis.

The Pyro Cleaning is a method of cleaning the inside of the oven in a high temperature environment of 420° C. or higher. Although the Pyro Cleaning takes 2 to 4 hours, it is a convenient method. Therefore, it is used especially by customers in Europe and America.

However, it is necessary to perform the Pyro cleaning one to three times a year though it depends on a use situation and a contamination state. In particular, the time and effort required for performing the Pyro cleaning were concentrated at the time when a home party increases, such as Thanksgiving Day and Christmas. In this case, a failure of the oven is increased, which resulted in consumer complaints.

For example, it is conceivable to apply Teflon (registered trademark) to the inner wall of the oven to have a liquid repellency in the same manner as other cooking utensils, in order to make it easier to remove contaminants sticking to the surface of the inner wall of the oven.

However, since Teflon is weak in the high temperature and generates harmful gas at the high temperature, it is difficult to use Teflon at temperatures over 250° C., such as the inner wall of the oven. Even if a material having another liquid-repellent component is used, the liquid repellency is lost when exposed to a temperature environment of 420° C., such as the Pyro cleaning, and an effect of preventing contamination cannot be expected. Therefore, conventionally, when a coating film having the liquid repellency is applied to the inner wall of the oven, a Pyro cleaning function was not provided. (See Patent Document 1)

On the other hand, recently, a liquid-repellent material having higher heat resistance than Teflon has been reported, and a feasibility of the cooking utensils capable of reducing the cleaning effort without using Teflon is increasing. A liquid repellent coating that does not use Teflon is actually put into practical use in pots and frying pans.

However, in order to apply a liquid repellent coating to the inner wall of the oven, the liquid repellency must be maintained at the temperature of the actual cooking. It can be seen that a portion close to a heater reaches 350° C. in a cooking mode. Therefore, a required surface having the liquid repellency should be such that cracks do not occur in a film due to repetition of a heat load of 350° C., and a predetermined liquid repellency represented as a water contact angle can be maintained for a long period.

However, conventionally, it has not been known how to form the coating film having the liquid repellency on the inner wall of the oven so that the cracks do not occur in the repetition of the heat load.

Further, a method of forming the coating film having the above-described characteristics on the inner wall of the oven has not been specifically known. In particular, it is difficult to form the coating film having a large film thickness to ensure durability against the heat load.

Further, even if the coating film having no problem in use can be formed on the inner wall of the oven with the above-described liquid repellent material, oil droplets or water droplets, which have a small volume and are from the food to be cooked, can be continuously adhered to the inner wall of the oven without falling by their own weight.

Particularly, the oil droplets from meat, etc. are discolored and thickened when heating by cooking is repeated. Finally, the oil droplets become a black, hard and small lump and then stick to the inner wall of the oven. That is, a small spotty contaminant could remain even though the inner wall of the oven has the coating film.

Further, Patent Document 2 discloses that the inner wall of the oven is vibrated to drop the adhered contaminants. However, this is intended for the adhered contaminants having a relatively large volume. Patent Document 2 does not disclose removing the oil droplets or water droplets of the small volume continuously adhered even when the coating film is provided.

It is also desired that the user can easily clean the inner wall of the oven without deteriorating the liquid repellency of the coating film by a simple and easy cleaning method even if the user neglects proper management and the severe contaminants stick to the inner wall of the oven.

In addition, when the coating film having the liquid repellency is formed on the inner wall of the oven, resistance to the contaminants is improved, but even if the liquid repellency is increased, a small oil stain originating from a very small oil droplet can be adhered. If the contaminants are denatured by the heat applied repeatedly during the cooking process and turned black, the contaminants become noticeable. Therefore, there is also a demand for a method that makes it difficult for the small oil stain to stick to the coating film or to easily clean the small oil stain.

[Patent Document 1] United States Patent Application Publication. 2013-192582

[Patent Document 2] Japanese Patent Application Publication. 2005-230162

SUMMARY

The present disclosure is directed to providing an oven having a coating film having durability against repetitive heat load while having a liquid-repellent property capable of preventing contaminants such as oil or the like.

Further, the present disclosure is directed to providing a method for forming a coating film for an oven having durability against repetitive heat load while having a liquid-repellent property capable of preventing contaminants such as oil or the like.

Further, the present disclosure is directed to providing an oven capable of preventing contaminants from sticking to an inner wall of the oven by dropping oil droplets or water droplets having a small volume from the inner wall of the oven.

Further, the present disclosure is directed to providing an oven capable of dropping contaminants adhered to an inner wall of the oven by a simple method without damaging a liquid repellency of a coating film formed on the inner wall of the oven.

Further, the present disclosure is directed to providing an oven capable of reducing contaminants generated by deposition of a very small oil droplet adhering to a coating film, further suppressing generation of the contaminants in a portion where the coating film is formed, for a long period, and dropping the contaminants in a simple operation.

One aspect of the present disclosure provides an oven including a cooking chamber inner wall forming a cooking chamber in which food to be cooked is received, and a coating film having a predetermined thickness and formed on the cooking chamber inner wall. The coating film may have a liquid repellency.

With these configurations, it is possible to prevent the contaminants such as oil or the like, which are generated from the food to be cooked, from adhering to the cooking chamber inner wall. Therefore, a user can easily remove the contaminants adhered to the cooking chamber inner wall without rubbing with a brush or the like, thereby reducing an effort required for cleaning. In addition, since the contaminants are easily dropped by the coating film, the contaminants can be sufficiently removed without performing Pyro cleaning in which a temperature reaches at 420° C. as in the conventional art. Therefore, since it is not necessary to repeat the Pyro cleaning, a load of a heater or the like can be reduced, and a frequency of failure of the oven can be reduced.

In addition, the coating film may have a surface property in which a water contact angle is 100° or more in order to make it difficult for the contaminants by oil or moisture generated from the food to be cooked to stick to the cooking chamber inner wall. Inventors of the present disclosure have found that when a thickness of the coating film is 0.2 μm or more and 3 μm or less, even if the food to be cooked is repeatedly cooked and the heat load of 350° C. is repeated on the coating film, the liquid repellency is hardly deteriorated and cracks are hardly generated on the coating film.

As described above, the oven according to the present disclosure makes it easy to drop the contaminants by using the coating film, and has durability against the heat load.

In order to enhance the durability against repetitive heat load while exhibiting the liquid repellency of the coating film, it is preferable that the thickness of the coating film is 0.2 μm or more and 2 μm or less.

In order to further enhance the durability of the coating film against repetitive heat load, it is more preferable that the thickness of the coating film is 0.5 μm or more and 1.5 μm or less.

For example, it is possible to form the coating film which hardly has thermal degeneration even in a high-temperature environment in which the temperature in the oven reaches 350° C., maintains the liquid repellency, and has high durability against the heat load so that cracks or the like are hardly generated. At this time, the coating film may be formed of a material obtained by adding a silicon-based or alkyl-based liquid-repellent material to a material having silsesquioxane skeleton.

In order to exhibit a preferable contamination prevention function against the contaminants containing oil as a main component, the coating film may have surface characteristics in which an oil contact angle, when the oil is in contact with a surface of the coating film, is 40° or more.

In order to allow the coating film to be easily applied to the cooking chamber inner wall while sufficiently exhibiting the liquid repellency of the coating film, the coating film may be such that a solid component of a material is combined at a ratio of 5% or more and 28% or less with respect to a total weight including a solvent.

In order to reduce the number of steps for forming the coating film on the cooking chamber inner wall and to reduce a manufacturing cost for forming the coating film, the coating film may be formed as one layer.

In order to make a thickness of the coating film thick within a range described above and to make it easy to manufacture, the coating film may be formed as two layers.

In a case in which the thickness of the coating film is formed to be thicker than a predetermined value, in order to prevent the cracks or the like from being generated on the coating film by releasing internal stress generated during curing, the coating film may be heated to a first temperature in a state in which the coating film is applied to the surface of the cooking chamber inner wall, and then heated to a second temperature higher than the first temperature and cured.

In order to easily increase the thickness of the coating film, the coating film may be formed by applying the second layer of the coating film on the first layer and curing the coating film before the first layer of the coating film is completely cured. In this case, the second layer can be further applied before the first layer exhibits the liquid repellency, and the thickness of the coating film can be increased.

A specific aspect of applying the coating film is that the cooking chamber inner wall may be coated with enamel on a steel plate, and the coating film may be applied to a surface of the enamel.

Another aspect of applying the coating film is that the cooking chamber inner wall may be formed of the steel plate, and the coating film may be applied on a surface of the steel plate.

In order to make it difficult for the contaminants such as oil to stick to a component, such as a window, for checking a state of the food to be cooked in the oven, the coating film may be applied to an inner surface of the window installed at a door provided to put in or put out the food to be cooked into the cooking chamber.

Another aspect of the present disclosure provides, a method of forming the coating film corresponding to a method of forming the coating film on the cooking chamber inner wall forming the cooking chamber in which the food to be cooked is received, the method including applying a solution in which a coating material is dissolved by a solvent, to the cooking chamber inner wall by a spray coating. The coating material may be obtained by adding the silicon-based or alkyl-based liquid-repellent material to the material having silsesquioxane skeleton.

It is possible to thicken the coating film having a surface property with the water contact angle of 100° or more to have a thickness of 0.2 μm or more and 3 μm or less, for example, and to form the coating film having a smooth surface without the cracks or the like. Therefore, even if the heat load reaching to 350° C. is repeated, the coating film can maintain its reliability over a long period of time without losing its liquid repellency.

In order to form the coating film having a thickness in a range of 0.2 μm or more and 3 μm or less, more preferably 0.2 μm or more and 2 μm or less, and much more preferably 0.5 μm or more and 1.5 μm or less by increasing the thickness of the coating film, the coating material may be combined in an amount of 5% or more and 20% or less with respect to the total weight of the solution. Further, when the coating film can be formed to have the above described film thickness, the durability against the heat load can be greatly improved.

In order to form the coating film having the smooth surface without the cracks or the like in the above described film thickness, the solution may be sprayed while moving a spray target when the solution is sprayed by a spray gun, and the solution may be applied to the cooking chamber inner wall so that the spray target passes through the cooking chamber inner wall twice or three times.

In order to smoothly form the surface of the coating film, the solution may be applied on a surface of an enamel, glass, or steel plate.

The solvent capable of satisfactorily forming the coating film may include one of hexane, heptane, octane, butyl acetate, PEGMEA and ethyl acetate.

Another aspect of the present disclosure provides an oven may including a coating film having a liquid repellency and formed on a cooking chamber inner wall forming a cooking chamber in which a food to be cooked is received, a vibrator vibrating the cooking chamber inner wall in at least a vertical direction, and a controller controlling the vibrator to vibrate at a predetermined amplitude range and a predetermined frequency range. The predetermined frequency range may be set to include a resonance frequency of a droplet determined according to a size of the droplet adhering to the cooking chamber inner wall.

The cooking chamber inner wall may be vibrated in the vertical direction by the resonance frequency of a droplet so that even if there is a small droplet that does not fall due to its own weight from the cooking chamber inner wall even with the coating film, it may be possible to drop the small droplet by largely moving the droplet in the vertical direction.

Therefore, since the small droplet continuously adhered only by using the above described coating film can be reduced, it may be possible to prevent the oil droplet contained in the droplet from being altered by heating to turn into a black spot shaped adhering contaminant.

The predetermined frequency range may be set to be 20 Hz or more and 220 Hz or less in order to effectively cause resonance and drop the small droplet which does not fall due to its own weight from the cooking chamber inner wall even with the coating film.

In order to effectively remove the droplet adhering to the cooking chamber inner wall while reducing a sound generated by the vibrator, the predetermined amplitude range may be set to 10 μm or more and 100 μm or less.

A heater may further included to heat the inside of the cooking chamber in order to enhance a dropout action of the droplet by facilitating transmission of a vibration through the cooking chamber inner wall by increasing a viscosity of the droplet having a small volume. At this time, the controller may be configured to control the heater to maintain the cooking chamber inner wall or the cooking chamber at a temperature of 60° C. or more and 350° C. or less, and to control the vibrator to vibrate the cooking chamber inner wall.

In order to generate a resonance with respect to the droplet so that the vibration is moved from the cooking chamber inner wall to a bottom of the cooking chamber, the controller may be configured to control the vibrator so that the vibrator continues to vibrate the cooking chamber inner wall for 10 seconds or more to 60 seconds or less.

In order that when there is a size distribution of the small droplets adhering to the cooking chamber inner wall, each droplet is resonated and dropped out, the controller may be configured to sweep the frequency within the predetermined frequency range by changing the frequency of the vibration of the vibrator at 10 Hz or less every second.

The droplets adhering to the cooking chamber inner wall may be deteriorated by repeated heating. In order to prevent the droplets from being the contaminants by falling off from the oven wall before the droplets become adhered to the oven wall, the controller may be configured to perform a cooking mode in which the food to be cooked in the cooking chamber is heated by the heater, and a cleaning mode in which the cooking chamber inner wall is vibrated by the vibrator after the cooking mode is ended.

Another aspect of the present disclosure provides an oven including a coating film having a liquid repellency formed on a cooking chamber inner wall that forms a cooking chamber in which a food to be cooked is accommodated, a heater heating the inside of the cooking chamber, a fan generating an air flow in the cooking chamber, and a controller controlling the heater and the fan. The controller may be configured to drive the heater and the fan at the same time to maintain a temperature of the cooking chamber inner wall at 350° C. or more and 400° C. or less for at least a predetermined holding time in a cleaning mode for dropping contaminants adhered to the cooking chamber inner wall.

Even if the contaminants adhere to the coating film for some reason, the contaminants can be dropped by heat. Further, since the temperature of the cooking chamber inner wall is maintained at 350° C. or more and 400° C. or less, the temperature of the cooking chamber inner wall may be lower than that of the conventional Pyro cleaning, and the liquid repellency of the coating film can be prevented from being lost due to high temperature. In addition, since the user does not need to rub the cooking chamber inner wall with a brush or the like, the time and effort required for cleaning can be reduced.

The predetermined holding time may be set to one hour or more in order to sufficiently drop the contaminants even if a severe contaminant adheres to the cooking chamber inner wall.

In order to effectively fall off the contaminants adhered to the cooking chamber inner wall and to prevent a part of the coating film from losing the liquid repellency, the controller may be configured to control the heater and the fan so that a deviation of the temperature distribution in a standing face in the cooking chamber wall is within 15° C.

In order to reduce the temperature distribution on the cooking chamber inner wall and to make the temperature distribution as uniform as possible, the heater may include an upper heater heating an upper portion of the cooking chamber, a lower heater heating a lower portion of the cooking chamber and a rear heater heating a rear portion of the cooking chamber. The fan may be provided on a rear face in the cooking chamber.

As a specific control mode in which the temperature of the cooking chamber inner wall is the same at each position and the contaminants on the cooking chamber inner wall drop while an affection on the coating film hardly occurs, the controller may drive the fan so that an operating rate of the fan within the predetermined holding time is 50% or more, and an operating rate of the rear heater within the predetermined holding time is 30% or more and 80% or less. Further, the controller may drive an operating rate of the upper heater and the lower heater is 40% or less.

In order to uniformly maintain the temperature of the cooking chamber inner wall at the high temperature described above while reducing the amount of electric power required at one time in the heater, the controller may be configured to alternately drive the upper heater and the lower heater.

In order to prevent the temperature deviation from being generated in the upper portion and the lower portion of the cooking chamber inner wall, the controller may drive the upper heater and the lower heater such that an ON time per one time of the upper heater and the lower heater is 10 seconds or more and 40 seconds or less.

In order to improve a cleaning effect by sufficiently mixing the air in the cooking chamber and making the temperature of the cooking chamber inner wall uniform, the air flow formed by the fan may be 1 m/s or faster at a position 1 cm away from the standing face of the cooking chamber inner wall.

Another aspect of the present disclosure provides an oven including a cooking chamber inner wall forming a cooking chamber in which the food to be cooked is received, a main heater disposed inside the cooking chamber, a fan disposed in a position different from the main heater in the cooking chamber and provided to form hot air circulation in the cooking chamber, and a coating film formed on the cooking chamber inner wall so as to have a predetermined thickness and having a liquid repellency. A portion of an inner wall of the oven where a circulation of the hot air formed by the fan collides may form a contaminant collecting portion by a surface having a smaller liquid repellency than the coating film.

Oil droplets that are repelled from the coating film formed on the cooking chamber inner wall or small oil droplets contained in a circulating air may be collected in the contaminant collecting unit, so that it is possible to prevent the small oil droplets from being deposited on the coating film and being black discolored as a small contaminant. Therefore, a cleanliness of a portion where the coating film is formed can be easily maintained over a long period of time.

In order to maintain a collecting effect of the oil droplets by simply cleaning the contaminant collecting portion where the oil droplets causing the contaminant are concentrated in the cooking chamber of the oven, and to easily maintain a cleanliness of other portions, the contaminant collecting portion may be formed at a detachable member in the cooking chamber.

In order to facilitate a cleaning of oil stain collected in the contaminant collecting portion, the contaminant collecting portion may be formed on an inner wall surface of a door for inserting or removing the food to be cooked in the cooking chamber. Further, the contaminant collecting portion may be formed on a window of the door for inserting or removing the food to be cooked in the cooking chamber. Since the window of the door is forward of the oven, it is easy for a user to clean.

A surface energy of the coating film may be 20 mJ/m$^2$ or less in order to make it difficult for the oil droplets to adhere to the coating film and to easily collect the oil droplets in the contaminant collecting portion.

A surface energy of the contaminant collecting portion may be 25 mJ/m$^2$ or more in order that the small oil droplets are sufficiently collected in the contaminant collecting portion and it is difficult for a small dot-shaped contaminant to be generated on the coating film.

A difference between the surface energy of the coating film and the surface energy of the contaminant collecting portion may be at least 5 mJ/m$^2$ in order to prevent the entire small dot-shaped contaminant in the cooking chamber for a long period of time.

For example, the contaminant collecting portion may be disposed at the fan. Therefore, it is possible to collect the small oil droplets in the contaminant collecting portion before the small oil droplets reach the coating film, and a cleanliness in the cooking chamber can be maintained as a whole. In addition, in order to simply perform a cleaning and a maintenance of the contaminant collecting portion, the contaminant collecting portion may be formed of a metal plate and may be configured to be detachable from the cooking chamber inner wall.

The metal plate may be formed of any one of SUS 430, a steel plate subjected to plating treatment and a steel plate subjected to enamel treatment so that a collecting effect can be expected as the contaminant collecting portion and the metal plate can be detachable by a magnet.

In order to delay a progress of contamination to the contaminant collecting portion itself to an unacceptable level and facilitate the maintenance thereof, the metal plate may be set up in the cooking chamber so that the collected liquid contaminant flows downward by its own weight and is collected in a waste liquid receiver detachably installed in the cooking chamber.

The contaminant collecting portion may include a catalyst coating layer so that the contaminants are decomposed in the contaminant collecting portion itself and the contaminants on the cooking chamber inner wall can be maintained in an inconspicuous state for a long period of time. The catalyst coating layer may include, as a catalyst, a compound including at least one of Ag, Pt, Pd, Au, Cu, Ru, Ti and Ni. Further, the catalyst coating layer may include, as a cocatalyst or as a catalyst carrier, a compound including at least one of $MnO_2$, $CeO_2$, $Al_2O_3$, $Bi_2O_3$, SnO, $TiO_2$, $Cr_2O_3$, $Co_2O_3$, $Fe_2O_3$, CuO, $ZrO_2$, SrO, LaO, $V_2O_5$, $Li_2O$, ZnO, MgO, NiO, CuO and BaO.

An undercoat layer may be formed between the catalyst coating layer and the metal plate as a base material to form the catalyst coating layer so as to maintain a function of decomposing contaminants of the catalyst coating layer over a long period of time in a high temperature environment in the cooking chamber. The undercoat layer may include $SiO_2$ film having a predetermined thickness of nm-order made of one of a low molecular weight Silane coating material including Silane agent, Vinyl-Siloxane, Ethoxy-Alumina phosphate and Alkyl-Aryl Siloxane, and a Polysilazane-based coating solution including PerHydro-Polysilazane (PHPS) or Organo-Polysilazane (OPSZ) as a main component.

In order to efficiently decompose the contaminants on the catalyst coating layer, a controller may be further included to control a heater including a main heater and the fan. The controller may control a temperature of the catalyst coating layer to be in a temperature range of 250° C. or more and 400° C. or less to decompose the contaminants deposited on the catalyst coating layer.

The heater may further include a catalyst coating layer heating heater heating the catalyst coating layer so that the decomposition function of the contaminants on the catalyst coating layer can be sufficiently exhibited while the food to be cooked is properly cooked. At this time, the controller may control the catalyst coating layer heating heater and the fan to be ON/OFF controlled so that the catalyst coating layer is heated up to the temperature range.

The controller may control the fan so that an ON duty of the fan is 16% or more and 20% or less in order to allow the catalyst coating layer to maintain a temperature at which the catalyst coating layer can exhibit decomposition ability and allow the small oil droplets to flow into the cooking chamber with high decomposition efficiency.

As a specific configuration suitable for heating the catalyst coating layer, a distance between the catalyst coating layer and the catalyst coating layer heating heater may be set to 1 mm or less.

In order to prevent the small oil droplets from being deposited on the cooking chamber inner wall during cooking, to prevent the small dot-shaped contaminants burned due to the high temperature in the cooking chamber from being generated, and to sufficiently exhibit an action of the catalyst coating layer during cooking, an operation of the catalyst coating layer heating heater may be performed during normal cooking.

By an air flow formed by the fan, the contaminant collecting portion may be a vane which is convex with respect to an outer circumferential direction of the fan and which stands on the cooking chamber inner wall provided around the fan. At this time, the air flow discharged from the fan may be gradually deflected along the vane from the centrifugal direction to the tangential direction.

In order to effectively collect the oil droplets on the vane by hot air circulation in the cooking chamber formed by the fan and to suppress a generation of the contaminants, the vane may be arranged in a radial shape around the fan.

As a specific arrangement of the vane, the vane may be formed along a spiral curve centering on the fan.

When at least some of the plurality of vanes is different in length in the flow direction, it may be possible to make an arrangement suitable for collecting the small oil droplets in accordance with the air flow formed by the fan.

In order to increase an effect of collecting oil droplets by making it easier for the air flow passing near the vane to collide with the vane, a vortex generator having a convex shape in a flow direction of a circulation wind may be formed on a rear plate that forms the cooking chamber inner wall where the vane is installed.

Another specific example of the contaminant collecting portion may be a filter formed of a porous material or a fiber material installed in a flow path of a hot air circulation by the fan.

Another aspect of the present disclosure provides an oven including a main body, a cooking chamber provided inside the main body, a main heater disposed inside the cooking chamber, a fan disposed inside the cooking chamber to circulate air heated by the main heater, a coating film formed on at least a part of the cooking chamber inner wall and having a liquid repellency, and a contaminant collecting portion having a liquid repellency smaller than that of the coating film and provided on the cooking chamber inner wall where air circulated by the fan collides.

A surface energy of the coating film may be 20 mJ/m$^2$ or less, and a surface energy of the contaminant collecting portion may be 25 mJ/m$^2$ or more.

The contaminant collecting portion may include a body detachably installed on the cooking chamber inner wall and a waste liquid receiver provided to collect contaminants separated from the body by their own weight.

The contaminant collecting portion may include a plurality of vanes installed along an outer circumferential direction of the fan so as to gradually deflect an air flow discharged from the fan toward a tangential direction of the fan from a centrifugal direction of the fan.

A plurality of protrusions may be formed between the plurality of vanes.

The contaminant collecting portion may include a filter disposed on at least one of an inlet and an outlet of the fan, and the filter may be formed of at least one of a porous material and a fiber material.

The contaminant collecting portion may be detachably provided on the cooking chamber inner wall.

The contaminant collecting portion may be separable by a magnetic force.

The contaminant collecting portion may include a catalyst coating layer. The catalyst coating layer may include a catalyst including at least one of Ag, Pt, Pd, Au, Cu, Ru, Ti and Ni, and a cocatalyst including at least one of $MnO_2$, $CeO_2$, $Al_2O_3$, $Bi_2O_3$, SnO, $TiO_2$, $Cr_2O_3$, $Co_2O_3$, $Fe_2O_3$, CuO, $ZrO_2$, SrO, LaO, $V_2O_5$, $Li_2O$, ZnO, MgO, NiO, CuO and BaO.

The oven may further include a catalyst coating layer heating heater installed in the cooking chamber to heat the catalyst coating layer. A distance between the catalyst coating layer and the catalyst coating layer heating heater may be 1 mm or less.

The coating film may include a base including silsesquioxane and a coating material including at least one of a silicon-based liquid repellent agent and an alkyl-based liquid repellent agent.

The coating film may have a water contact angle of 100° or more and a thickness of 0.2 μm or more and 3 μm or less.

The coating film may have an oil contact angle of 40° or more and a thickness of 0.2 μm or more and 3 μm or less.

The coating film may include at least one layer.

The at least one layer may include a first layer applied to at least a portion of the cooking chamber inner wall and a second layer applied on the first layer before the first layer is cured.

Another aspect of the present disclosure provides an oven including a body, a cooking chamber provided inside the body, and a coating film formed on at least a part of a cooking chamber inner wall and having a liquid repellency and a heat resistance. The coating film may include a base including silsesquioxane and a coating material including at least one of a silicon-based liquid repellent agent and an alkyl-based liquid repellent agent.

The coating film may have a water contact angle of 100° or more and a thickness of 0.2 μm or more and 3 μm or less.

The coating film may have an oil contact angle of 40° or more and a thickness of 0.2 μm or more and 3 μm or less.

The oven may further include a contaminant collecting portion having a smaller liquid repellency than the coating film.

The oven may further include a door rotatably installed at the main body to open or close the cooking chamber, and the contaminant collecting portion may be provided on an inner surface of the door toward the cooking chamber.

According to an oven of the present disclosure, since a coating film having a thickness of 0.2 μm or more and 3 μm or less is formed on a cooking chamber inner wall, it may be difficult for contaminants caused by oil or the like to be adhered to the cooking chamber inner wall due to a liquid repellency of the coating film. Further, for example, cracks or the like may be prevented from occurring even if a heat load of about 350° C. is repeated as a cooking is repeated. Therefore, it is possible to maintain a contaminant preventing effect over a long period of time and to reduce a time required for cleaning in the oven. In addition, since the contaminants in the oven can be easily dropped due to a presence of the coating film, a very high-temperature cleaning method such as conventional Pyro cleaning does not have to be used. As a result, a load on the oven can be reduced, and an occurrence frequency of a failure can be reduced.

According to a method for forming a coating film of the present disclosure, a coating film having a surface property with a water contact angle of 100° or more can be formed into a thick coating film having a thickness of, 0.2 µm or more and 3 µm or less. Therefore, it becomes possible to provide an excellent contaminant preventing effect on a cooking chamber inner wall and durability against a heat load.

According to an oven of the present disclosure, since a cooking chamber inner wall is vibrated at a frequency range including a resonance frequency of a droplet determined according to a size of the droplet adhering to the cooking chamber inner wall, even if the droplet is a small droplet adhering to the coating film, the small droplet may be removed by a resonance to prevent the small droplet from becoming an adhered contaminant.

According to an oven of the present disclosure, even if contaminants derived from oil or the like are adhered to a cooking chamber inner wall on which a coating film is formed, the contaminants can be dropped by a high temperature. More particularly, conventionally, it has been thought that if temperatures of a cooking chamber and the cooking chamber inner wall are not maintained at a very high temperature of 420° C. as in a Pyro cleaning, the adhered contaminants derived from oil or the like cannot be dropped. The inventors of the present disclosure have found that when the coating film having the liquid repellency is formed on the cooking chamber inner wall, the contaminants may be sufficiently dropped at a temperature lower than that conventionally expected. Since the cooking chamber inner wall is maintained at 350° C. or higher and 400° C. or lower, the contaminants may drop and the liquid repellency of the coating film may not be lost. Therefore, even if a cleaning mode is performed, a state in which the contaminants are less likely to adhere to the cooking chamber inner wall can be maintained for a long period of time.

According to an oven of the present disclosure, not only a cooking chamber inner wall having a liquid repellent coating film on which oil droplets are repelled out, but also a contaminant collecting portion for collecting oil droplets are installed in a cooking chamber, a small oil droplet, which is deposited on the coating and cause a small spot-shaped contaminant, can be collected in the contaminant collecting portion so as not to remain on the coating film. Therefore, it is possible to maintain a cleanliness of a portion where the coating film is formed for a longer period of time.

BRIEF DESCRIPTION OF DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the appended drawings. In the following description, the terms "front end", "rear end", "upper portion", "lower portion", "upper end", and "lower end" are defined based on the drawings, and the shapes and positions of the corresponding components are not limited by the terms.

<An Oven Having a Coating Film>

An oven 100 according to a first embodiment of the present disclosure will be described with reference to a respective drawing.

Figure 1:
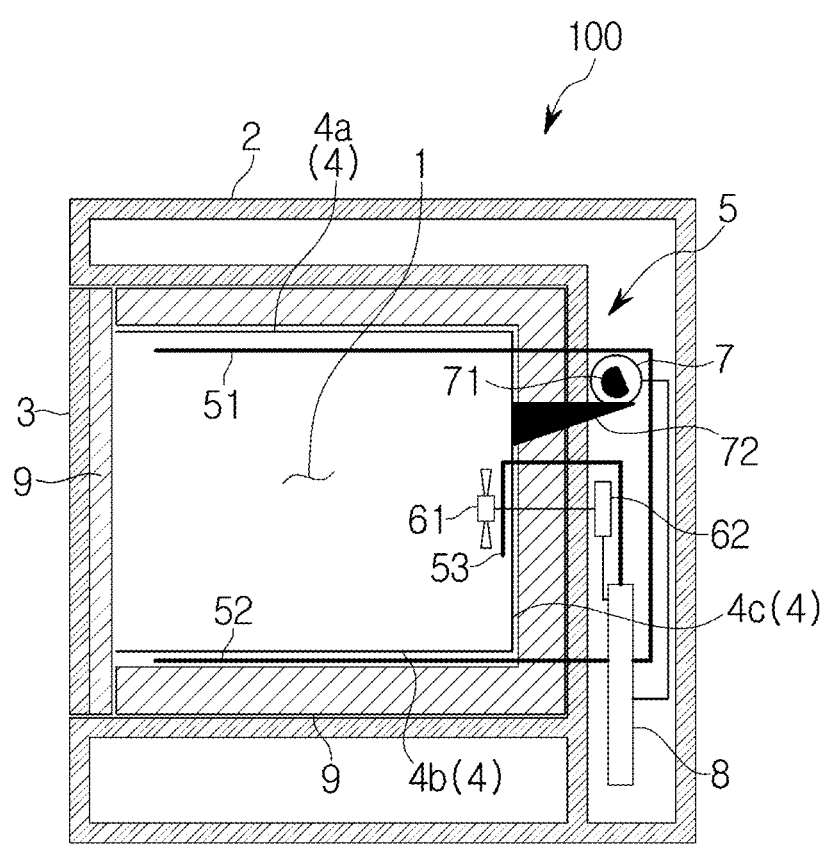
FIG. 1 is a schematic view showing a structure of an oven according to a first embodiment of the present disclosure.

As shown in FIG. 1, the oven 100 may be configured such that a food to be cooked is received in a cooking chamber 1, and the food to be cooked is heated by a heater 5. Particularly, the oven 100 may include a main body 2 forming an appearance. The main body 2 may have a substantially rectangular parallelepiped shape with its front surface opened. Further, the oven 100 may further include the cooking chamber 1 provided inside the main body 2. The cooking chamber 1 may have a substantially rectangular parallelepiped shape with its front surface opened. The cooking chamber 1 may be defined by a cooking chamber inner wall 4. The cooking chamber inner wall 4 may include an upper face 4a, a lower face 4b, a right face, a left face, and a rear face 4c. Further, the oven 100 may further include a door 3 rotatably installed at the main body 2 to open or close the cooking chamber 1. The door 3 may be provided with a window so that the inside of the cooking chamber 1 can be checked from the outside. Further, the oven 100 may further include a heater 5 installed inside the cooking chamber 1 or near the cooking chamber 1. Further, the oven 100 may further include a fan 61 installed to convect or circulate air heated by the heater 5. Further, the oven 100 may further include a vibrator 7 for slightly vibrating the cooking chamber inner wall 4 and dropping contaminants adhered to the cooking chamber inner wall 4 from the cooking chamber inner wall 4. Further, the oven 100 may further include a control board 8 for controlling the heater 5, a motor 62 for driving the fan 61 and the vibrator 7.

The heater 5 may include an upper heater 51 installed in an upper portion of the inside of the cooking chamber 1, a lower heater 52 installed in a lower portion of the cooking chamber 1, and a rear heater 53 installed at a rear surface of the cooking chamber 1 with the fan 61. The upper heater 51 and the rear heater 53 may be installed to be exposed to the inside of the cooking chamber 1, and the lower heater 52 may be installed between the cooking chamber 1 and the main body 2. That is, the lower heater 52 may be installed on the outer side of the cooking chamber inner wall 4 and the inner side of the main body 2.

The oven 100 may further include a heat insulating material 9 disposed between the cooking chamber 1 and the main body 2. That is, the heat insulating material 9 may be disposed between an outer surface of the cooking chamber inner wall 4 and an inner surface of the main body 2. Further, the heat insulating material 9 may be disposed inside the door 3.

The oven 100 may further include a coating film 43 formed on at least a part of the cooking chamber inner wall 4. A detailed description of the coating film 43 will be described later.

The heater 5, the fan 61 and the control board 8 may control a temperature and a temperature distribution inside the cooking chamber 1 in cooperation with each other. The present embodiment may be configured to perform a cooking mode in which a temperature of the cooking chamber inner wall 4 is about 350° C., and a cleaning mode in which the inside of the cooking chamber 1 is maintained at a temperature higher than that in the cooking mode for a predetermined time, and a convection of the air inside the cooking chamber 1 is controlled by the fan 61 to remove contaminants adhering to the cooking chamber inner wall 4.

Hereinafter, the coating film 43 will be described in detail.

Figure 2:
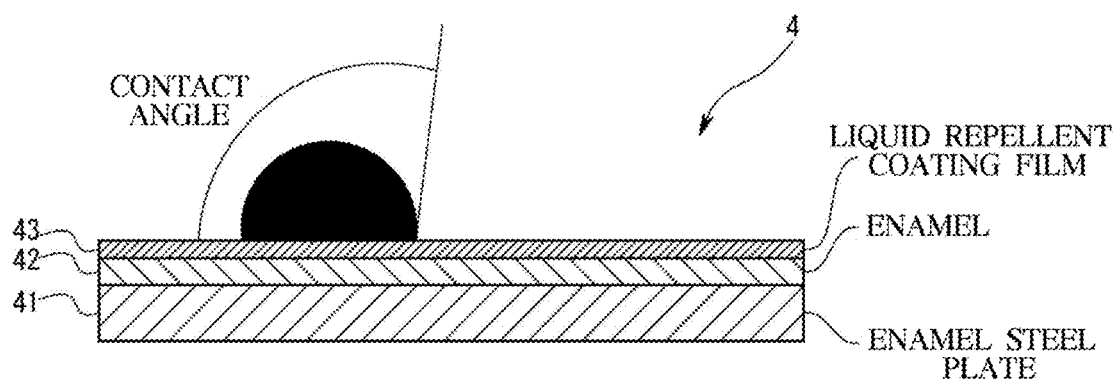
FIG. 2 is a schematic cross-sectional view showing a structure of a coating film according to the first embodiment.

As shown in FIG. 2, the cooking chamber inner wall 4 may include an enamel steel plate 41 corresponding to a base, and an enamel 42 formed on the enamel steel plate 41 to face the inside of the cooking chamber 1. The coating film 43 may be formed on the enamel 42 to be exposed to the inside of the cooking chamber 1. That is, the coating film 43 may be formed on the enamel 42 to face the inside of the cooking chamber 1.

The coating film 43 may have a liquid repellency. In other words, at least the outer surface of the coating film 43 may have the liquid repellency. The outer surface of the coating film 43 refers to a surface facing the inside of the cooking chamber 1. The coating film 43 may have a water contact angle of 100° or more. Further, the coating film 43 may have an oil contact angle of 40° or more when a vegetable oil such as rapeseed oil, canola oil, or safflower oil, and a chicken oil are at 60° C.

More particularly, the coating film 43 may include a base including silsesquioxane, and a coating material including at least one of a silicon-based liquid repellent agent and an alkyl-based liquid repellent agent. In other words, the coating film 43 may be obtained by adding a silicon-based or alkyl-based liquid repellent material to the material having silsesquioxane as a skeleton. "adding" is a concept that includes mixing the material having silsesquioxane as the skeleton with the silicon-based or alkyl-based liquid repellent material, or coupling the silicon-based or alkyl-based liquid repellent material to the material having silsesquioxane as the skeleton. For example, a derivative obtained by replacing a part of the material having silsesquioxane as the skeleton with the silicon-based or alkyl-based liquid repellent material may be used as the coating film. More particularly, the coating film 43 may hardly have thermal denaturation even when the surface temperature reaches 350° C., and continue to exhibit predetermined liquid repellency. That is, the coating film 43 may have the liquid repellency and a heat resistance.

The coating film 43 may be formed to have a predetermined thickness by a spray coating after the enamel steel plate 41 and the enamel 42 are formed into a substantially rectangular parallelepiped like the cooking chamber inner wall 4. Alternatively, the coating film 43 may be formed by a spin coating in a flat plate state before forming the cooking chamber inner wall 4, and then the cooking chamber inner wall 4 may be formed in a rectangular parallelepiped shape. The coating film 43 can be cured while simultaneously exhibiting its liquid repellency by applying a liquid-type coating material on the enamel 42 and then heating it.

Figure 3:
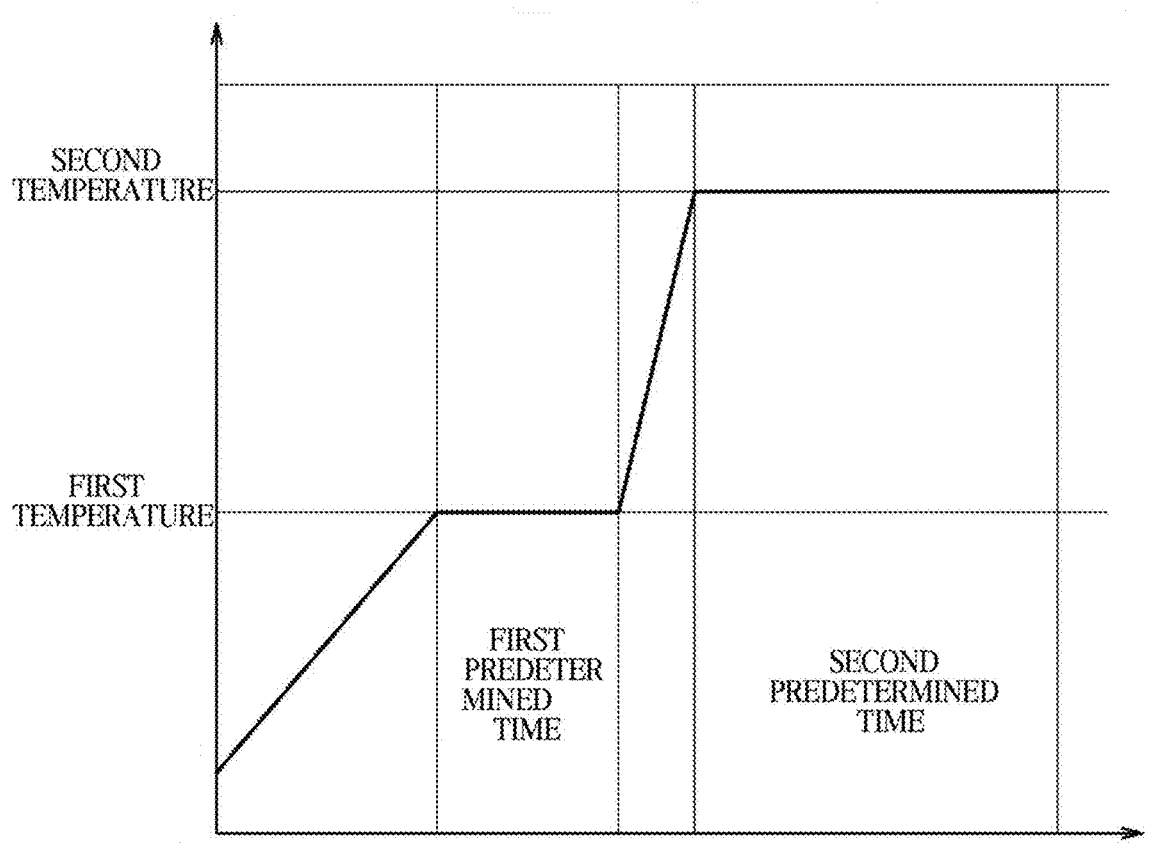
FIG. 3 is a schematic graph showing a temperature profile when the coating film is cured according to the first embodiment.

In this embodiment, a plurality of stages of curing may be performed in order to prevent cracks or the like when the thickness of the coating film 43 is made larger than a predetermined thickness. More particularly, as shown in the temperature profile of the graph of FIG. 3, the coating film 43 may be heated to a first temperature for a first predetermined time in a state of being applied to the surface of the cooking chamber inner wall 4, and then heated to a second temperature higher than the first temperature for a second predetermined time and cured.

The thickness of the coating film 43 may be set so that even when the cooking mode is repeated, the above-described surface characteristics are kept almost constant, and cracks or the like do not occur on the surface even if the heat load is repeated a predetermined number of times. More particularly, the thickness of the coating film 43 may be 0.2 µm or more and 3 µm or less.

Figure 4:
FIG. 4 shows a comparison result showing a contaminant preventing effect of the coating film according to the first embodiment.
Figure 4:
Figure 4:
Figure 4:
Figure 4:
Figure 4:
Figure 4:
Figure 4:
Figure 4:

A difference in a contamination method in a case in which the coating film 43 is formed on the surface of the cooking chamber inner wall 4 will be described with reference to FIG. 4. In a sample 1 and a sample 2, a coating film 43 having a different thickness is formed on the cooking chamber inner wall 4. In a comparative example, the coating film 43 is not formed on the cooking chamber inner wall 4, and the enamel 42 is exposed. FIG. 4 shows a state of the cooking chamber inner wall 4 for each number of chickens when a chicken, as the food to be cooked, is roasted as a whole in the oven 100. A level of contaminant is the average value of sensory evaluation by several persons.

As shown in FIG. 4, in the comparative example similar to the conventional state in which the coating film 43 is not provided, when 40 chickens are roasted, the contaminant due to oil adheres to the cooking chamber inner wall 4. On the other hand, in the sample 1 and sample 2, even when 40 chickens are roasted, an adhesion amount of contaminant are reduced as compared with the comparative example. In addition, since the contaminant does not strongly adhere to the cooking chamber inner wall 4, it is possible to easily drop the contaminant by simply rubbing the contaminant with a brush or the like. In other words, by allowing the coating film 43 to have a surface characteristic in which the water contact angle of the coating film 43 is 100° or more and 120° or less as an example, an adhesion of the contaminant can be largely reduced, and time and effort required for cleaning can be reduced. In addition, since the contaminant does not adhere to the cooking chamber inner wall 4 like the comparative example, cleaning by means such as the Pyro cleaning can be omitted.

Figure 5:
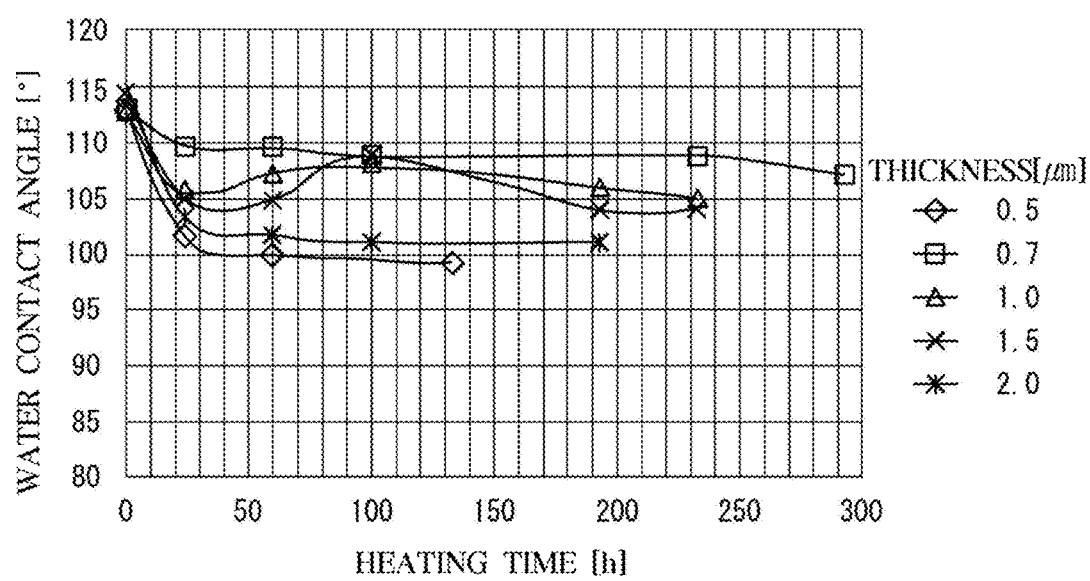
FIG. 5 is a graph showing a water contact angle according to thickness of the coating film, and durability against heating time according to the first embodiment.

Next, a test result of the thickness of the coating film 43 and durability against the heat load is shown in a graph of FIG. 5. The graph of FIG. 5 shows a change in the water contact angle with respect to a cumulative heating time by applying the heat load to the coating film 43 formed with thickness of 0.5 μm, 0.7 μm, 1.0 μm, 1.5 μm and 2.0 μm. As described above, a magnitude of the water contact angle positively correlates with a difficulty of adhesion of the contaminant. Further, a fact that the graph is broken indicates that a measurement is stopped because it is judged that the crack or the like occur at that point and thus the coating film 43 is no longer usable.

In the graph of FIG. 5, when the thickness of the coating film 43 is 0.5 μm or more and 2 μm or less, it is found that a good contaminant preventing performance can be obtained in which the water contact angle is 100° or more until the heating time reaches about 50 hours. Such a range of thickness is preferable for the liquid repellency and durability against the heat load. In addition, when the thickness of the coating film 43 is 0.7 μm or more and 1.5 μm or less, a time for maintaining the water contact angle from 105° to 110° can be longer, and the durability against the heat load can be increased to 200 hours or more in the cumulative heating time. Further, according to an experiment, which is different from the experiment of FIG. 5 performed by the present inventors or the like, it can be seen that the durability against the heat load is improved even when the thickness of the coating film 43 is 0.7 μm or less, and further, 0.2 μm or less, as long as the coating film 43 is uniformly formed with a predetermined thickness. Further, the coating film 43 may have a thickness larger than 0 μm.

Next, the oven 100 according to a first modification of the first embodiment will be described.

Figure 6:
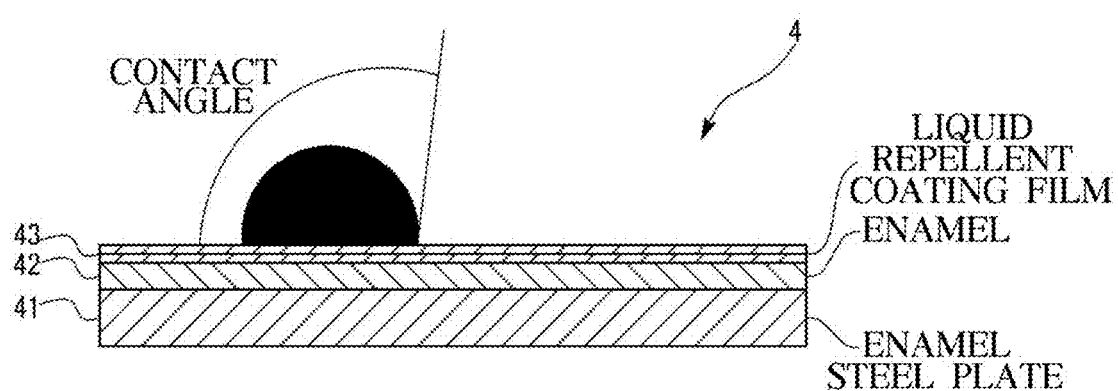
FIG. 6 is a schematic cross-sectional view showing a coating film according to a first modification of the first embodiment.

In the oven 100 of the first modification of the first embodiment, the coating film 43 formed on the cooking chamber inner wall 4 may be formed as two layers instead of one layer as shown in FIG. 6. The two layers refer to a state before the coating film 43 is fully cured or after curing.

More particularly, in the first modification of the first embodiment, the coating film 43 may be formed by applying the second layer of the coating film 43 on the first layer before the first layer of the coating film 43 is completely cured on the enamel 42 and the liquid repellency develops in the first layer. Accordingly, even if the thickness of the coating film 43 is 2.0 μm or more, cracks or the like hardly occur in a curing process, and it is easy to realize thickening. Further, the heat resistance of the coating film 43 can be improved by thickening. In other respects, the coating film 43 may include at least one layer. The at least one layer may include a first layer applied to at least a portion of the cooking chamber inner wall 4, and a second layer applied on the first layer before the first layer is cured.

Next, the oven 100 according to the second modification of the first embodiment will be described.

The oven 100 of the second modification of the first embodiment is the same as the first modification in that the coating film 43 is formed in two layers. However, the oven 100 of the second modification of the first embodiment differs from the first modification in that the first layer is a resin layer having no liquid repellency and only the second layer contains solid component that exhibit the liquid repellency.

Table 1 shows a result of comparison of a surface state when the coating film 43 having such a structure is cured.

TABLE 1

| composition | | | |
|---|---|---|---|
| first layer | second layer | thickness (μm) | surface state |
| transparent resin paint | Solid content 28% | 1.6 | good |

TABLE 1-continued

| composition | | | |
|---|---|---|---|
| first layer | second layer | thickness (μm) | surface state |
| transparent resin paint | Solid content 40% | 2.6 | There is a little uneven surface. |
| transparent resin paint | Solid content 50% | 2.9 | There is a slight crack. There is an uneven surface. |

As shown in Table 1, even if a coating film is formed so that the first layer does not contain a liquid repellent component and the second layer contains the solid component that exhibits the liquid repellency up to 40% of the total weight, the coating film can be thickened without cracks. That is, according to the second modification, even in a case of the coating film 43 in which the solid component of the material is combined at a ratio of 28% or more and 40% or less with respect to the total weight including the solvent, high durability against the heat load and further improvement in the liquid repellency can be realized by curing. In addition, the most favorable surface state can be obtained and the coating film 43 can be easily applied to the cooking chamber inner wall 4 when the solid component of the material is combined at a ratio of 5% or more and 28% or less with respect to the total weight including the solvent.

Next, the oven 100 according to the fourth modification of the first embodiment will be described.

Figure 7:
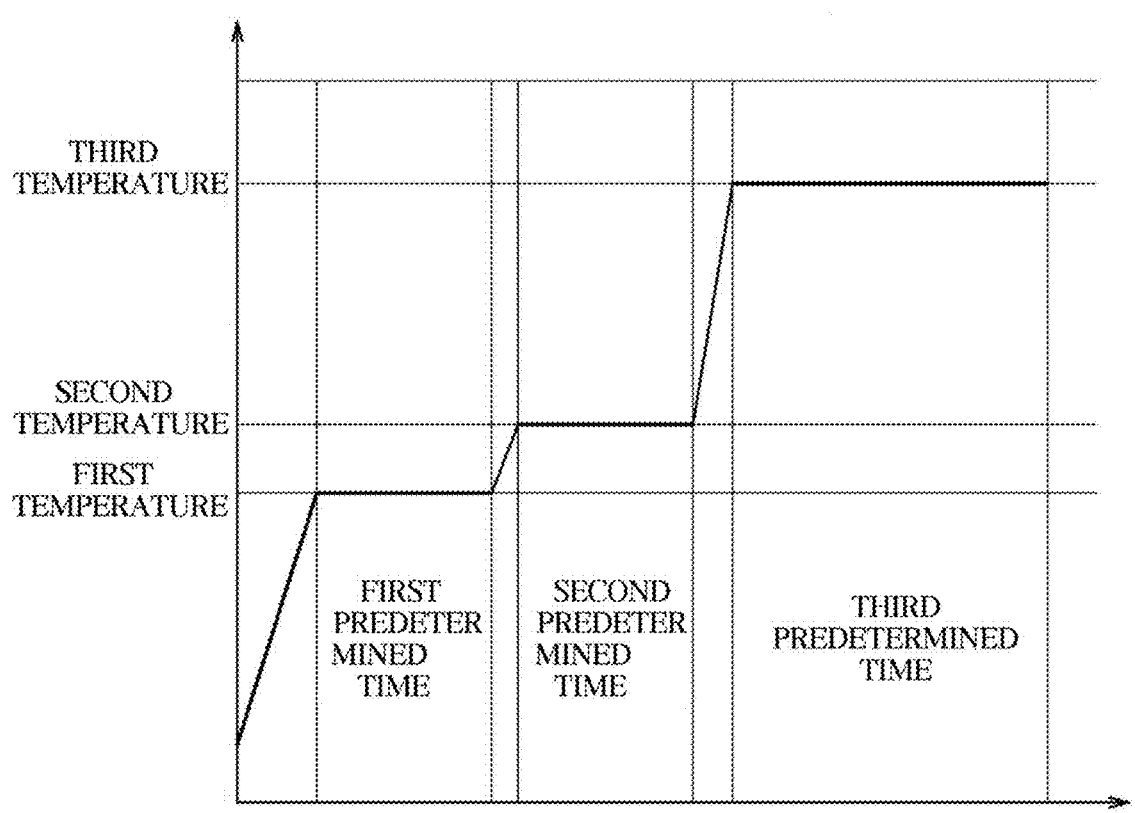
FIG. 7 is a schematic graph showing a temperature profile when a coating film is cured according to a fourth modification of the first embodiment.

In the fourth modification of the first embodiment, the coating film 43 formed on the cooking chamber inner wall 4 may be cured by a temperature change in three stages as shown in a graph of a temperature profile of FIG. 7. That is, by raising a temperature such as a first predetermined temperature, a second predetermined temperature and a third predetermined temperature in order, the temperature is kept constant for each of the temperatures for a first predetermined time, a second predetermined time and a third predetermined time. The first predetermined time and the second predetermined time are set to be shorter than the third predetermined time, and lengths of the first predetermined time and the second predetermined time are equal to each other. Further, a difference between the first predetermined temperature and the second predetermined temperature is set to be smaller than a difference between the second predetermined temperature and the third predetermined temperature.

As described above, by increasing the number of stages of the temperature profile in curing, generation of cracks or the like may be further prevented. In addition, the thickness of the coating film 43 may be easily thicker. Further, the temperature profile is not limited to those shown in FIGS. 3 and 7, and a temperature may be smoothly changed so that a plurality of stages of temperature differences is formed.

Next, the oven 100 according to the fifth modification of the first embodiment will be described.

In the fifth modification of the first embodiment, a transparent coating film 43 may also be formed on an inner surface of the window of the door 3. That is, the coating film 43 may be further formed on the inner surface of the window of the door 3 facing the cooking chamber 1. At this time, the coating film 43 may be transparent.

Figure 8:
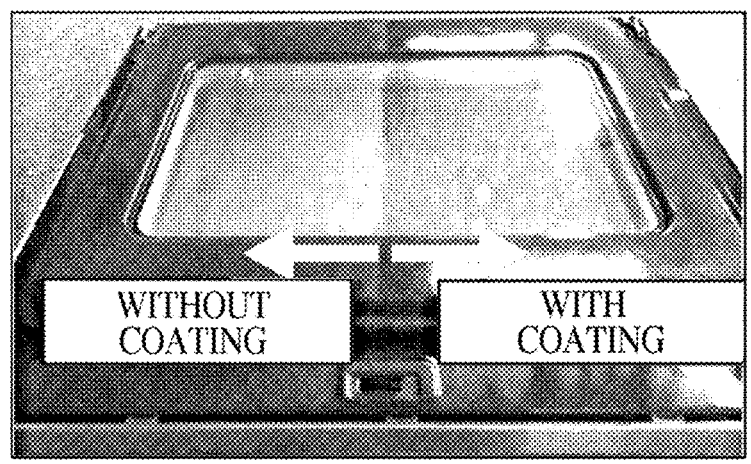
FIG. 8 is a comparison result showing a contaminant preventing effect in a case in which a coating film is formed on a window according to a fifth modification of the first embodiment.
Figure 8:
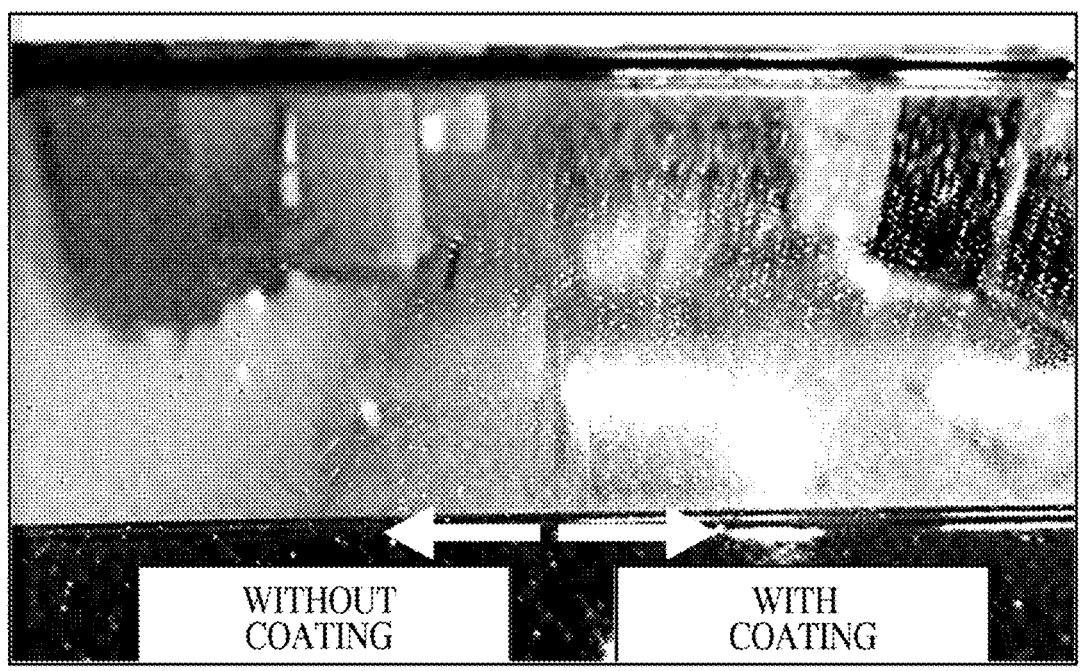

FIG. 8 shows a result of a comparison of the contaminant adhering inside the cooking chamber 1 when the coating film 43 is formed only on the right side portion of the window and the food to be cooked is cooked. As shown in FIG. 8, by forming the coating film 43 on the inner surface of the window, it can be seen that a phenomenon of blurring and contamination of the window due to oil or the like generated from the food to be cooked is reduced.

Next, the oven 100 according to the sixth modification of the first embodiment will be described.

Figure 9:
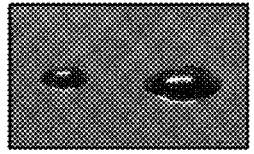
FIG. 9 is a comparison result showing a contaminant preventing effect in a case in which a coating film is formed on a steel plate according to a sixth modification of the first embodiment.

In the sixth modification of the first embodiment, the coating film 43 may be formed directly on the surface of the steel plate 41 instead of forming the coating film 43 on the surface of the enamel 42. FIG. 9 shows a result of comparison in a case in which an oil causing the contaminant and being extracted from the food to be cooked is dropped on each of a SUS 304 on which the coating film 43 is formed and a glass plate on which the coating film 43 is not formed.

As can be seen in FIG. 9, when a viscosity of the oil is lowered by heating, droplets of the oil are scattered, which causes the contaminant to adhere to the surface, in the glass plate on which the coating film 43 is not formed, but, a state of droplets of the oil is hardly changed in the steel plate 41 on which the coating film 43 is formed. That is, when the coating film 43 is formed, a change in the oil contact angle due to the temperature change is hardly recognized, and the liquid repellency is maintained. Further, as can be seen from a result obtained when the steel plate 41 and the glass plate are tilted up, in the glass plate, a trace of a movement of the oil becomes a mark and becomes a noticeable contaminant. On the other hand, in the steel plate 41 in which the liquid repellency is exhibited by the coating film 43, the mark is not left even after the oil passes, so that it is difficult that the mark is left as the contaminant.

As can be seen from the fifth and sixth modifications, the coating film 43 can exhibit substantially the same contaminant preventing effect even if it is formed on the glass or the steel plate 41 instead of the enamel 42.

Other modifications of the first embodiment will be described.

The coating film according to the present disclosure is not limited to those shown in the embodiments and the modifications of the embodiments, and may have other compositions. More particularly, the coating film may be a material that does not contain fluorine such as Teflon and does not lose its liquid repellency due to thermal deformation even when the temperature reaches about 350° C. at the time of cooking.

Further, when the thickness of coating film is 0.2 µm or more and 3 µm or less regardless of the composition, the occurrence of cracks or the like can be suppressed and the durability against repeated heat load can be realized with a problem-free level in use. In addition, the coating film according to the present disclosure can be used for both an electric oven and a gas oven.

<A Method of Forming a Coating Film>

Next, a method of forming the coating film 43 according to the first embodiment of the present disclosure will be described with reference to the drawings. Hereinafter, a method of forming the coating film 43 by a spray coating method will be described in detail.

In this embodiment, at least one of hexane, heptane octane, butyl acetate, PEGMEA and ethyl acetate may be used as a solvent, and the coating material is present in an amount of 12.5% by weight, based on the weight of the solution. The solution may be applied to the cooking chamber inner wall 4 using a spray gun having a nozzle diameter of 0.5 mm. When this solution is applied, a spray target may be moved while being sprayed by the spray gun and the spray target may be passed through three times with respect to each point of the cooking chamber inner wall 4. It is also possible that the spray target is passed through twice depending on the thickness of the coating film 43.

In this embodiment, a plurality of stages of curing may be performed in order to prevent cracks or the like from occurring when the thickness of the coating film 43 is made larger than a predetermined value. That is, the coating film 43 may be heated to a first temperature for a first predetermined time in a state of being applied to the surface of the cooking chamber inner wall 4, and then heated to a second temperature higher than the first temperature for a second predetermined time and cured.

In a case of the above-described film forming method, it is possible to prevent the surface of the coating film 43 from being cracked while making the coating film 43 thick.

Next, a modification relating to the method of forming the coating film will be described.

Although a basis material on which the coating film 43 is formed is the enamel 42 in the above embodiment, the coating film 43 may be formed on the surface of the steel plate such as SUS 304 or the like. Further, the coating film 43 may be formed on the inner surface of the window installed on the door 3. When the basis material on which the coating film 43 is formed is other than the enamel 42, a concentration of the coating material, which is a solid component in the solution, may be different from that in a case of coating the enamel 42.

Embodiments of other method of forming the coating film will be described.

The coating film according to the present disclosure is not limited to those shown in the embodiments and the modification of the embodiments, and may have other compositions. More particularly, the coating film may be a material that does not contain fluorine, and may be any material that does not lose its liquid repellency due to thermal deformation even when the temperature reaches about 320° C. at the time of cooking.

Further, when the thickness of coating film is 0.2 µm or more and 3 µm or less regardless of the composition, the occurrence of cracks or the like can be suppressed and the durability against repeated heat load can be realized with a problem-free level in use. In addition, the coating film according to the present disclosure can be used for both an electric oven and a gas oven.

<Removal of Contaminants by Micro Vibration>

An oven 100 according to a second embodiment of the present disclosure will be described with reference to the drawings. The oven 100 according to the second embodiment is the same as the oven 100 shown in FIG. 1. However, the oven 100 according to the second embodiment differs from the oven 100 according to the first embodiment in an operation of the vibrator 7 and the heater 5.

Hereinafter, a structure of the vibrator 7, and a removal action and a removal effect of droplets, which are adhered to the cooking chamber inner wall 4 and do not fall by their own weight, by using a vibration of the vibrator 7 will be described in detail.

The vibrator 7 may include an eccentric motor 71 (see FIG. 1), and a vibration transmitting plate 72 (see FIG. 1) having one end vibrated by an eccentric weight of the eccentric motor 71 and the other end being a drive shaft connected to the outer surface of the cooking chamber inner wall 4. More particularly, an oscillation frequency of the eccentric motor 71 may be changed according to a magnitude of an input current. The eccentric weight of the eccentric motor 71 may come into contact with the vibration transmitting plate 72 in a direction perpendicular to a surface plate portion of the vibration transmitting plate 72, and vibrate the vibration transmitting plate 72 in a vertical direction. Further, the vibration transmitting plate 72 may be installed to be connected to the cooking chamber inner wall 4 while not being in contact with the main body 2. That is, a vibration generated from the vibrator 7 may not be transmitted to the main body 2. Further, the vibration transmitting plate 72 may be connected to a rear surface extending in the vertical direction of the cooking chamber inner wall 4 so that a bending vibration in the vertical direction of the vibration transmitting plate 72 is transmitted to the rear surface of the cooking chamber inner wall 4.

The control board 8 (a controller) may control the heater 5, the vibrator 7 and the motor 62 so that each of the heater 5, the vibrator 7 and the motor 62 performs different operations in at least the cooking mode and the cleaning mode. The control board 8 may be a so-called computer having a CPU, a memory, an A/D·D/A converter or the like. By executing an oven program stored in the memory, the control board 8 may function as at least a heater controller, a vibrator controller, and a fan controller in cooperation with various devices.

The heater controller may control a current flowing through the upper heater 51, the lower heater 52 and the rear heater 53 constituting the heater 5 to maintain a temperature in the cooking chamber 1 at a set temperature. In the cooking mode, the heater controller may control the heater 5 to maintain the temperature in the cooking chamber 1 at a temperature suitable for the cooking of the food to be cooked. On the other hand, in the cleaning mode, the heater controller may control the heater 5 to keep the inside of the cooking chamber 1 at a predetermined temperature that makes it easier to move the droplets adhered to the cooking chamber inner wall 4 by the vibration of the vibrator 7.

When the heating is performed by the heater 5, the fan controller may control the number of revolutions of the motor 62 to control an air volume in the cooking chamber 1 generated from the fan 61. Convection in the cooking chamber 1 generated by the fan 61 can prevent only a part of the cooking chamber 1 from becoming hot and the liquid repellency of the coating film 41 from being lost.

Next, an operation of the control board 8 in the cleaning mode will be described in detail.

The control board 8 will perform the cleaning mode when the cooking mode is finished.

At this time, the vibrator controller may vibrate the vibrator 7 in a predetermined amplitude range and a predetermined frequency range to vibrate the cooking chamber inner wall 4 in the vertical direction. The predetermined amplitude range may be set to a value at which a vibrating sound of the cooking chamber inner wall 4 from the main body 2 to the outside does not leak over a predetermined level, while applying a force required to move small droplets which are adhered on the coating film 43 and are not dropped by their own weight. The predetermined frequency range may be set to include a resonance frequency of the droplets determined in accordance with a size of the droplets adhered to the cooking chamber inner wall 4 in the present embodiment. In the present embodiment, the predetermined amplitude range may be set to 10 μm or more and 100 μm or less, and the predetermined frequency range may be set to 20 Hz or more and 220 Hz or less. In addition, the vibration controller may control the vibrator 7 to continuously vibrate the cooking chamber inner wall 4 for 10 seconds or more and 60 seconds or less.

When the vibrator 7 is vibrated in the cleaning mode, the heater controller may also perform a temperature control to keep the inside of the cooking chamber 1 at a predetermined temperature by operating the heater 5. In the present embodiment, the temperature inside the cooking chamber 1 may be maintained at a temperature higher than the room temperature by the heater 5 in the cleaning mode. More particularly, in the cleaning mode, the temperature in the cooking chamber 1 may be kept at 60° C. or higher and 350° C. or lower.

Hereinafter, it will be described based on an experimental data a fact in which the vibrator 7 and the heater 5 can drop the small droplets, which are continuously adhered even if the coating film 43 has the liquid repellency, through cooperation between the vibrator 7 and the heater 5.

Figure 10A:
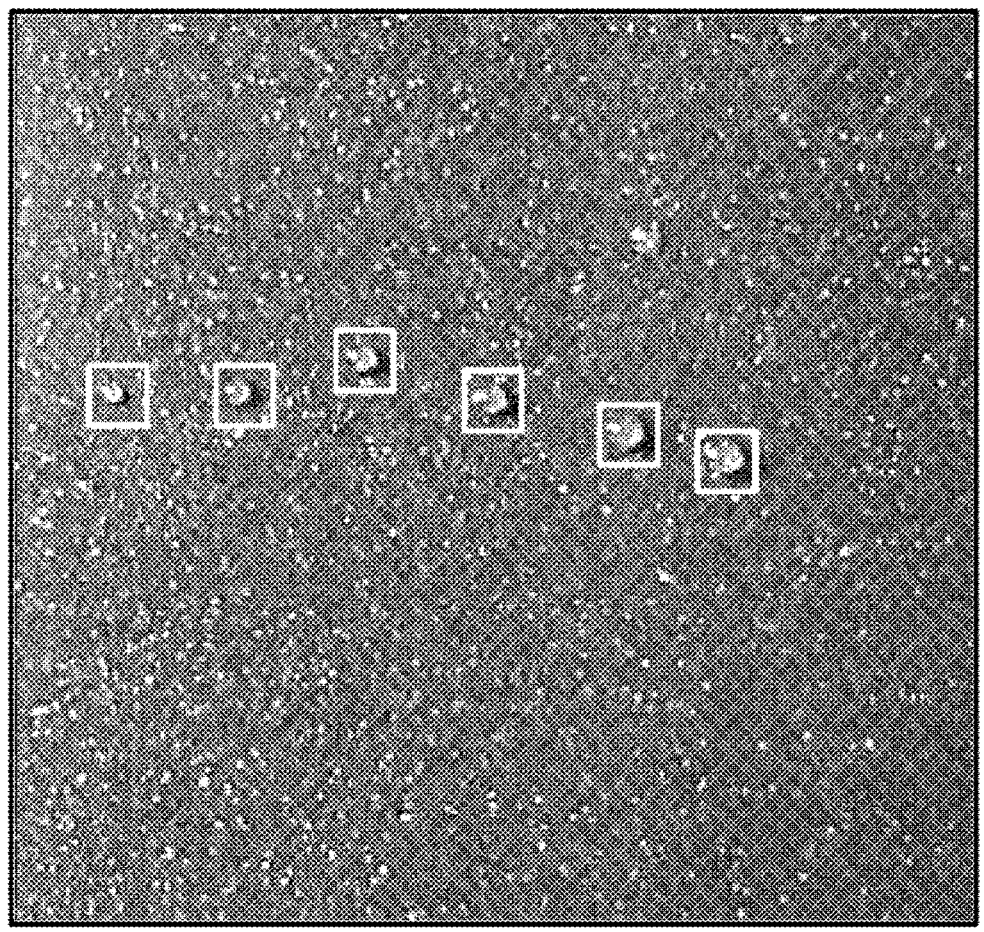
FIGS. 10A and 10B are experiment's photographs showing a movement of water droplets by vibrating a cooking chamber inner wall according to a second embodiment.
Figure 10B:
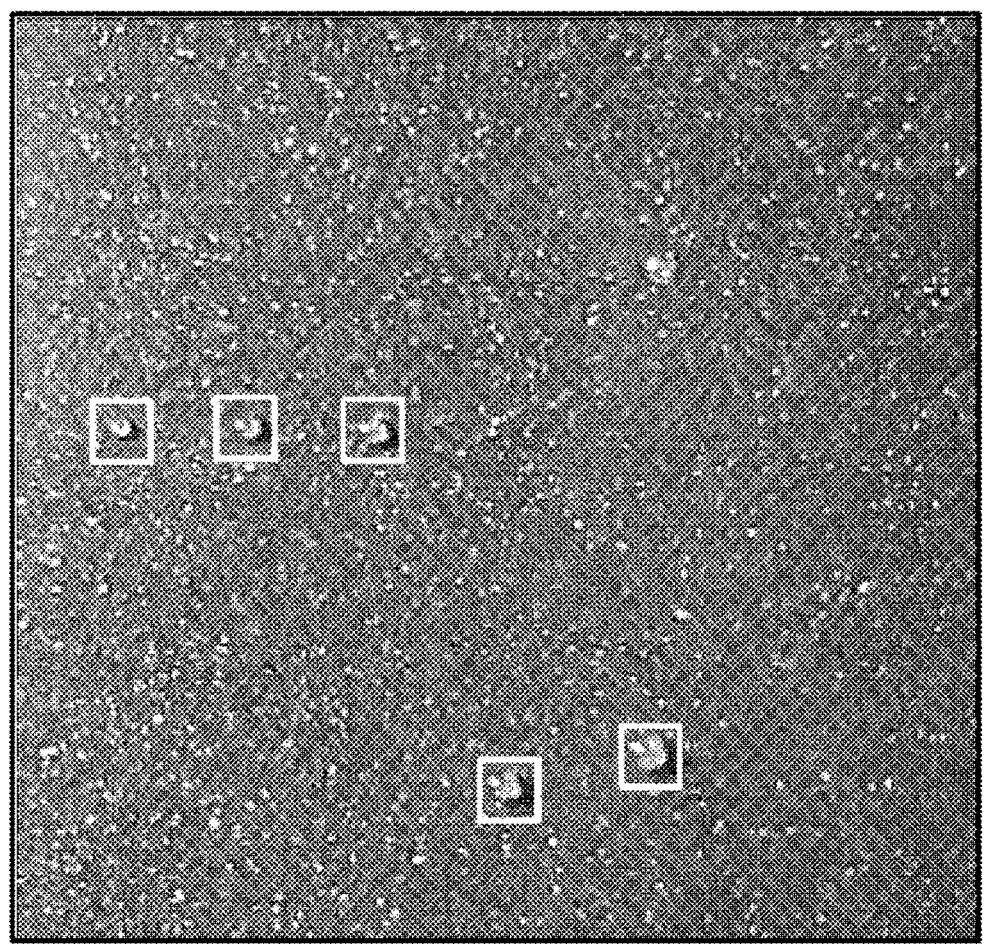

As shown in FIG. 10A, a small vibration was generated at the room temperature by the vibrator 7 after water droplets of 1.0 μl, 1.5 μl, 2.0 μl, 2.5 μl, 3.0 μl and 3.5 μl were adhered to a standing face of the cooking chamber inner wall 4. Particularly, a waveform of a sinusoidal wave whose frequency changes from 20 Hz to 120 Hz for 10 seconds was applied three times by the vibrator 7. As a result, the water droplets could be moved as shown in FIG. 10B.

Figure 11A:
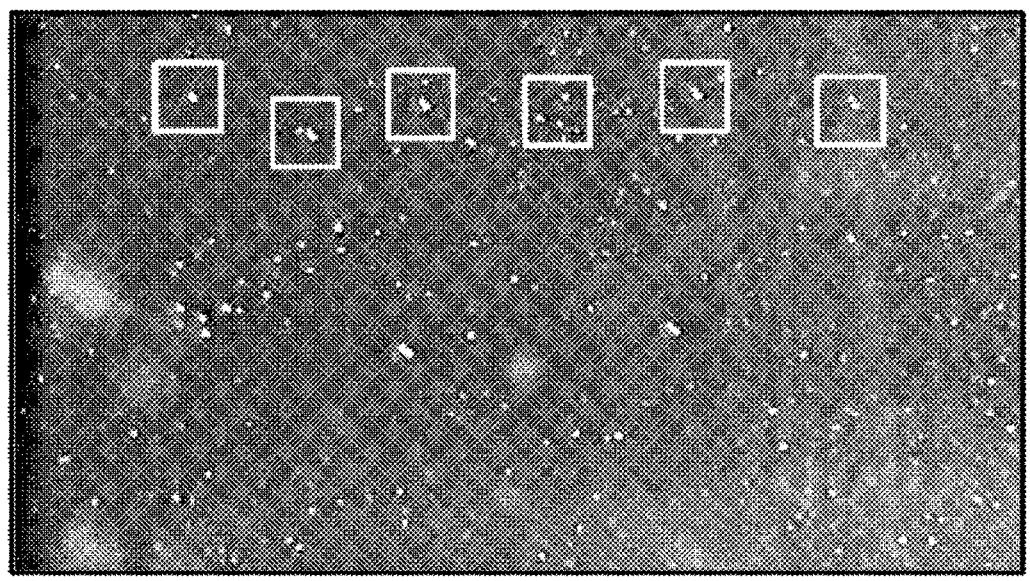
FIGS. 11A and 11B are experiment's photographs showing a movement of oil droplets by vibrating the cooking chamber inner wall in the second embodiment.
Figure 11B:
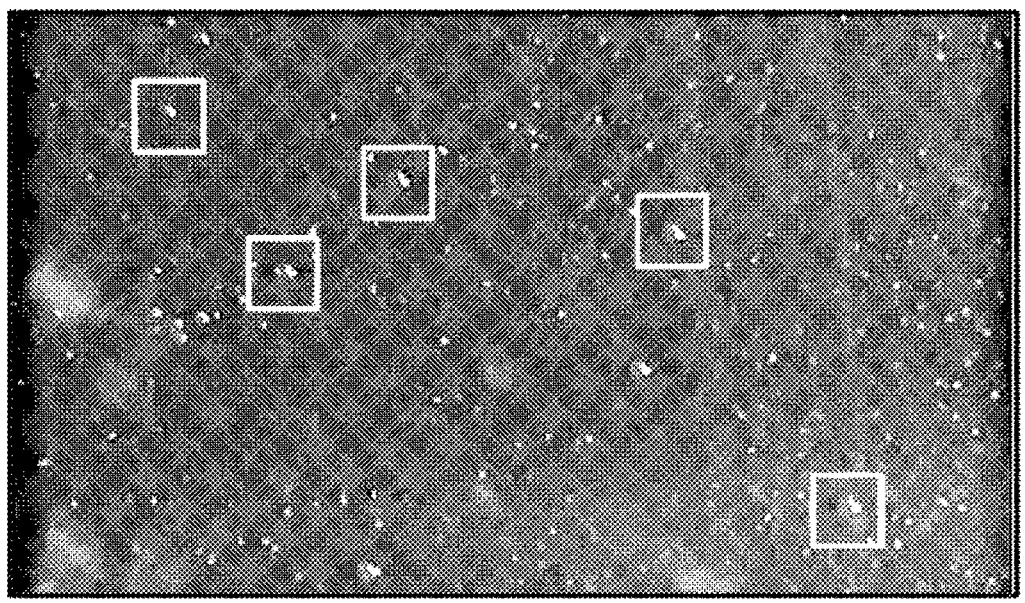

As shown in FIG. 11A, a small vibration was generated at the room temperature and when the temperature was maintained at 60° C. by the heater 5, respectively, by the vibrator 7 after oil droplets of 1.0 μl, 1.5 μl, 2.0 μl, 2.5 μl, 3.0 μl and 3.5 μl were adhered to a standing face of the cooing chamber inner wall 4. Particularly, a waveform of a sinusoidal wave whose frequency changes from 20 Hz to 120 Hz for 10 seconds was applied three times by the vibrator 7. As a result, at the room temperature, it was not possible to move the oil droplets even if the small vibration was applied. However, when the temperature in the cooking chamber 1 was maintained at 60° C., the oil droplets could be moved as shown in FIG. 11B.

These results are summarized in Table 2.

TABLE 2

| droplets | temperature | droplet diameter | waveform modulation conditions | movement distance |
|---|---|---|---|---|
| droplets | room temperature | about 0.5 mm about 0.8 mm about 1.0 mm | change a sinusoidal wave of 20 Hz to 120 Hz for 10 seconds | 1 mm or less about 2 mm 10 mm or more |
| oil droplets (oil taken after a chicken cooking) | room temperature | about 0.5 mm about 0.8 mm about 1.0 mm | change a sinusoidal wave of 20 Hz to 220 Hz for 20 seconds | no movement |
| | 60 | about 0.5 mm about 0.8 mm about 1.0 mm | change a sinusoidal wave of 20 Hz to 220 Hz for 20 seconds | 1 mm or less about 2 mm about 5 mm |

As described above, in the oven 100 of the second embodiment, the droplets including the small water droplets or the oil droplets can be separated from the cooking chamber inner wall 4 and be dropped by slightly vibrating the cooking chamber inner wall 4 in the vertical direction by the vibrator 7 after the temperature inside the cooking chamber 1 is maintained at 60° C. or higher by the heater 5 in the cleaning mode.

The droplets having a large droplet diameter may be dropped by their own weight due to the liquid repellency of the coating film 43, and the small droplets adhered to the coating film 43 having the liquid repellency may be moved and dropped by an action of the heater 5 and the vibrator 7.

Therefore, the water droplets or the oil droplets remaining on the cooking chamber inner wall 4 can be substantially removed. As a result, the small oil droplets, which are continuously adhered to the cooking chamber inner wall 4 and deteriorated by the heat during cooking, can be prevented from adhering to the cooking chamber inner wall 4 as a small black mass. As a result, a time required for cleaning in the oven 100 may be greatly reduced. Even if a small contaminant remains, the contaminant can be sufficiently dropped without a high-temperature cleaning method such as the Pyro cleaning in which the temperature in the cooking chamber 1 reaches 420° C. Therefore, a load on the heater 5 can be reduced and a failure frequency of the oven 100 can be reduced.

A modification of the second embodiment will be described.

In the second embodiment, the cooking chamber inner wall 4 may be vibrated by the vibrator 7 while the temperature inside the cooking chamber 1 is maintained at 60° C. or higher by the heater 5. However, for example, the vibrator 7 may be vibrated in a stage in which a remaining heat of the cooking mode remains so that the oil droplets move. Further, in the cleaning mode, the temperature inside the cooking chamber 1 may be appropriately set, or may be set at a temperature other than 60° C. For example, the temperature in the cooking chamber 1 may be set within a temperature range in which the coating film 43 does not lose its liquid repellency due to the thermal deformation.

The vibrator 7 is not limited to being operated by the eccentric motor, and various types such as an electromagnetic vibrator, a piezoelectric element or the like can be used. A vibration direction by the vibrator 7 may include at least a vertical direction, and may include other vibration direction components. A predetermined frequency range for vibrating the vibrator 7 may be set according to a size of the droplets to be dropped from the cooking chamber inner wall 4. For example, the predetermined frequency range may be set to include only a part of the resonance frequency, instead of setting the predetermined frequency range to include the resonance frequency with respect to the entire diameter distribution of the droplets. Also, the predetermined frequency range is not limited to that shown in the above embodiment, and may be set appropriately according to parameters such as a size of the oven, a size of the cooking chamber inner wall, a sound insulation performance, and a length of time for vibrating the vibrator. In addition, a vibration by the vibrator 7 is not limited to being continuously applied, but may be intermittently applied. For example, an idle period may be provided every time a frequency of the vibrator is changed.

<Cleaning with the Heater and the Fan Only>

Next, the oven 100 according to the third embodiment will be described with reference to the drawings.

Figure 12:
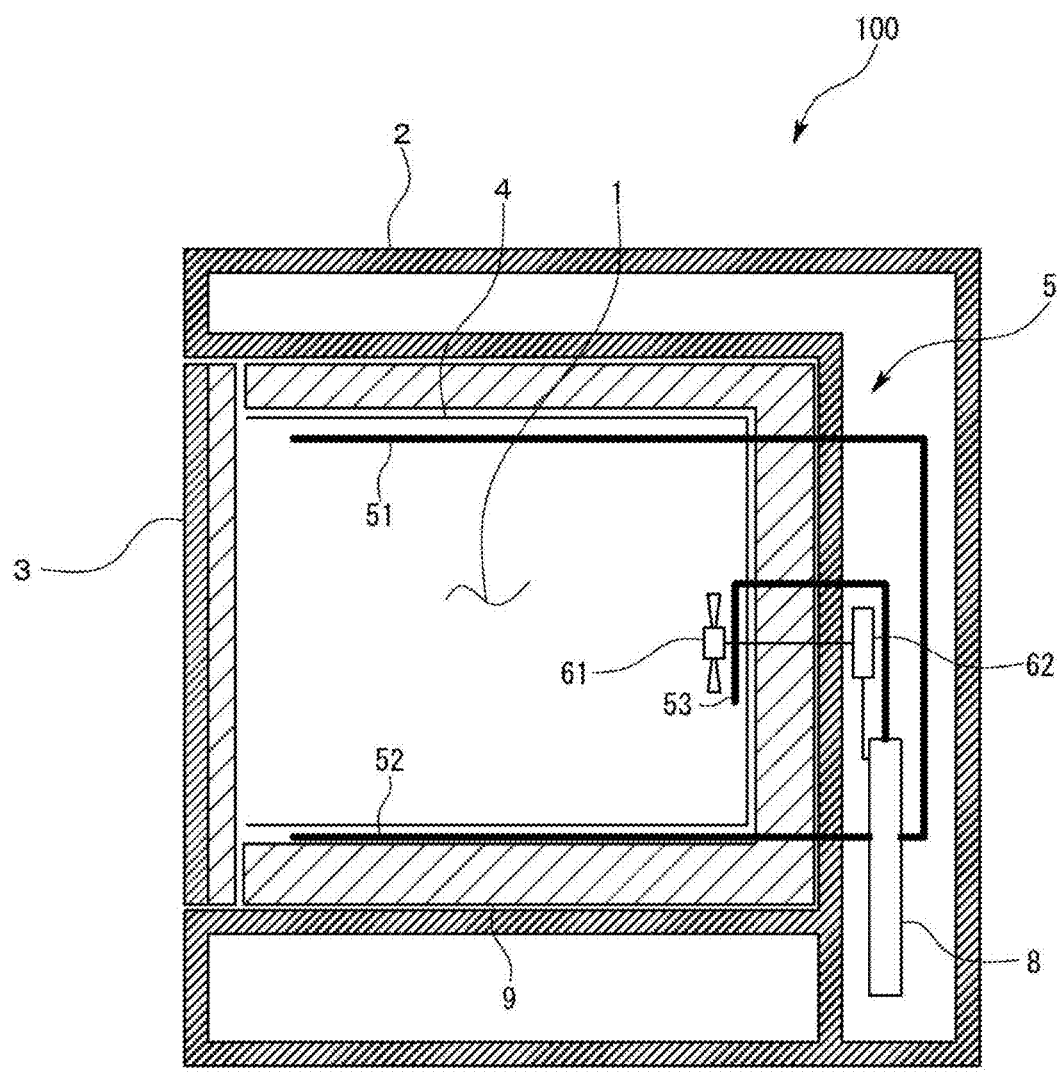
FIG. 12 is a schematic view showing a structure of an oven according to a third embodiment of the present disclosure.

As shown in FIG. 12, the oven 100 of the third embodiment is different from the oven 100 of the first embodiment and the second embodiment in that the vibrator 7 is not provided. In addition, the oven 100 of the third embodiment is different from the oven 100 of the first embodiment and the second embodiment in a configuration of the control board 8 related to the cleaning mode.

More particularly, in the cleaning mode for dropping the contaminant adhering to the cooking chamber inner wall 4, the control board 8 (the controller) may drive the heater 5 so that the temperature of the cooking chamber inner wall 4 is maintained at 350° C. or higher and 400° C. or lower for a predetermined holding time or longer while simultaneously driving the fan 61. That is, this embodiment differs from the conventional Pyro cleaning in that the fan 61 is driven when the inside of the cooking chamber 1 and the cooking chamber inner wall 4 are brought into a high temperature state. In addition, in this embodiment, the temperature of the inside of the cooking chamber 1 and the temperature of the cooking chamber inner wall 4 may be raised only to a temperature lower than 420° C. conventionally required for dropping the contaminant.

Figure 13:
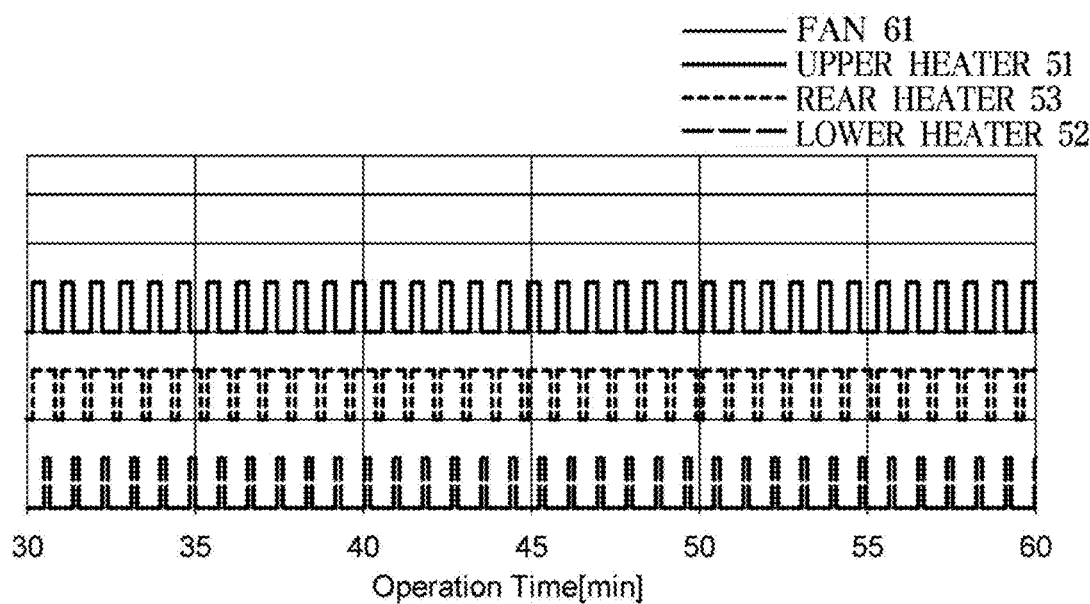
FIG. 13 is a schematic timing chart showing an operation of a heater and a fan according to the third embodiment.

More particularly, as shown in a timing chart of FIG. 13, the fan 61, the upper heater 51, the lower heater 52 and the rear heater 53 may be controlled by the control board 8 over a predetermined holding time of one hour or longer. As can be seen from FIG. 13, the fan 61 may be driven at all times, and constantly form an air flow in the cooking chamber 1 to uniformize a temperature. Each of the heaters constituting the heater 5 may be designed to perform periodic ON/OFF control. More particularly, the upper heater 51 and the lower heater 52 may be alternately driven so that their ON periods do not overlap. More particularly, the upper heater 51 may be designed so that the ON/OFF control in which the ON state maintains for 20 seconds in one cycle and the OFF state maintains for 32 seconds in one cycle is periodically performed. On the other hand, the lower heater 52 may be designed so that the ON/OFF control in the ON state maintains for 10 seconds in one cycle and the OFF state maintains for 42 seconds in one cycle is periodically performed. Further, a phase of a control period of the upper heater 51 and the lower heater 52 are different from each other. Therefore, the ON state of the lower heater 52 may be started from the time when the ON state of the upper heater 51 is finished. The rear heater 53 may be designed so that the ON/OFF control in which the ON state maintains for 40 seconds in one cycle and the OFF state maintains for 12 seconds in one cycle is periodically performed. A start time of the ON state of the rear heater 53 may be the same as a start time of the ON state of the upper heater 51. Therefore, while the upper heater 51 and the lower heater 52 are alternately turned to the ON state, the rear heater 53 may be always the ON state. Every 40 seconds, all the heaters may be turned to the OFF state for 12 seconds.

Figure 14:
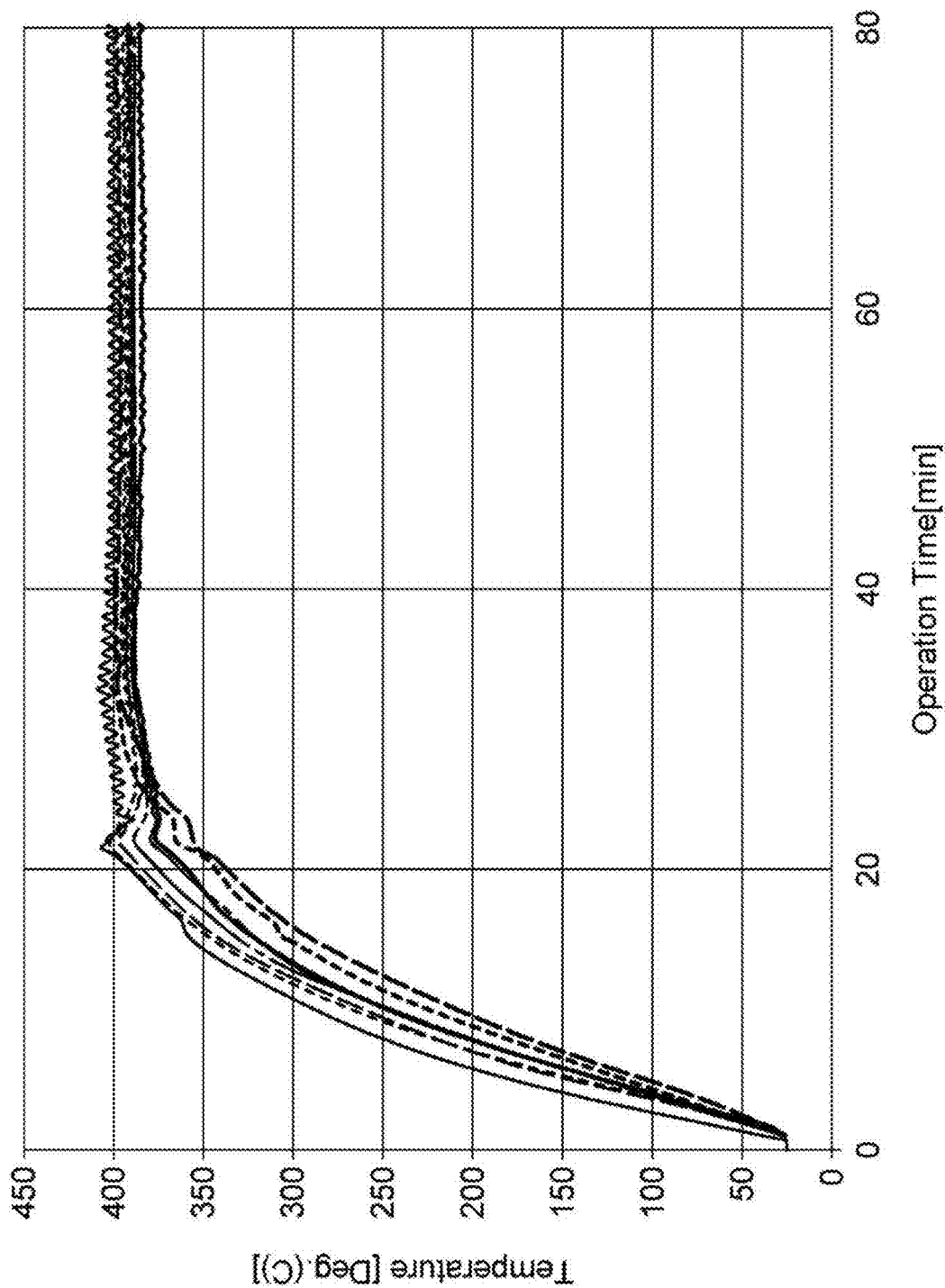
FIG. 14 is a graph showing a measurement result of changes in temperature over time at each point of the cooking chamber inner wall according to the third embodiment.
Figure 15:
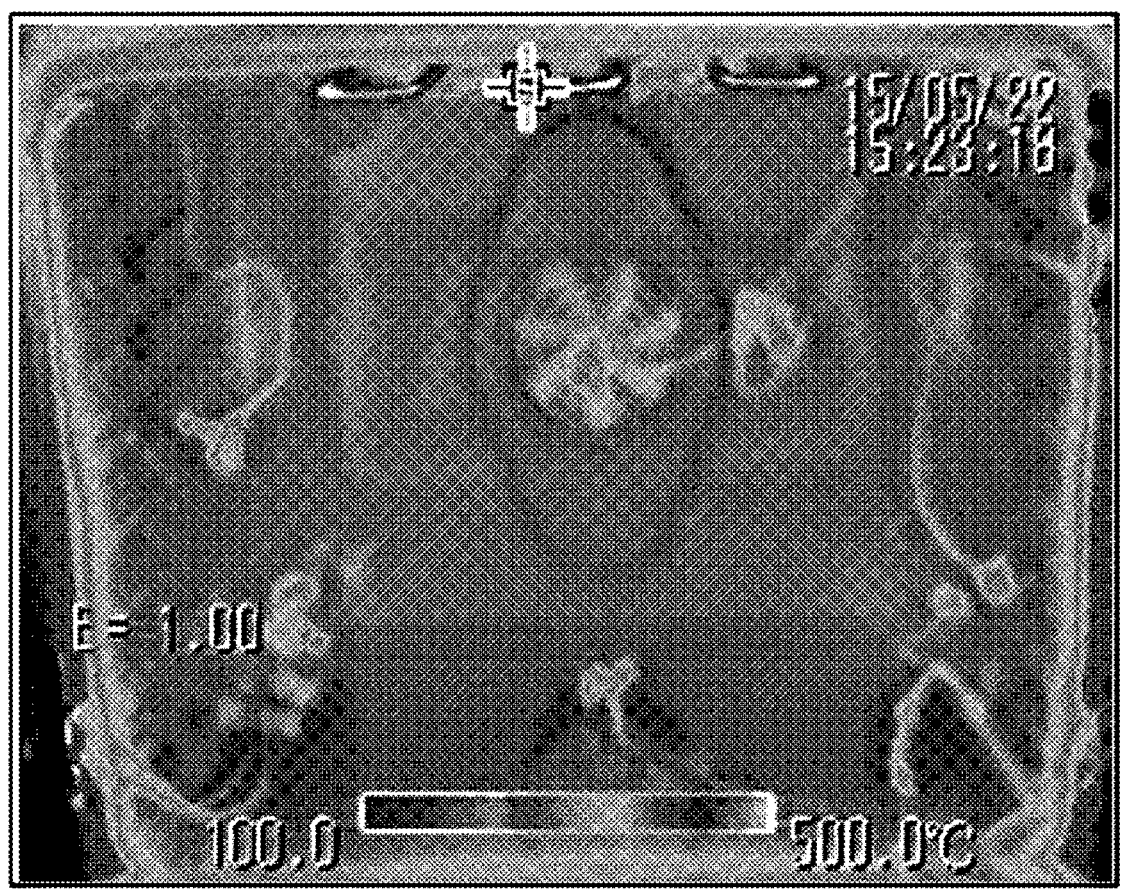
FIG. 15 is a thermography showing a temperature distribution of the cooking chamber inner wall according to the third embodiment.

Changes in the temperature of the cooking chamber inner wall 4 caused by the control of the heater 5 and the fan 61 will be described with reference to FIGS. 14 and 15. FIG. 14 is a graph showing a result of measurement of changes in temperature over time by installing a temperature sensor on each surface of the cooking chamber inner wall 4. FIG. 15 shows a result of measurement of temperature of the cooking chamber 1 and the cooking chamber inner wall 4 with a thermography.

As can be seen from FIGS. 14 and 15, in the cooking chamber inner wall 4, a temperature of each standing faces gradually rises from a start of the cleaning mode so that all the faces of the cooking chamber inner wall 4 are maintained substantially at a uniform temperature of 385° C. to 400° C.

Figure 16A:
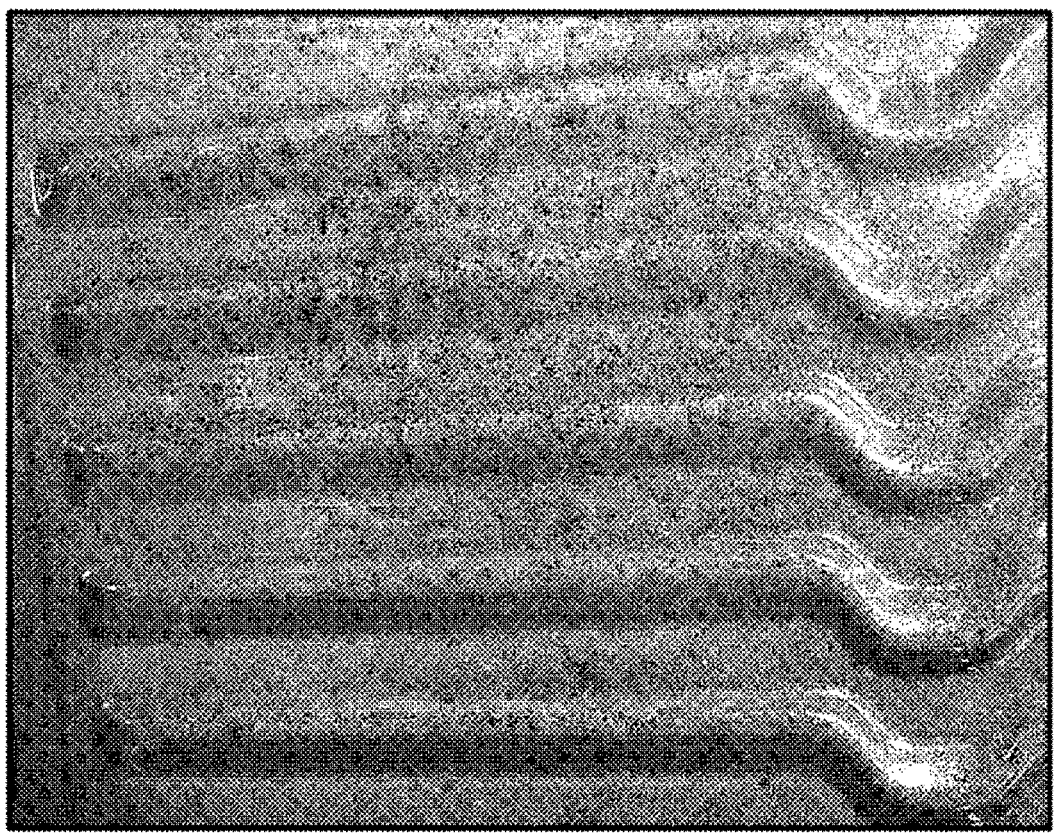
FIGS. 16A and 16B are comparison results showing an effect of a cleaning according to the third embodiment.
Figure 16B:
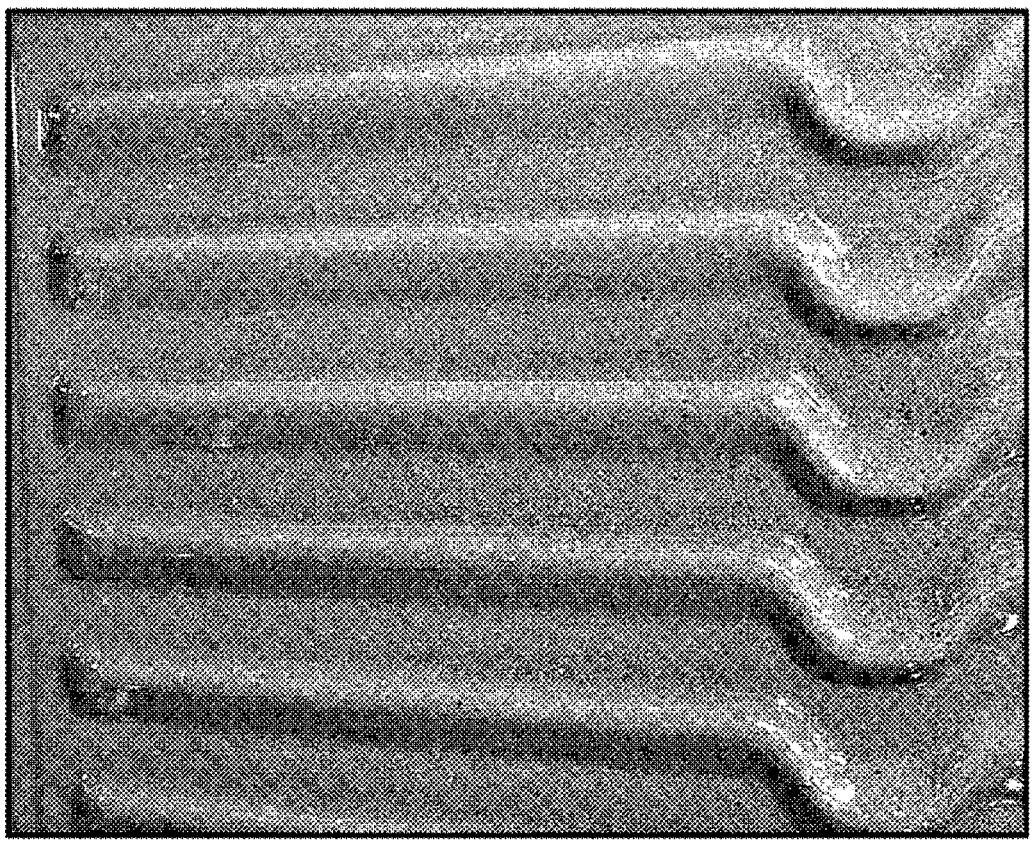

FIGS. 16A and 16B show a cleaning effect by maintaining such a temperature state for one hour or longer. FIG. 16A shows a state in which contaminants before cleaning are adhered to the cooking chamber inner wall 4 in a form of spots. By carrying out the above-described cleaning mode from this state, most contaminants can be dropped as shown in FIG. 16B. Further, in this cleaning mode, it is possible to drop the contaminants at temperature lower than 420° C., where the conventional Pyro cleaning is performed. Since the temperature of the cooking chamber inner wall 4 rises only up to 400° C., the liquid repellency of the coating film 43 may not be lost by the thermal deformation.

Next, a modification of the third embodiment will be described.

Figure 17:
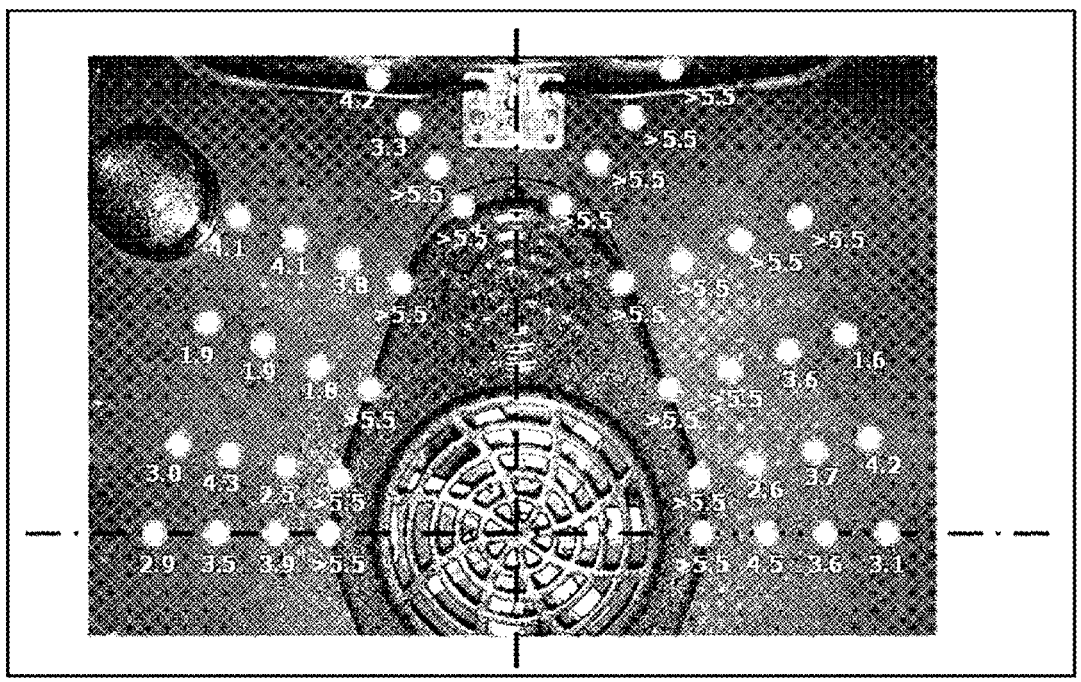
FIG. 17 is a schematic view showing distribution of wind speeds near cooking chamber inner wall according to a modification of the third embodiment.

In this modification, an air flow of at least 1 m/s or more may be formed by the fan 61 at a position 1 cm away from a standing face of the cooking chamber inner wall 4 as shown in FIG. 17.

Figure 18A:
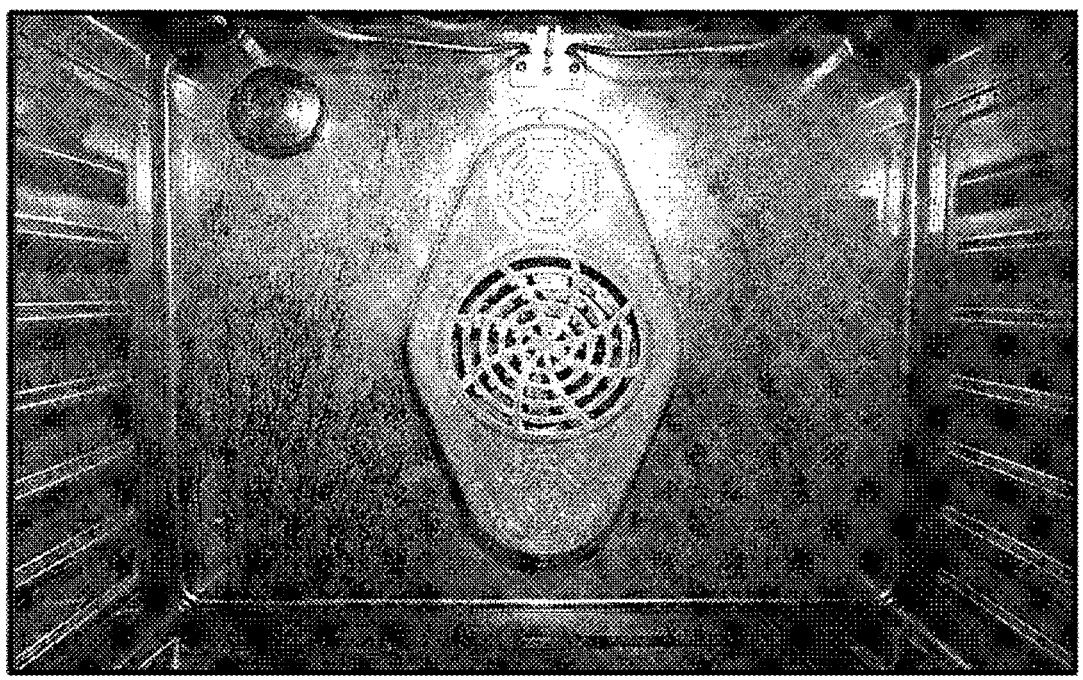
FIGS. 18A and 18B are comparison results showing an effect of a cleaning in the modification of the third embodiment.
Figure 18B:
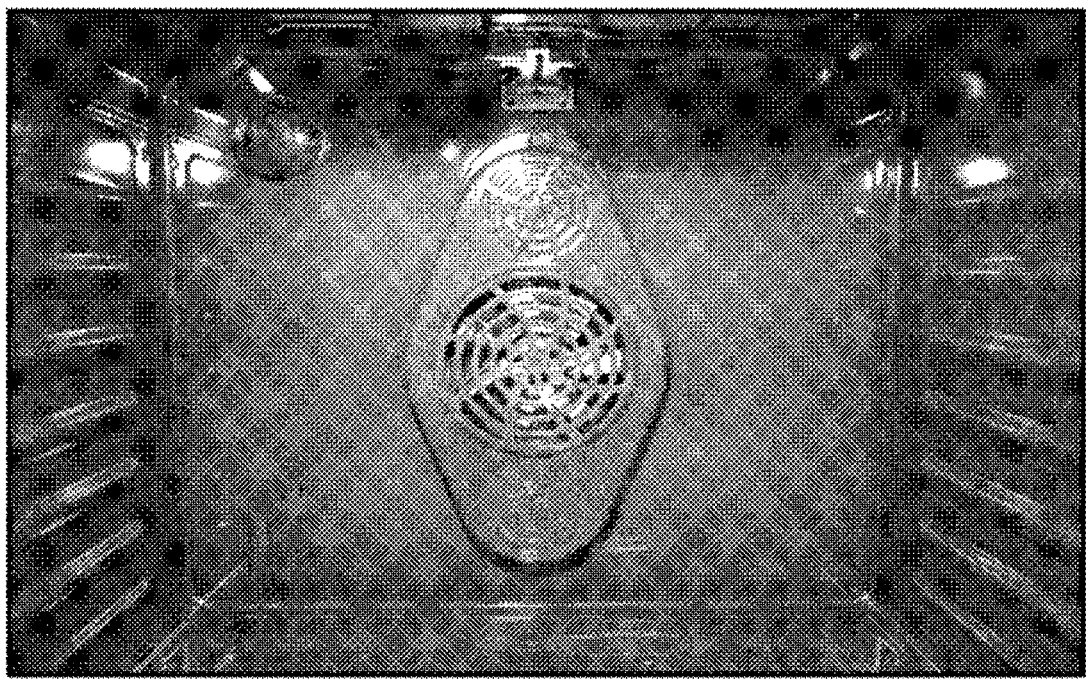

By maintaining a temperature of the cooking chamber inner wall 4 at 350° C. to 400° C. while forming such an air flow, as shown in FIG. 18A, an oil stain adhered to the rear surface of the cooking chamber inner wall 4 before the cleaning may be removed and become clean as shown in FIG. 18B. More particularly, in FIG. 17, it can be seen that the contaminants are completely removed in a portion where the air flow of 1 m/s or more is formed.

Figure 19:
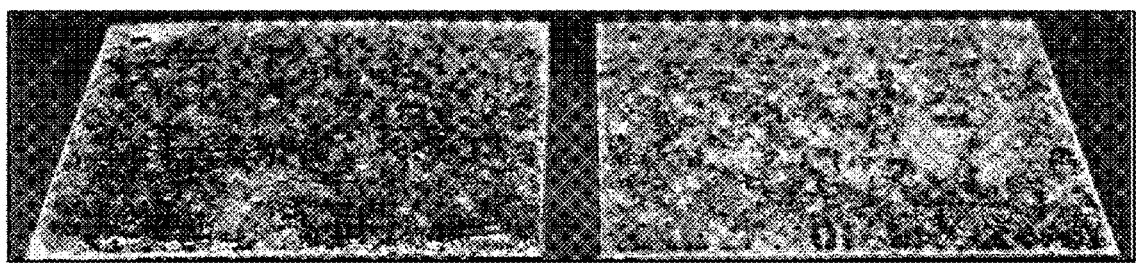
FIG. 19 is an experimental result showing a relationship between air flow and an effect of a cleaning according to the third embodiment.

Next, a verification experiment was conducted on an influence of an air volume. Two test specimens having the same configuration as the cooking chamber inner wall 4 were prepared, and the contaminants adhering to the test specimens due to an oil extracted from a chicken were reproduced. One test specimens was wrapped with aluminum foil to block contact with an air flow, and a surface of the other test specimens was brought into contact with the air flow. In this state, when held at 400° C. for 1 hour or more, the test specimen contacted with the air flow may have an area where an enamel portion is largely exposed since the contaminants were removed as shown in the tight side of FIG. 19, compared to the test specimen prevented to contact with the air flow as shown in the left side of FIG. 19. Therefore, it can be seen that in the cleaning mode, formation of the air flow in addition to merely heating is more effective to drop the contaminants well.

A modification of the third embodiment will be described.

The control of the heater 5 and the fan 61 is not limited to that described above, and PWM control or feedback control based on the output of a measurement sensor such as a temperature sensor or the like may be performed. Further, as shown in the third embodiment, when the feedforward control is performed, simplification and cost reduction of the oven are likely to be realized.

In the cleaning mode, a temperature of the cooking chamber 1 or the cooking chamber inner wall 4 may be suitably set within a range of 350° C. to 400° C. The upper limit of this temperature may be set as high as possible within a range in which the liquid repellency of the coating film is not lost. Further, by using the vibrator 7 in the first and second embodiments, the small vibration by the vibrator 7 may be further applied to the cooking chamber inner wall 4 in the cleaning mode.

<Oven Having Coating Film and Contaminant Collecting Portion>

An oven 100 according to a fourth embodiment of the present disclosure will be described with reference to the drawings. It should be noted that configurations corresponding to the configurations described in the above embodiments are denoted by the same reference numerals.

Figure 20:
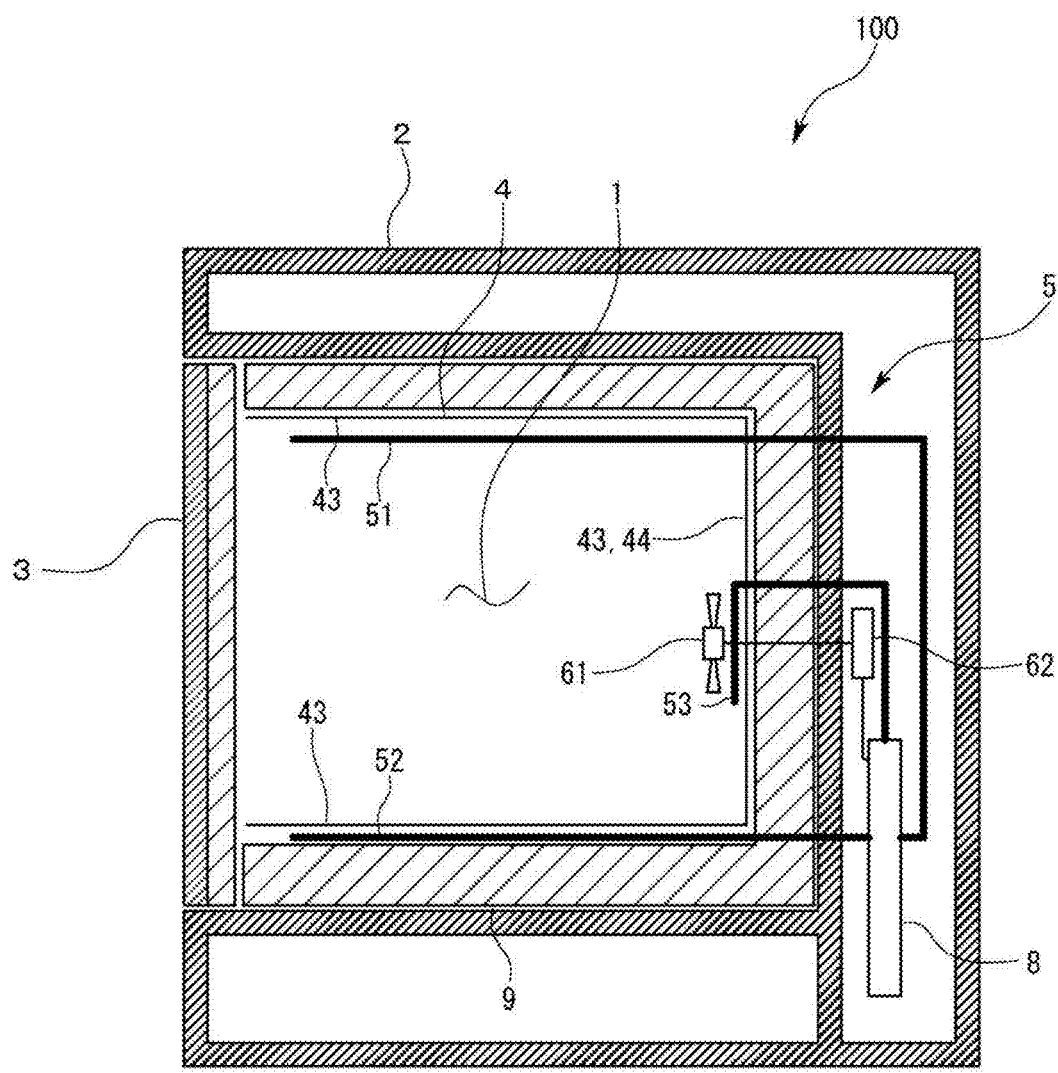
FIG. 20 is a schematic view showing a structure of an oven according to a fourth embodiment.

As shown in FIG. 20, the oven 100 may be configured such that the food to be cooked in received in the cooking chamber 1, and the food to be cooked is heated by the heater 5. Specifically, the oven 100 may include the main body 2 forming an appearance. The main body 2 may have a substantially rectangular parallelepiped shape with its front surface opened. Further, the oven 100 may further include the cooking chamber 1 provided inside the main body 2. The cooking chamber 1 may have a substantially rectangular parallelepiped shape with its front surface opened. The cooking chamber 1 may be defined by the cooking chamber inner wall 4. The cooking chamber inner wall 4 may include the upper face 4a, the lower face 4b, the right face, the left face, and the rear face 4c. Further, the oven 100 may further include the door 3 rotatably installed at the main body 2 to open or close the cooking chamber 1. The door 3 may be provided with the window so that the inside of the cooking chamber 1 can be checked from the outside. Further, the oven 100 may further include a heater 5 installed inside the cooking chamber 1 or near the cooking chamber 1. Further, the oven 100 may further include the fan 61 installed to convect or circulate air heated by the heater 5. Further, the oven 100 may further include the control board 8 for controlling the heater 5, the motor 62 for driving the fan 61.

The heater 5 may include the upper heater 51 installed in the upper portion of the inside of the cooking chamber 1, the lower heater 52 installed in the lower portion of the cooking chamber 1, and the rear heater 53 installed at the rear surface of the cooking chamber 1 with the fan 61. The upper heater 51 and the rear heater 53 may be installed to be exposed to the inside of the cooking chamber 1, and the lower heater 52 may be installed between the cooking chamber 1 and the main body 2. That is, the lower heater 52 may be installed on the outer side of the cooking chamber inner wall 4 and the inner side of the main body 2. In the present embodiment, the upper heater 51 corresponds to a main heater.

The oven 100 may further include the heat insulating material 9 disposed between the cooking chamber 1 and the main body 2. That is, the heat insulating material 9 may be disposed between the outer surface of the cooking chamber inner wall 4 and the inner surface of the main body 2. Further, the heat insulating material 9 may be disposed inside the door 3.

The oven 100 may further include the coating film 43 formed on at least a part of the cooking chamber inner wall 4. The oven 100 may further include a contaminant collecting portion 44 formed on at least a part of the cooking chamber inner wall 4. For example, the coating film 43 may be formed on a part of the cooking chamber inner wall 4, and the contaminant collecting portion 44 may be formed on the remaining part of the cooking chamber inner wall 4.

The heater 5, the fan 61 and the control board 8 may control a temperature and a temperature distribution inside the cooking chamber 1 in cooperation with each other. The present embodiment may be configured to perform a cooking mode in which a temperature of the cooking chamber inner wall 4 is about 350° C., and a cleaning mode in which the inside of the cooking chamber 1 is maintained at a temperature higher than that in the cooking mode for a predetermined time, a convection of the air inside the cooking chamber 1 is controlled by the fan 61 to remove contaminants adhering to the cooking chamber inner wall 4.

Hereinafter, a difference between a portion where the coating film 43 is formed and a portion where the coating film 43 is not formed and which functions as the contaminant collecting portion 44 in the fourth embodiment will be described. The coating film 43 may have the liquid repellency and have a surface energy of 0 mJ/m$^2$ or more and 20 mJ/m$^2$ or less. Further, the contaminant collecting portion 44 may have a smaller liquid repellency as compared with that of the coating film 43 and a surface energy of 25 mJ/m$^2$ or more. A difference in a surface energy of each surface may be set to be 5 mJ/m$^2$ or more. Further, the contaminant collecting portion 44 may be provided at a portion where a circulation of a hot air formed in the cooking chamber 1 by the fan 61 is first moved. In other words, the contaminant collecting portion 44 may be provided at a portion where an air circulating inside the cooking chamber 1 by the fan 61 is first hit. In the fourth embodiment, since the hot air is first applied to the cooking chamber inner wall 4 on the rear side of the cooking chamber 1 by the fan, a part of the cooking chamber inner wall 4 forming this rear face may be provided with the contaminant collecting portion 44 so as to collect a small oil droplet, which is generated and scattered from the food to be cooked. That is, the contaminant collecting portion 44 may be formed on the rear face 4c of the cooking chamber inner wall 4.

Figure 21:
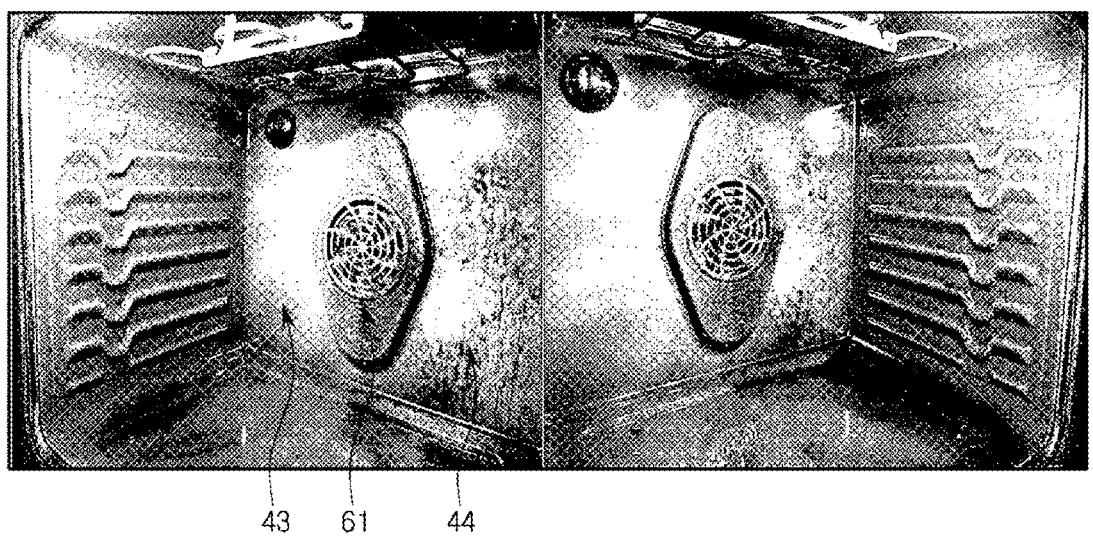
FIG. 21 is an experimental result showing an improvement of a contaminant preventing effect on a coating film by providing a contaminant collecting portion according to the fourth embodiment.
Figure 22:
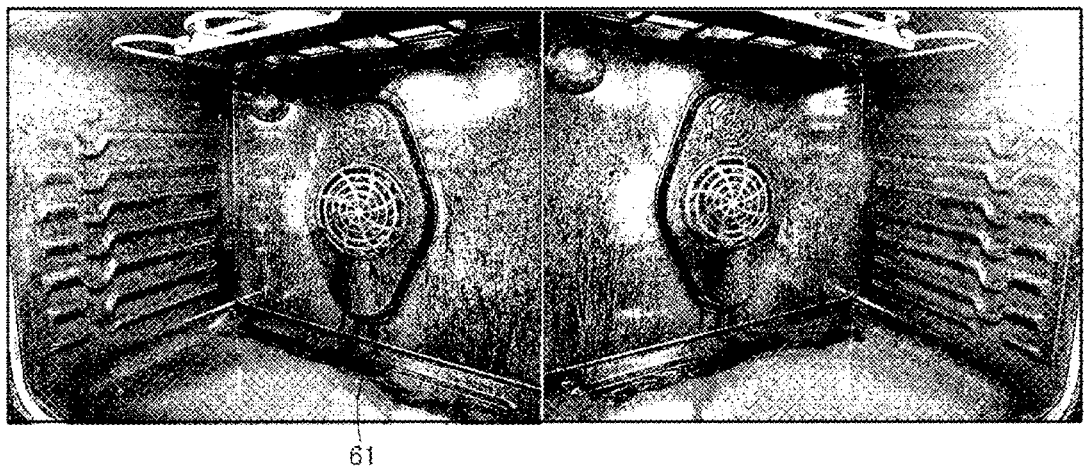
FIG. 22 is an experimental result showing a contaminant in a case in which a coating film is not formed in an oven.
Figure 23:
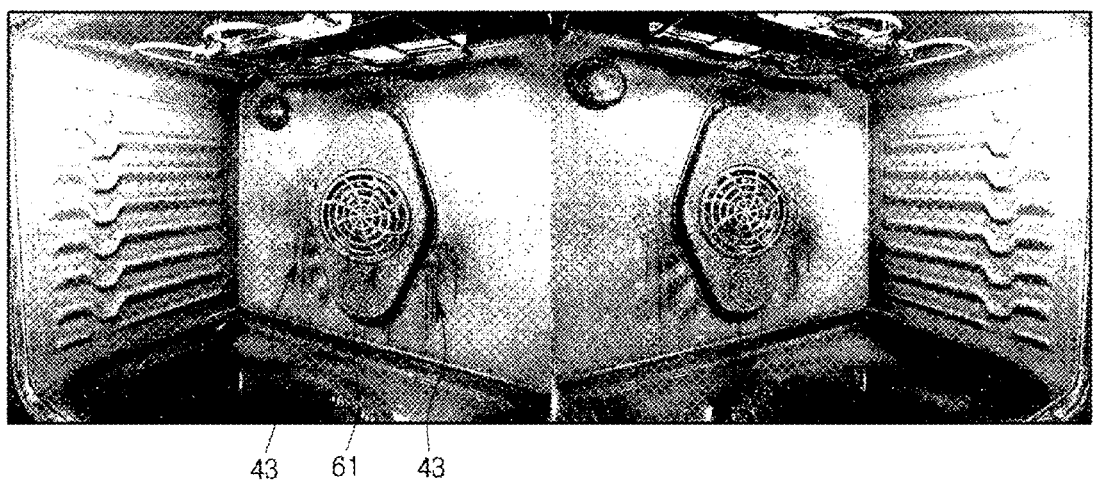
FIG. 23 is an experimental result showing a contaminant preventing effect in a case in which a coating film is formed on all surfaces in an oven.
Figure 24:
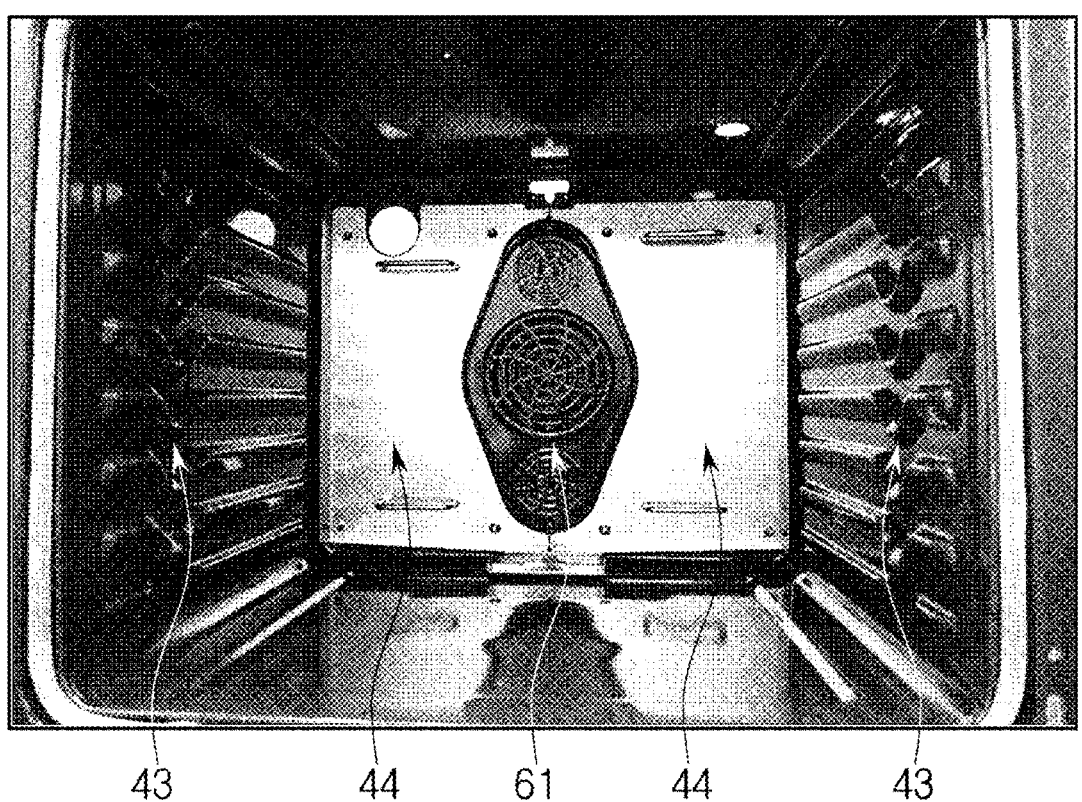
FIG. 24 is a view showing a contaminant collecting portion formed of a metal plate according to a first modification of the fourth embodiment of the oven.

The difference in a manner of contamination on the surface of the cooking chamber inner wall 4 in the oven of the fourth embodiment will be described with reference to FIG. 21. In an experimental example of FIG. 21, the coating film 43 was formed on the left side of the rear face of the cooking chamber inner wall 4, and the contaminant collecting portion 44 was formed without forming the coating film 43 on the tight side of the rear face of the cooking chamber inner wall 4. Then, a raw chicken was roasted as the food to be cooked at 230° C. for 1 hour. The cooking was repeated until the total number of the raw chicken reaches 20, and then a contaminant of the cooking chamber inner wall 4 was observed. As a result, as shown in FIG. 21, it can be seen that oil stains are hardly existed on the left side of the rear face where the coating film 43 is formed, but the oil stains are concentrated on the contaminant collecting portion 44. Further, in a case in which the coating film 43 is not formed on the cooking chamber inner wall 4 as shown in FIG. 22, the oil stains are generated on the entire surface when the raw chicken is cooked under the same conditions as in FIG. 21. Further, as shown in FIG. 23, when the coating film 43 is formed on the entire of the cooking chamber inner wall 4, a cleanliness of the entire of the cooking chamber inner wall 4 may become high. However, although the coating film 43 is formed near the fan 61, a small spot-shaped oil stain may be formed on the cooking chamber inner wall 4 forming the rear face. As can be seen from a comparison between contamination states shown in FIG. 21 and FIG. 23, the cleanliness may be improved not only by forming the coating film 43 but also by forming the contaminant collecting portion 44 instead of forming the coating film 43. As described above, the oven 100 of the fourth embodiment may be provided with the contaminant collecting portion 44 in the cooking chamber 1, so that a higher degree of cleanliness can be achieved over a long period than when the coating film 43 is formed on all the surfaces of the cooking chamber inner wall 4.

This is because of the following reasons. In other words, the oil droplets having a small diameter, which are not sufficiently repelled out by the liquid repellency of the coating film 43, may be deposited on the coating film 43 to finally form the small spot-shaped contaminants on the coating film 43 as shown in FIG. 23. On the other hand, when the contaminant collecting portion 44 is formed in parallel with the coating film 43 as in the fourth embodiment, the oil droplets having the small diameter may be collected in the contaminant collecting portion 44, so that the oil droplets having the small diameter may not be deposited on the coating film 43. Thus, an occurrence of spot-shaped contaminants may be prevented. This may make it possible to maintain the cleanliness of the coating film 43 over a longer period of time than when the entire surfaces are covered with the coating film 43.

Figure 25:
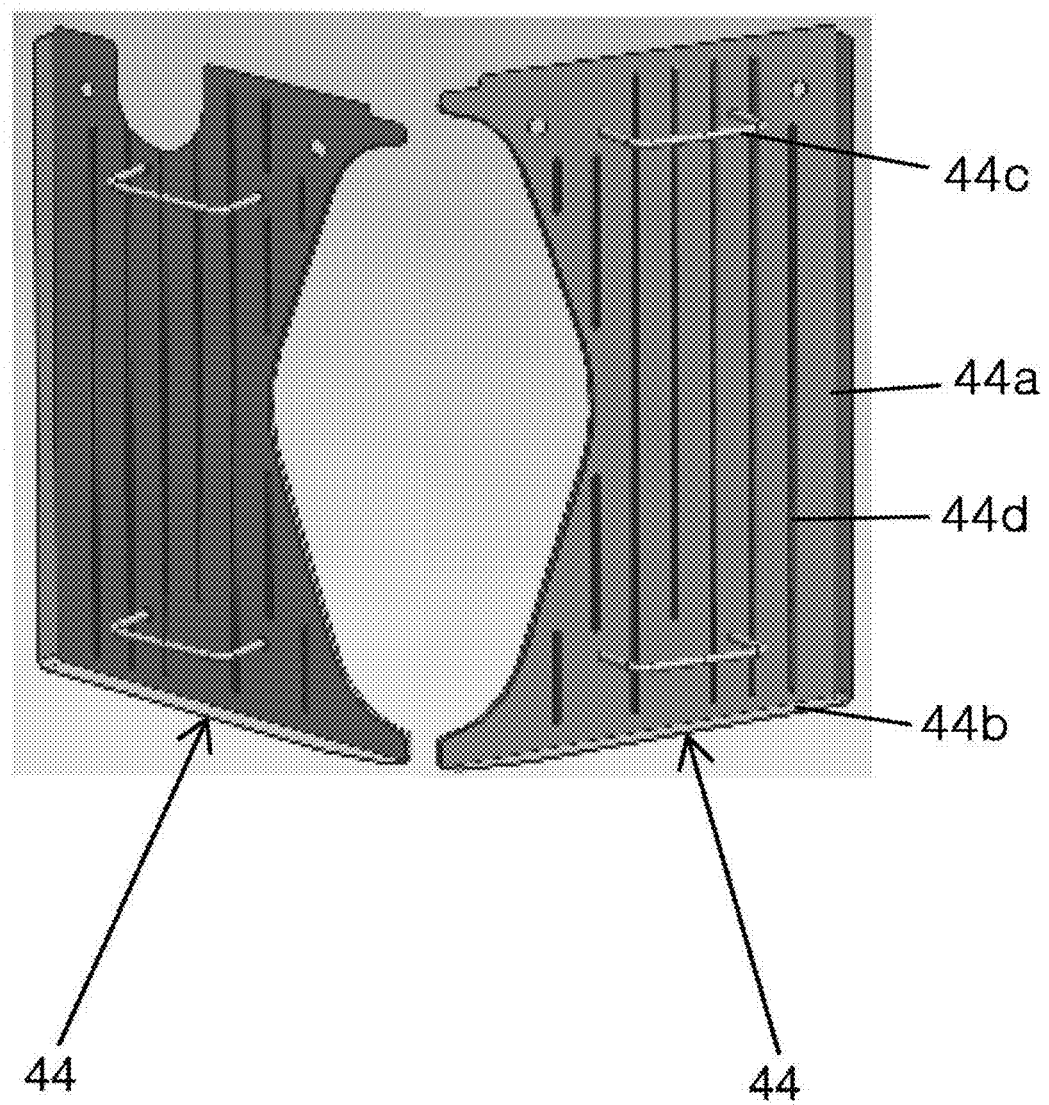
FIG. 25 is a schematic view showing a structure of the contaminant collecting portion according to the first modification of the fourth embodiment.
Figure 26:
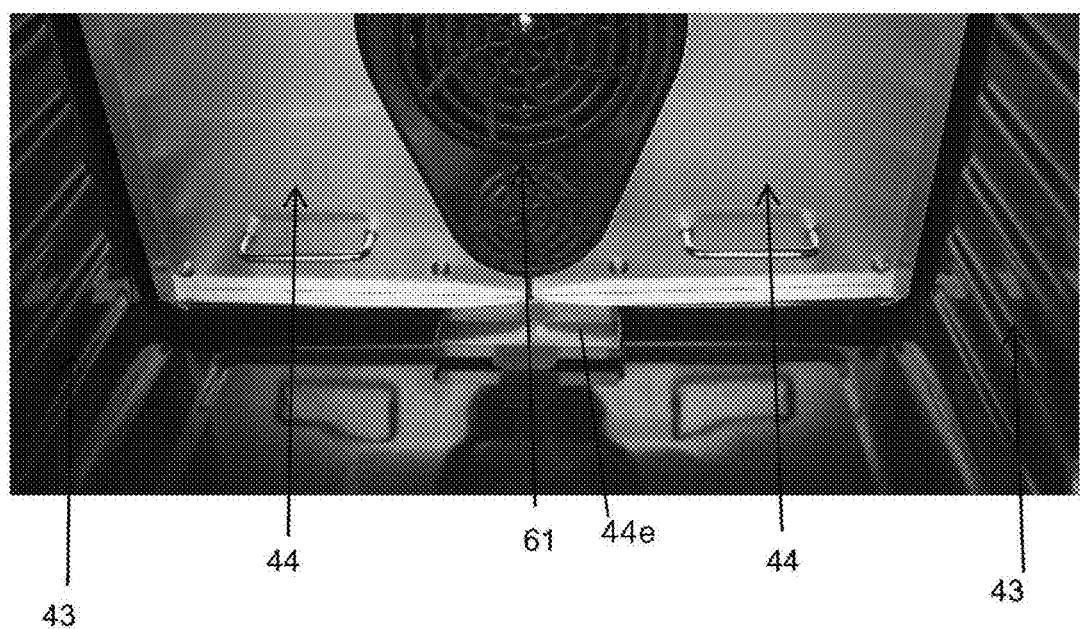
FIG. 26 is a view showing a groove and a waste liquid receiver of the contaminant collecting portion according to the first modification of the fourth embodiment.
Figure 27:
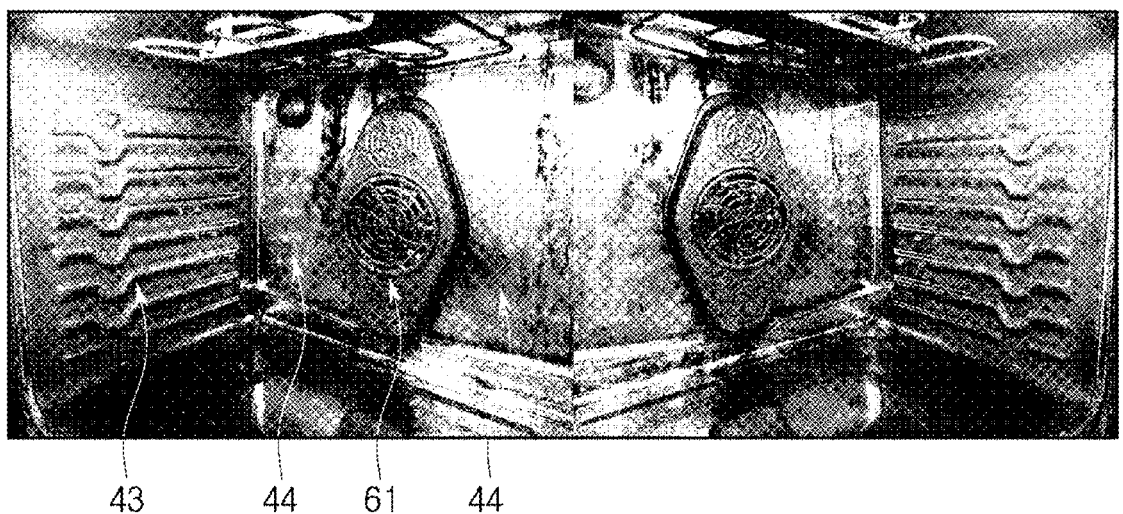
FIG. 27 is an experimental result showing a contaminant preventing effect according to the first modification of the fourth embodiment.

Next, a first modification of the fourth embodiment will be described. In the first modification, the coating film 43 may be not formed on the cooking chamber inner wall 4. Particularly, in the first modification, a metal plate on which the coating film 43 is not formed may be detachably disposed in the cooking chamber 1 instead of forming the contaminant collecting portion 44. More particularly, the contaminant collecting portion 44 according to the modification 1 may be provided in such a manner that an aluminum plate detachable by a magnet is standing on the cooking chamber inner wall 4 forming the rear face of the cooking chamber 1 and having the fan 61. The contaminant collecting portion 44 may include a body 44a detachably installed on one side of the cooking chamber inner wall 4, a groove 44b through which a liquid oil collected on a surface of the body 44a and gathered downward by gravity flows, and a waste liquid receiver 44e installed below the groove 44b to receive the oil corresponding to a waste liquid. At this time, the body 44a may be formed of a metal plate. Particularly, the body 44a may be formed of an aluminum plate. The groove 44b may be inclined so that the oil collected in the groove 44b can smoothly move toward the waste liquid receiver 44e. Further, as shown in FIG. 25, a guide rib 44d may be formed at the body 44a so as to guide the contaminants adhered to a surface of the body 44a to the lower portion of the cooking chamber 1. Further, the body 44a may be provided with a handle 44c for facilitating attachment or detachment of the contaminant collecting portion 44. The same experiment, as shown in FIGS. 21 to 23, was performed to the oven 100 of the modification 1, and a checking was performed to see if there is a contaminant in the oven 100 or not. As shown in FIG. 27, since the small oil is absorbed in the detachable contaminant collecting portion 44, a contaminant in a form of a small spot was not formed on the coating film 43 which is formed on the side face of the cooking chamber inner wall 4, and the cleanliness of the side face of the cooking chamber inner wall 4 was maintained.

Figure 28:
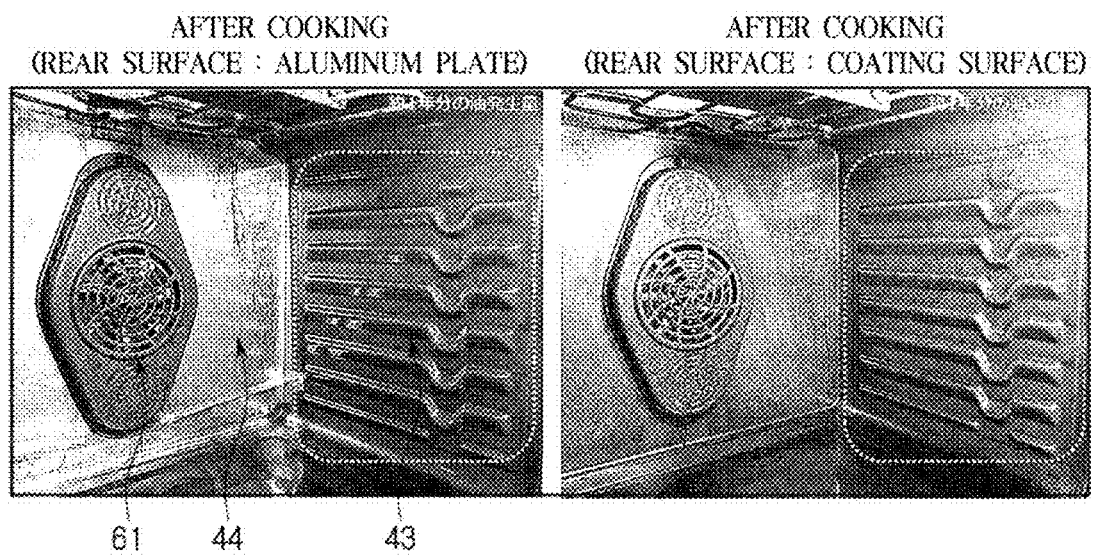
FIG. 28 is an experimental result showing a difference in the contaminant preventing effect according to the presence of the contaminant collecting portion according to the first modification of the fourth embodiment.

On the other hand, when the coating film 43 is formed on the entire cooking chamber inner wall 4, a contaminant due to a deposition of a small oil is also generated in a portion where the coating film 43 is formed as shown in FIG. 28.

The oven 100 of the modification 1 can prevent a spot-shaped contaminant from being deposited on the coating film 43 even in long-term use due to an effect of collecting a small oil of the contaminant collecting portion 44. In addition, the contaminant collecting portion 44 for collecting the contaminant can be separated from the inside of the cooking chamber 1 and can be easily cleaned. Therefore, an oil collecting effect by the contaminant collecting portion 44 can be simply restored, and an ability to maintain the cleanliness of the cooking chamber inner wall 4 can be continuously exhibited.

Further, with respect to the contaminant collecting portion 44, an experiment was performed to see if there is a collecting effect by materials having different surface energies. The experimental results are shown in Table 3.

TABLE 3

| material | liquid repellent coating | aluminum | SUS 430 | enamel | hydrophilic coating |
|---|---|---|---|---|---|
| surface energy (mJ/m$^2$) | 20 | 25 | 28 | 56 | 64 |
| oil stain collecting effect | no | yes | yes | yes | yes |

According to the above described comparison experiment, when the material's surface energy is 25 mJ/m$^2$, the material may be the contaminant collecting portion 44 because the material can exhibit the contaminant collecting effect. In other words, if a difference in surface energy between the contaminant collecting portion 44 and the coating film 43 is at least 5 mJ/m² or more, a generation of the small contaminant on the coating film 43 can be suppressed due to the contaminant collecting effect.

Figure 29:
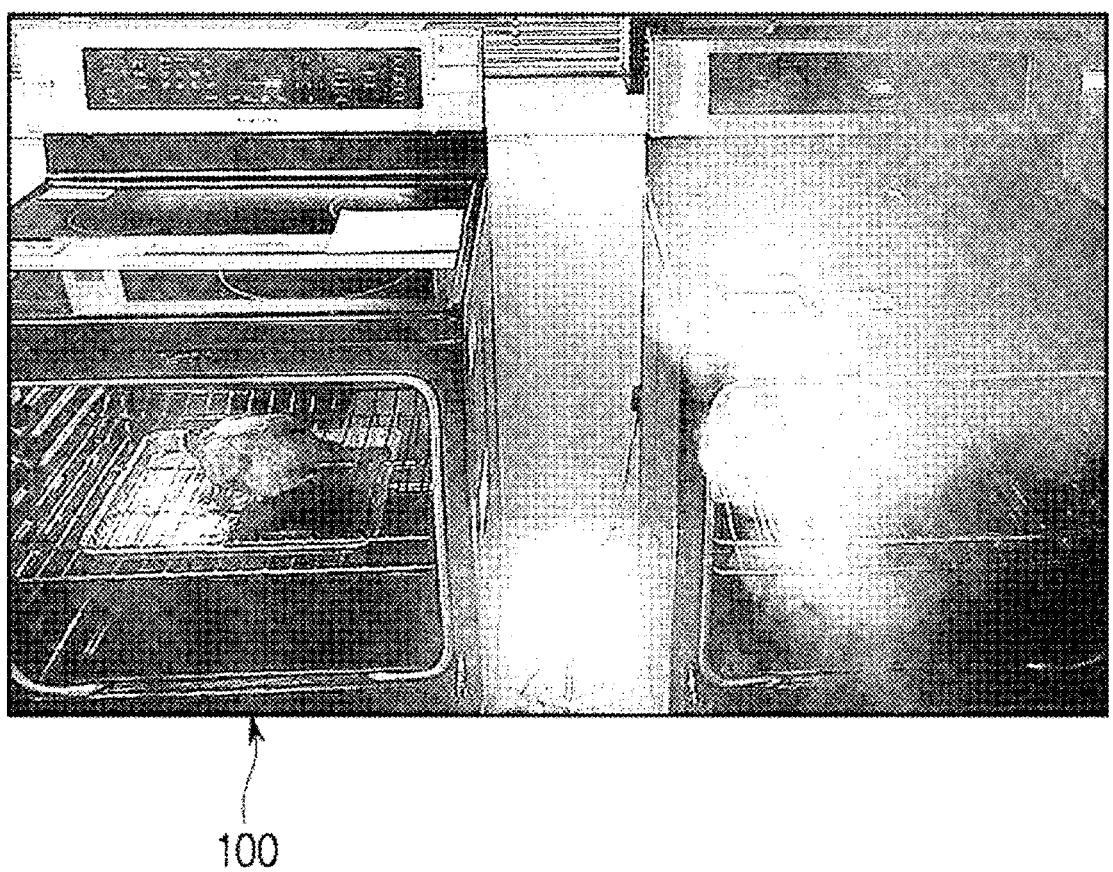
FIG. 29 is an experimental result showing a difference in the amount of smoke discharged to the outside according to the presence of the contaminant collecting portion according to the first modification of the fourth embodiment.

Further, if the contaminant collecting portion 44 is provided, even when the door is opened during cooking, the amount of smoke discharged to the outside can be reduced since a smoke generated from the food to be cooked is absorbed. FIG. 29 shows a difference in the amount of smoke between an oven 100 in which the contaminant collecting portion 44 is installed and an oven 100 in which the contaminant collecting portion 44 is not installed. At this time, the cooking is carried out under the same conditions in the two ovens, and the doors are opened at the same time in the of the cooking. The oven 100 provided with the contaminant collecting portion 44 on the left side in FIG. 29 has a smaller amount of smoke that is discharged to the outside than the oven 100 not provided with the contaminant collecting portion 44 on the right side in FIG. 29.

Figure 30:
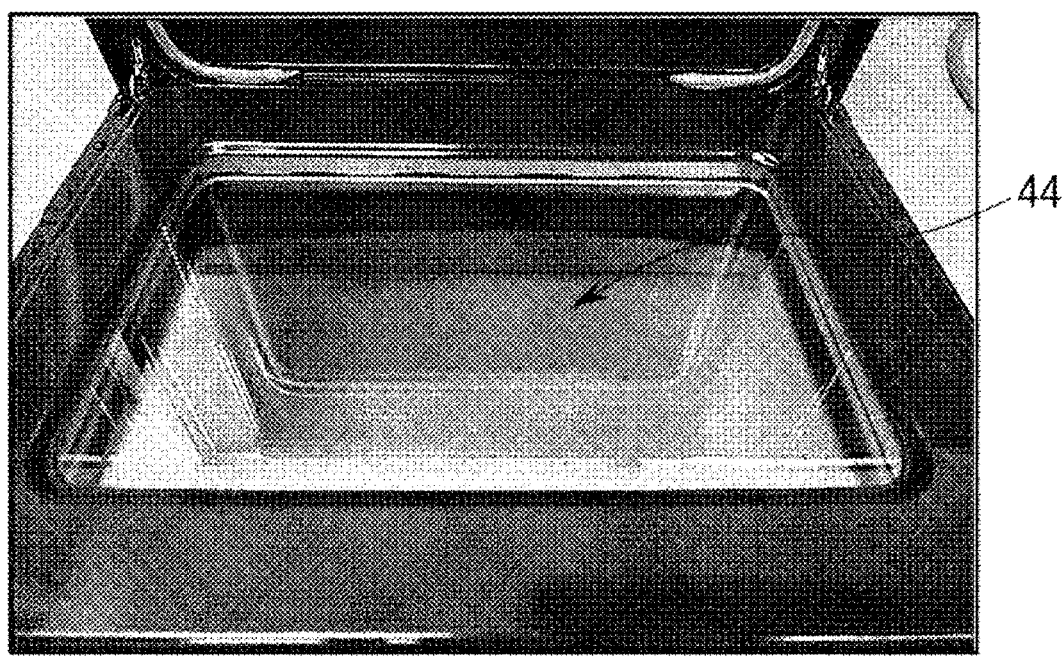
FIG. 30 is a view showing a contaminant collecting portion according to a second modification of the fourth embodiment.
Figure 31:
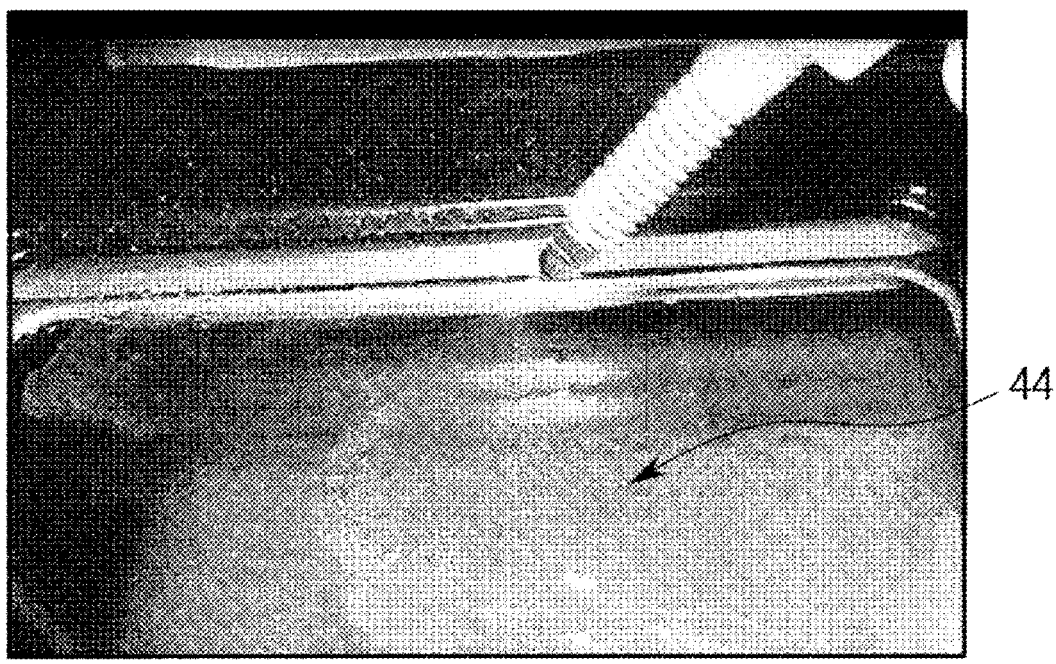
FIG. 31 is a schematic view showing a cleaning result according to the second modification of the fourth embodiment.

Next, a second modification of the fourth embodiment will be described. As shown in FIG. 30, in the second modification, the window of the door 3 of the oven 100 may be coated with a hydrophilic coating so as to exert a function as the contaminant collecting portion 44. Even in such a case, it is possible to prevent small oil droplet from being deposited on the coating film 43 and from being blackened to the spot-shaped contaminant, so that a cleanliness of the inside of the cooking chamber 1 can be maintained over a long period of time. Further, as shown in FIG. 31, the window of the door 3 where the contaminant is collected may be simply cleaned because the contaminant is floated just by flushing the window of the door 3.

Figure 32:
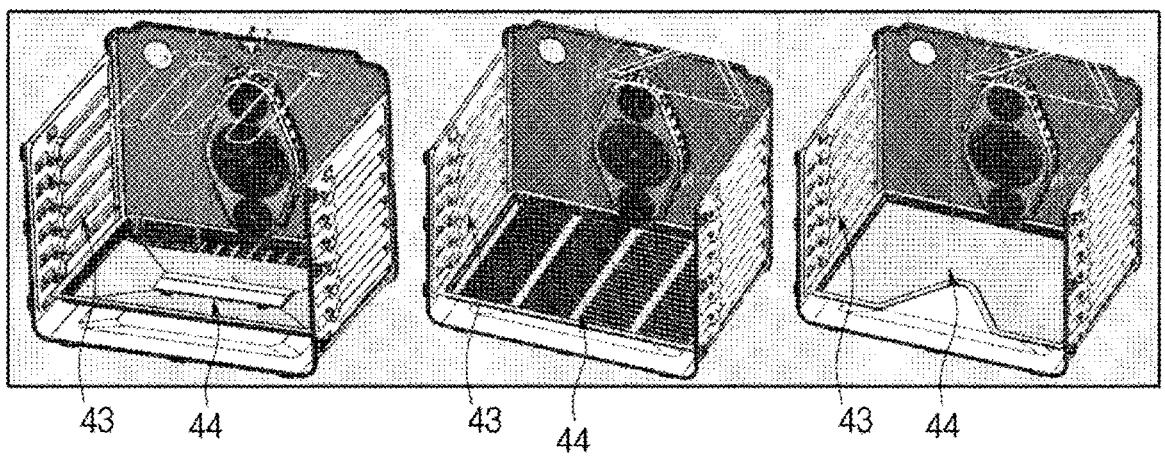
FIG. 32 is a view showing a contaminant collecting portion according to a third modification of the fourth embodiment.

Next, a third modification of the fourth embodiment will be described. In the foregoing embodiments, the contaminant collecting portion 44 is stood up in the cooking chamber 1. However, for example, as shown in FIG. 32, a metal tray on which the water repellent coating film 43 is not formed may be disposed at the lowermost end of the cooking chamber 1 of the oven 100. Even in this case, the contaminant can be collected in the metal tray, and the contaminant on the cooking chamber inner wall 4 on which the other coating film 43 is formed can be reduced. Further, in a case in which the metal tray is used, during a roasting in which the upper heater 51 is mainly used, the oil spouted from the food to be cooked can be prevented from contaminating the lower surface of the cooking chamber 1, and the falling oil can be received. During a baking in which the lower heater 52 is used, the metal tray may be removed so as not to interfere with the baking.

Next, a fourth modification of the fourth embodiment will be described. The fourth modification relates to an oven 100 in which a catalyst coating layer is formed as a contaminant collecting portion 44. In other words, the contaminant collecting portion 44 may include the catalyst coating layer. The catalyst coating layer may be formed by applying a thermal catalyst to a detachable component from the oven 100, and the contaminant collecting portion 44 may include such a catalyst coating layer. Particularly, Ag is used as a catalyst material and $MnO_2$ is used as a cocatalyst. A $SiO_2$ film having a thickness of nm order may be formed between a surface of a metal component of a basis material and the catalyst material. The $SiO_2$ may be formed of a low molecular weight based Silane coating agent including Silane coupling agent, Vinyl-Siloxane, Ethoxy-Aluminaphosphate and Alkyl-Aryl Siloxane, and Polysilazane based coating solution including PerHydro-Polysilazane (PHPS) or Organo-Polysilazane (OPSZ) as a main component.

Figure 33:
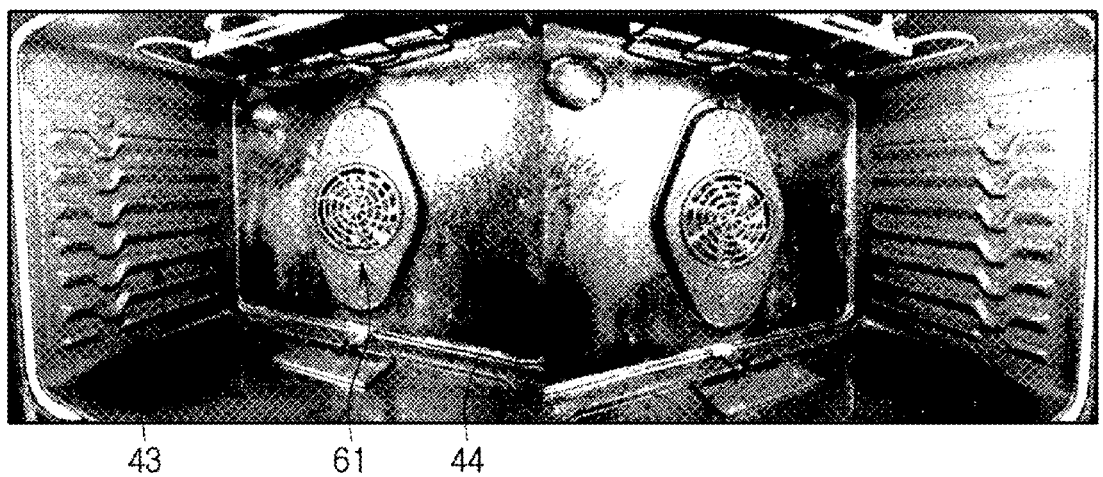
FIG. 33 is an experimental result showing a contaminant preventing effect by a contaminant collecting portion according to a fourth modification of the fourth embodiment.

Accordingly, by collecting the small oil droplets in the contaminant collecting portion 44, it is possible to prevent a contaminant in the form of black spot from being generated on the cooking chamber inner wall 4 on which the coating film 43 is formed by a deposition of the small oil. More, as shown in FIG. 33, since an oil stain is concentrated on the rear face of the cooking chamber inner wall 4 of the oven 100 on which the catalyst coating layer is formed, the contaminant may be hardly generated on the side faces of the cooking chamber inner wall 4 on which the coating film 43 having the liquid repellency is formed. Further, a contaminant in the contaminant collecting portion 44, that is, an oil stain of the catalyst surface, can be decomposed and cleaned by heating by the heater 5, for example, raising the temperature in the cooking chamber 1 to 380° C.

Further, a main component of the catalyst may include a noble metal, various catalyst metals (Ag, Pt, Pd, Au, Cu, Ru, Ti, Ni) and a material including at least one of these metal elements. In addition, the cocatalyst may include a metal oxide ($MnO_2$, $CeO_2$, $Al_2O_3$, $Bi_2O_3$, SnO, $TiO_2$, $Cr_2O_3$, $Co_2O_3$, $Fe_2O_3$, CuO, $ZrO_2$, SrO, LaO, $V_2O_5$, $Li_2O$, ZnO, MgO, NiO, CuO, BaO) and a compound including at least one kind thereof. In other words, the catalyst coating layer may include a catalyst including at least one of Ag, Pt, Pd, Au, Cu, Ru, Ti and Ni, and a cocatalyst including at least one of $MnO_2$, $CeO_2$, $Al_2O_3$, $Bi_2O_3$, SnO, $TiO_2$, $Cr_2O_3$, $Co_2O_3$, $Fe_2O_3$, CuO, $ZrO_2$, SrO, LaO, $V_2O_5$, $Li_2O$, ZnO, MgO, NiO, CuO and BaO.

Figure 34:
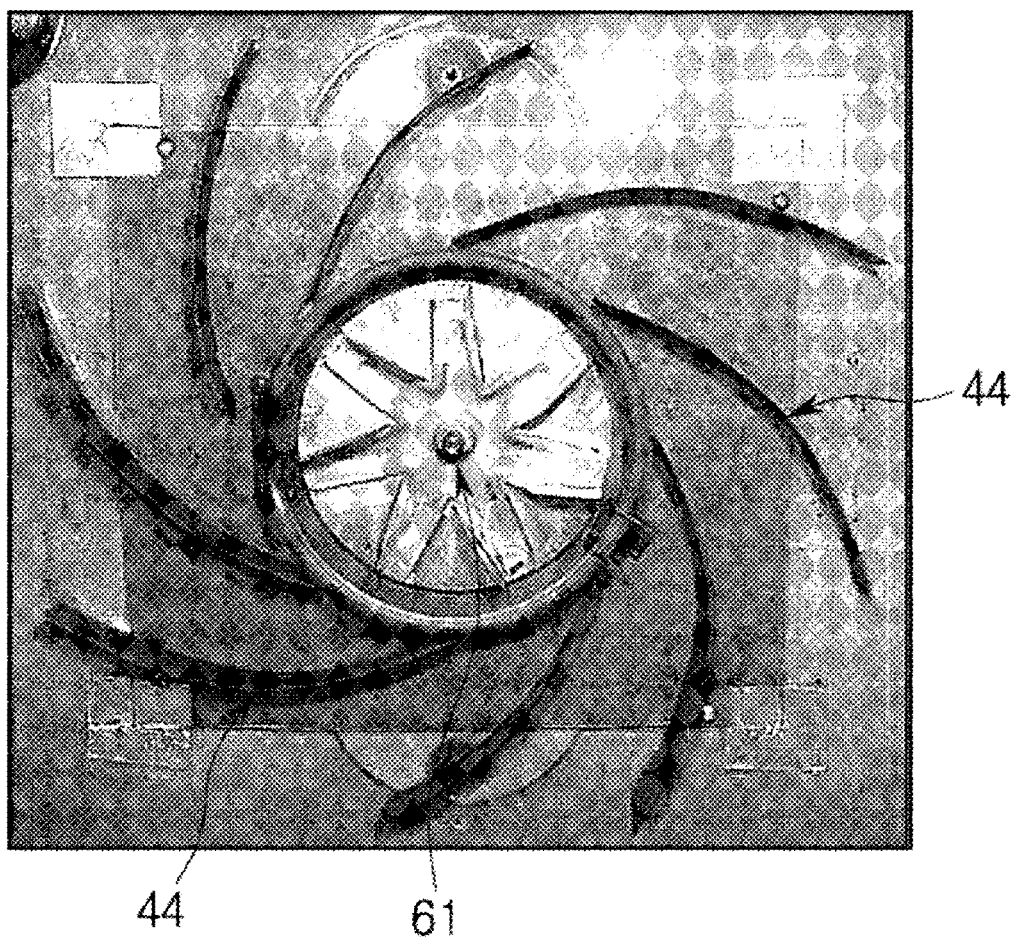
FIG. 34 is a view showing a vane as a contaminant collecting portion according to a fifth modification of the fourth embodiment.
Figure 35:
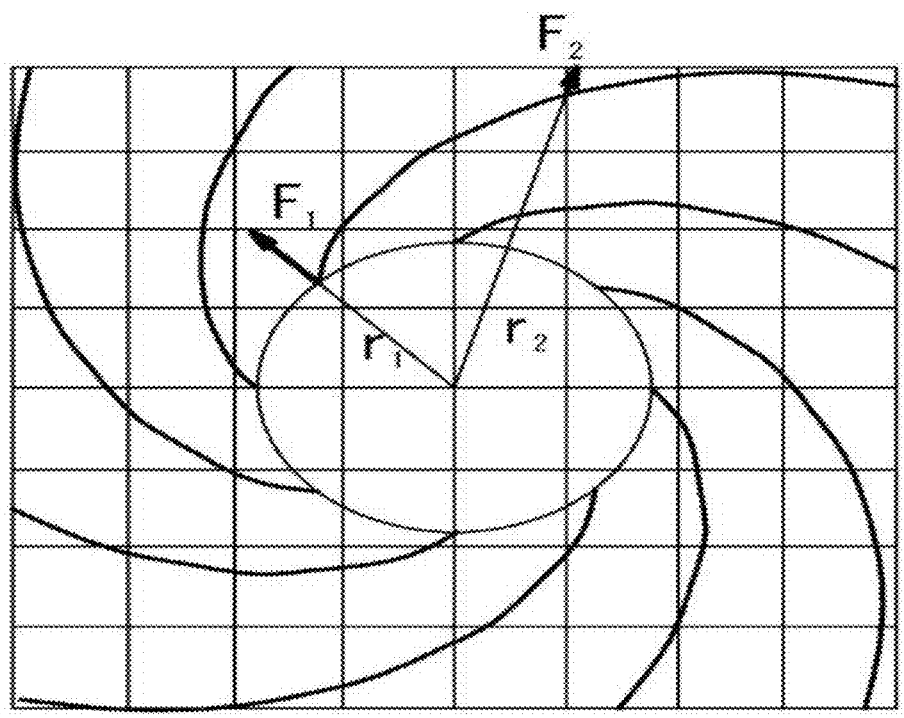
FIG. 35 is a schematic view showing a spiral curved shape of the vane according to the fifth modification of the fourth embodiment.
Figure 36:
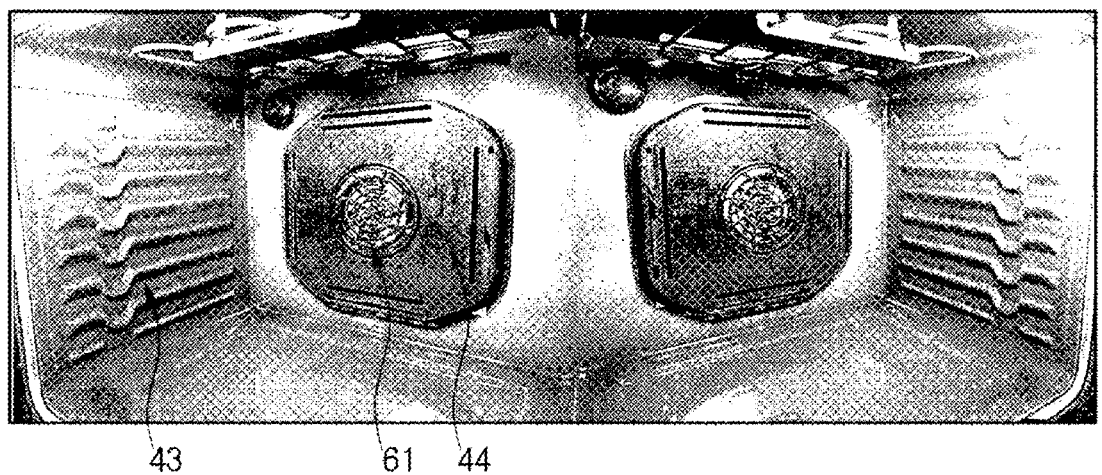
FIG. 36 is an experimental result showing a contaminant preventing effect by the vane according to the fifth modification of the fourth embodiment.

Next, a fifth modification of the fourth embodiment of the present disclosure will be described. In the fifth modification, a vane may be a contaminant collecting portion 44. As shown in FIG. 34, a plurality of vanes may be provided so as to stand perpendicularly to the cooking chamber inner wall 4 on which the fan 61 is installed and forming the rear face of the cooking chamber 1. The vane may be convexly formed with respect to an outer circumferential direction of the fan and may stand up with respect to the cooking chamber inner wall 4 provided around the fan 61. In addition, the vane may be configured to allow the air flow discharged from the fan 61 to move along the vane and to be gradually deflected tangentially from a centrifugal direction. That is, the contaminant collecting portion 44 may include a plurality of vanes installed along the outer circumferential direction of the fan 61 so that the air flow discharged from the fan 61 is gradually deflected in the tangential direction of the fan 61 from the centrifugal direction of the fan 61. More particularly, as shown in FIG. 35, each vane may be radially arranged by a helical curve centering on the fan 61. Each vane may be arranged at substantially equal intervals in the circumferential direction. In addition, a size and a length of each vane may be designed in consideration of air resistance so that an air volume is 23 to 26 L per a second. At this time, the air volume may be obtained by integrating an air flow rate distribution of an inlet port and a division area. As shown in FIG. 36, at the time of use, each vane may be accommodated in a case and may not be visible to the user.

In a case of the oven 100 constructed as described above, as shown in FIG. 36, even if the cooking is repeated over a long period of time, a small oil droplet contained in the air flow may be collected in the vane corresponding to the contaminant collecting portion 44, so that the oil may not be accumulated on the cooking chamber inner wall 4 on which the coating film 43 is formed. Therefore, it is possible to prevent an occurrence of a spot-shaped contaminant.

Figure 37:
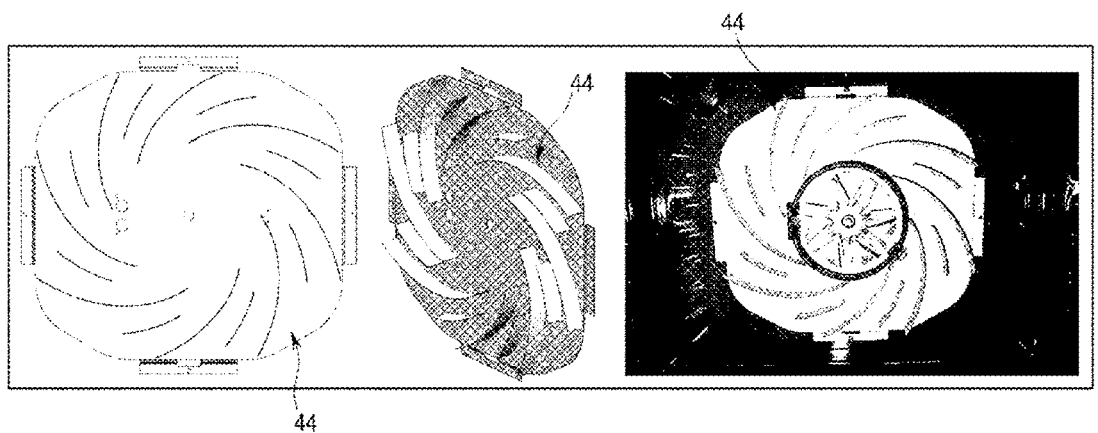
FIG. 37 is a view showing a vane of another example in the fifth modification of the fourth embodiment.
Figure 38:
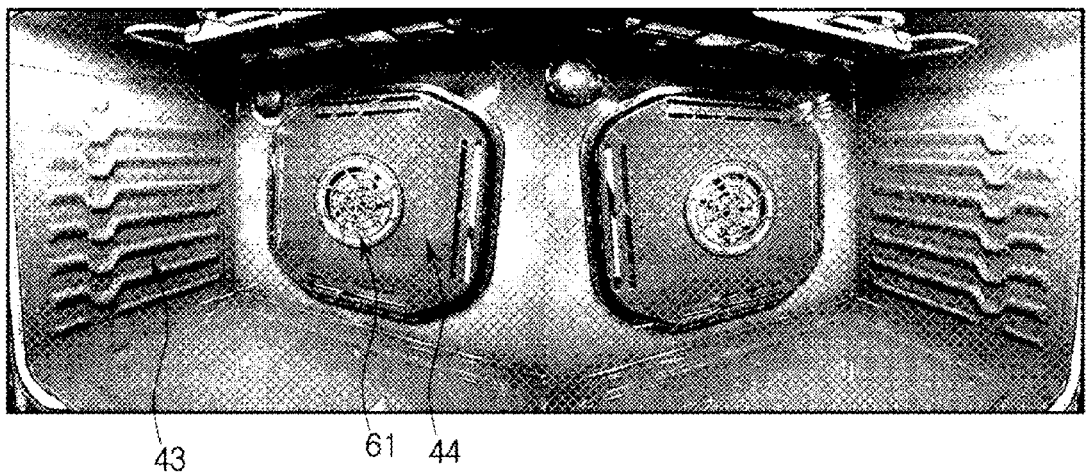
FIG. 38 is an experimental result showing a contaminant preventing effect by the vane of another example in the fifth modification of the fourth embodiment.

Next, another example of a vane will be described. A plurality of vanes may not be all formed in the same shape but a plurality of vanes having different lengths in a flow direction as shown in FIG. 37 may be arranged. More particularly, a long vane and a short vane may be alternately arranged along the circumferential direction of the fan 61. FIG. 38 shows a contamination state when 20 raw chickens were cooked using the vanes. As can be seen from a comparison between FIGS. 36 and 38, an amount of contaminant adhering to the side face and the rear face of the cooking chamber inner wall 4 corresponding to a periphery of a fan case may be smaller when the vanes having different lengths in the air flow direction are provided than when the same vanes are radially arranged. That is, by using the vanes having different lengths, it can be confirmed that a fact in that a collecting area increases, a fact in which a separation effect of the smoke is improved due to an improvement of a rectification effect of the air flow, and a fact in which a collecting effect of the air flow passing between the vanes at an outer peripheral part where a distance from a center becomes larger acts.

Figure 39:
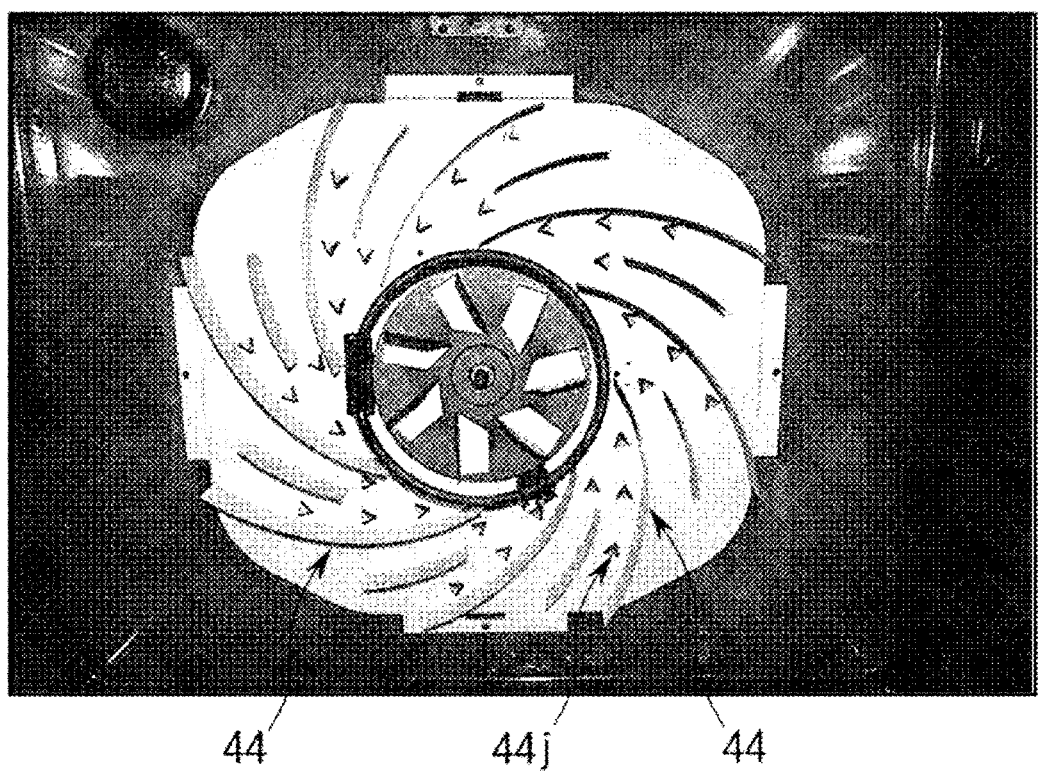
FIG. 39 is a view showing a vane of still another example in the fifth modification of the fourth embodiment.
Figure 40:
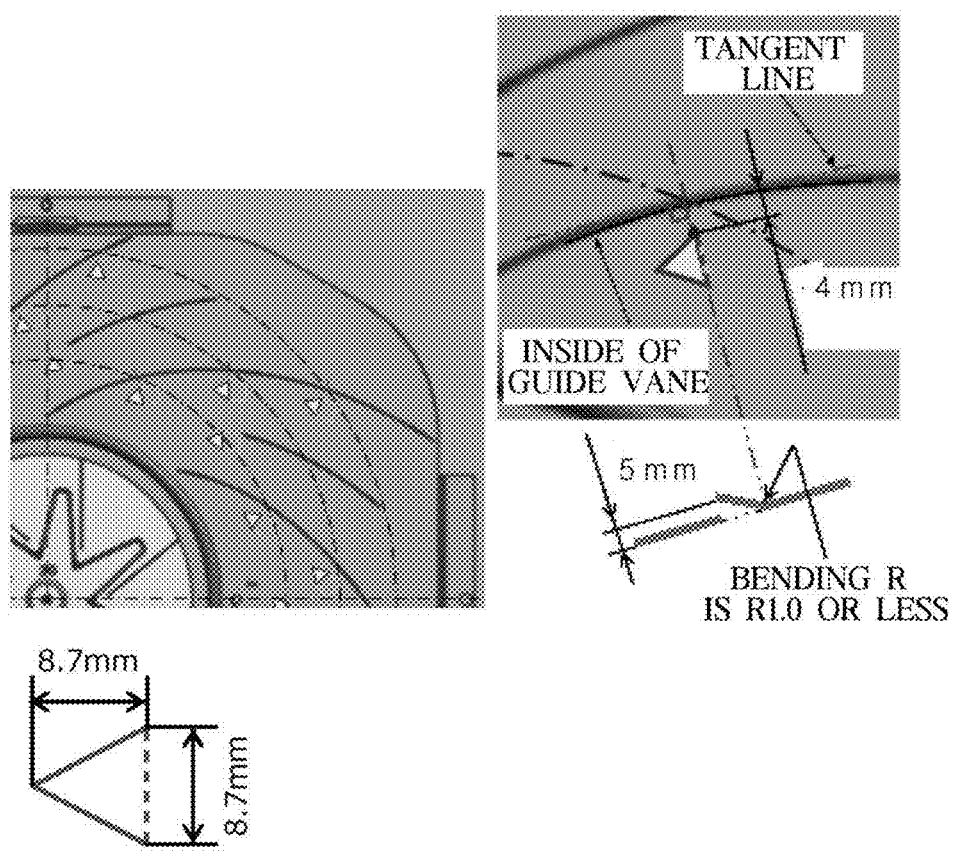
FIG. 40 is a view showing details of a vortex generator in still another example of the fifth modification of the fourth embodiment.

Next, still another example of a vane will be described. As shown in FIGS. 39 and 40, a plurality of protrusions 44j having a substantially triangular shape as a vortex generator may be provided between the vanes along the air flow direction. The protrusions 44j may be bent. A vortex may be generated in the air flow by the protrusions 44j, and the air flow passing between the vanes may collide with the vanes. As a result, oil droplets contained in the air flow can be easily collected in the vanes. The left drawing of FIG. 40 shows a position of the vortex generators, that is, a position of the protrusions 44j, in one quarter of the entire area. The central drawing of FIG. 40 shows a bending position. The right drawing of FIG. 40 shows a planar dimension of a bent portion. The detailed dimension may be determined by a relationship with a wind speed, an air flow width, and a spiral curve of the vane, but may be determined as shown in view of workability. But is not limited to the dimension shown.

Figure 41:
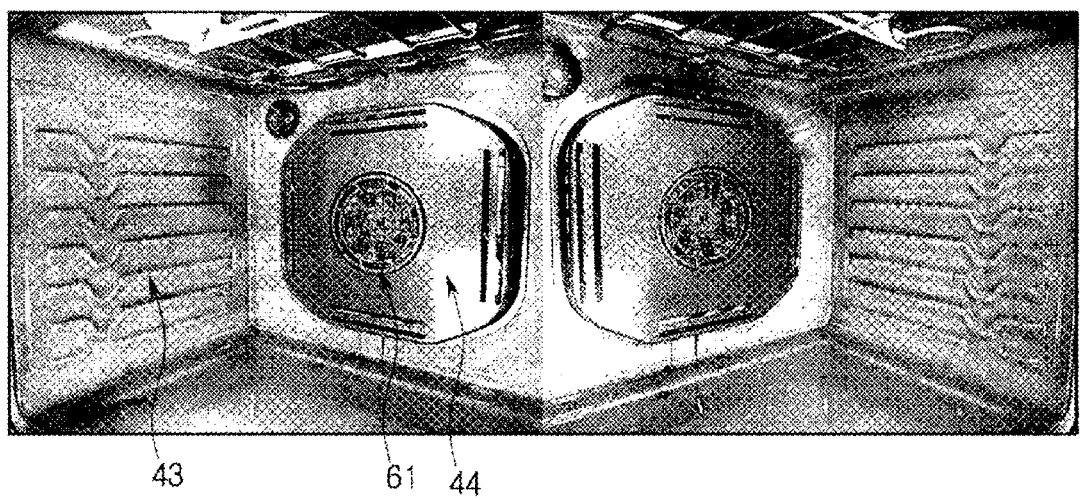
FIG. 41 is an experimental result showing a contaminant preventing effect by the vane of still another example in the fifth modification of the fourth embodiment.

When the vortex generator, that is, the protrusion 44j, is formed as described above, a collecting effect of a small oil droplet or the like in the vanes may be further enhanced as shown in FIG. 41. Therefore, it is possible to further prevent an oil stain from adhering to the cooking chamber inner wall 4.

Figure 42:
FIG. 42 is an experimental result showing a difference in a contaminant collecting effect according to the presence of the vortex generator according to the fifth modification of the fourth embodiment.

FIG. 42 shows a difference in the collecting effect of the contaminant depending on a presence or absence of the vortex generator, that is, the protrusions 44j. The left drawing of FIG. 42 is an experimental example in which the vortex generator, that is, the protrusions 44j, is not provided, and a support plate is planar, and the right drawing of FIG. 42 shows an experimental example in which the vortex generator, that is, the protrusions 44j, is provided. It is considered that a vortex was generated because a lot of contaminants were collected when the vortex generator was installed and contaminants adhered to two sides of a bent triangular plate (a surface which can be visually recognized from the drawing as a downstream side surface of a wind). Therefore, it can be seen that an installation position and the number of installations of the vortex generator can be changed and increased or decreased according to the optimization.

In addition, an example, in hick the catalyst coating layer is formed on the vane or the periphery of the vane in the above embodiment, and it can be cleaned in a cleaning operation mode involving heating when contaminants are accumulated in the inside of the fan case, will be described.

Figure 43:
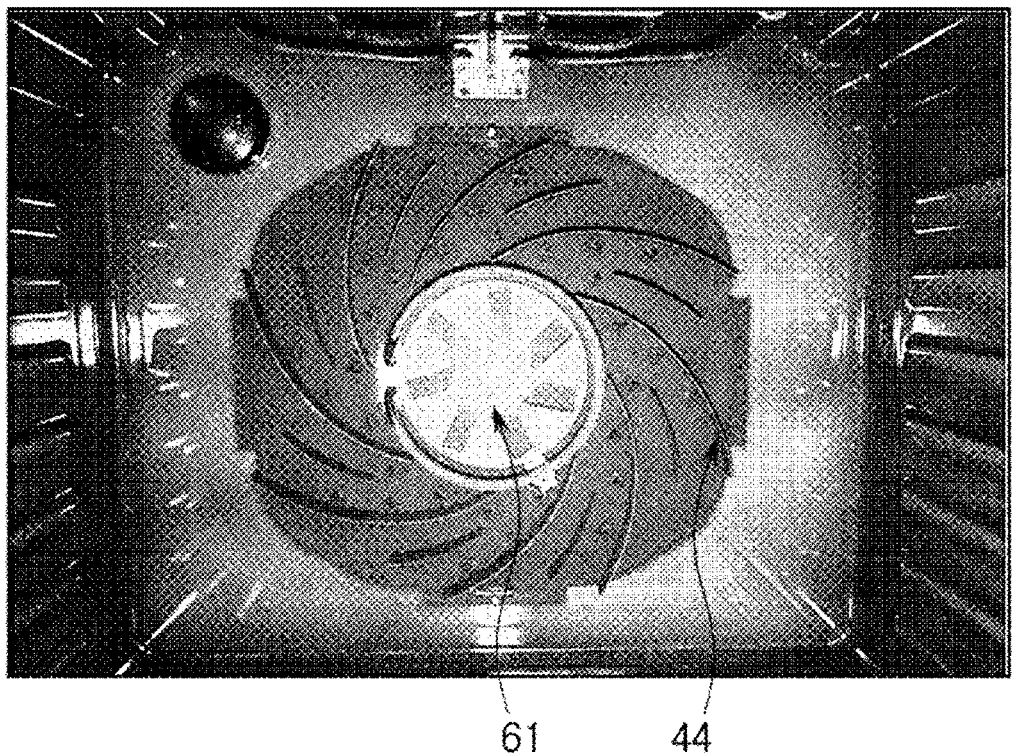
FIG. 43 is a view showing an example in which a catalyst coating layer is formed on the vane according to the fifth modification of the fourth embodiment.

FIG. 43 shows a state before the oven 100 is used. At this time, the oven 100 may include the contaminant collecting portion 44 composed of the vortex generator and the vane, and the catalyst coating layer formed on the vane or around the vane. The catalyst may be formed of a metal (Ag, Pt, Pd, Au, Cu, Ru, Ti, Ni) and a material containing at least one of these metal elements. In this example, Pt is used.

Figure 44:
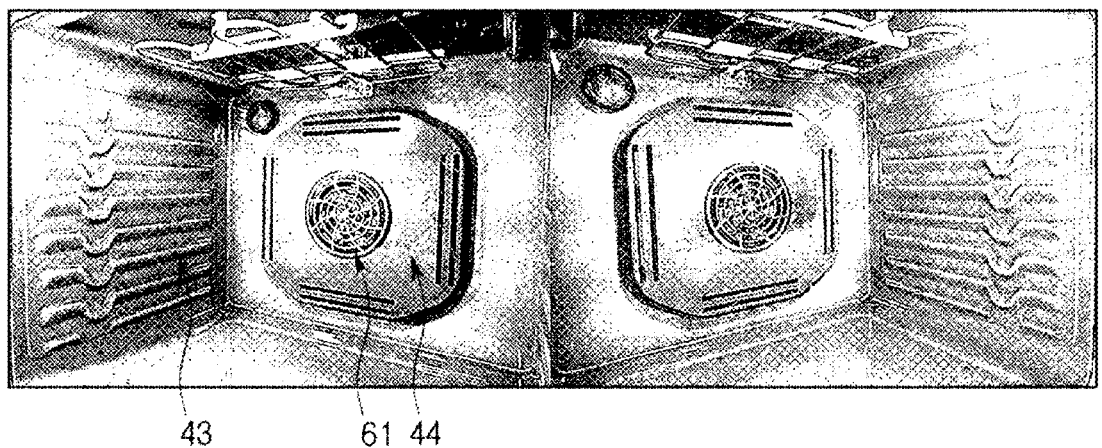
FIG. 44 is an experimental result showing a contaminant preventing effect in the middle of a case in which the catalyst coating layer is formed on the vane according to the fifth modification of the fourth embodiment.
Figure 45:
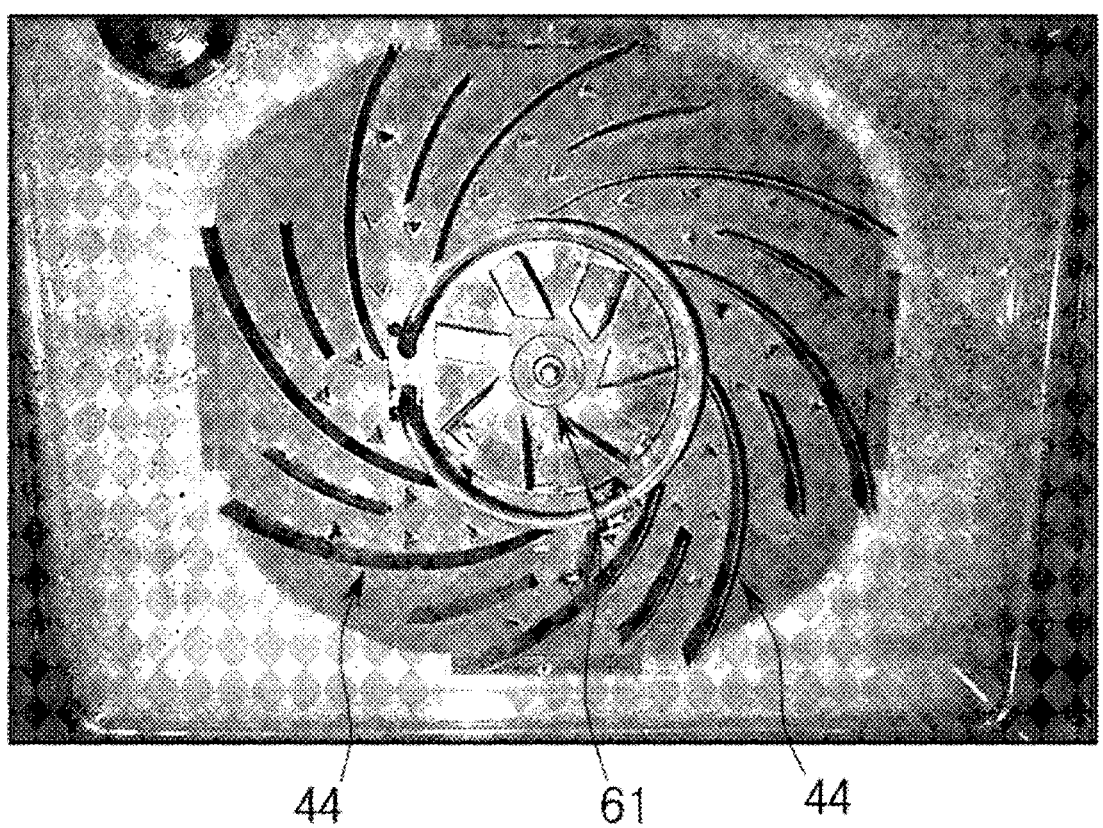
FIG. 45 is an experimental result showing a final contaminant preventing effect in a case in which the catalyst coating layer is formed on the vane according to the fifth modification of the fourth embodiment.

FIG. 44 shows a state when 20 raw chickens were cooked, and FIG. 45 shows a state when 40 raw chickens were cooked. From the drawings, it can be seen that a contaminant collecting effect dose not deteriorate for a long period of time because the catalyst coating layer is formed, and as a result, a cleanliness of the cooking chamber inner wall 4 is increased. In particular, in a comparison with FIG. 44, it can be seen that the contaminant was overwhelmingly less than when 20 raw chickens were cooked in a state in which the catalyst coating layer is not provided. Therefore, it can be seen that a capability of collecting contaminant is improved by at least two times by forming the catalyst coating layer. Further, in order to sufficiently exert an action of the catalyst coating layer, a content of Pt caused a remarkable effect at 220° C., which is the normal cooking temperature range.

Next, a cleaning method such as the vane or the like having the catalyst coating layer and a construction therefor will be described. The control board 8 may control the ON/OFF of the fan 61 by operating the heater 5 to heat the catalyst coating layer. As a result, the temperature at a portion where the catalyst coating layer is formed may become a temperature range of 250° C. or more and 400° C. or less. More particularly, the control board 8 may function to lower a duty of the fan in the cleaning than a duty of the fan in the normal cooking. In order to exert a decomposition function in the catalyst coating layer, for example, an ON/OFF control cycle may be 5 to 60 seconds, and an ON duty may be 16% to 20%. As a result of the experiment using Pt as the catalyst, that is, as shown in Table 4, a contaminant decomposition effect was confirmed under the above conditions.

TABLE 4

| | fan operation | | | |
|---|---|---|---|---|
| | off | on: 10 sec/ 60 sec | on: 1 sec/ 5 sec | on: 0.5 sec/ 5 sec |
| Fan case surface temperature | 280 or more | 280 or more | 280 or more | 280 or more |
| Difference between fan case surface temperature and inside of cooking chamber set temperature | 60 or more | 60 or more | 60 or more | 60 or more |
| Internal vane temperature | about 220 | variation between about 230 to 260 | about 270 | about 220 |
| Difference between fan case surface temperature and inside of cooking chamber set temperature | no | 10 to 50 | about 50 | no |
| Variation of internal vane temperature | no | yes | no | no |
| Decomposition of contaminant on surface of fan case | possible | possible | possible | possible |

TABLE 4-continued

| | fan operation | | | |
|---|---|---|---|---|
| | off | on: 10 sec/ 60 sec | on: 1 sec/ 5 sec | on: 0.5 sec/ 5 sec |
| Decomposition of contaminant of internal vane | impossible | possible (low efficiency) | possible | impossible |

In such a case, it is convenient to use because it does not require a special cleaning operation. If it is possible to set at a locally high temperature and include the catalyst material described above, that is, the noble metal (Ag, Pt, Pd, Au, Cu, Ru, Ti, Ni) and the material containing at least one kinds of the metal elements, particularly, Pt is not contained, a cleaning may be possible in the normal operation mode.

Figure 46:
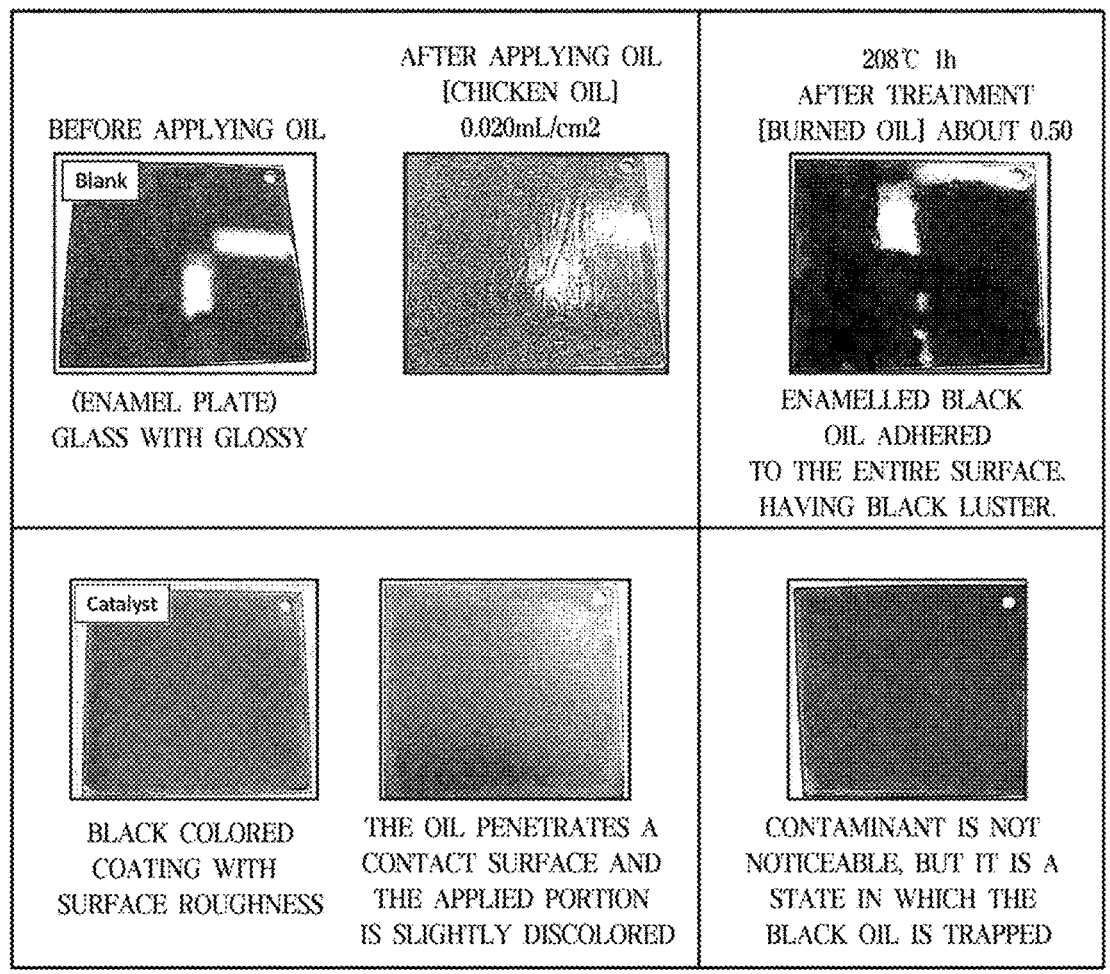
FIG. 46 is a view showing an experimental configuration example for obtaining a relationship between a decomposition effect of a contaminant by a catalyst coating layer and a temperature.
Figure 47:
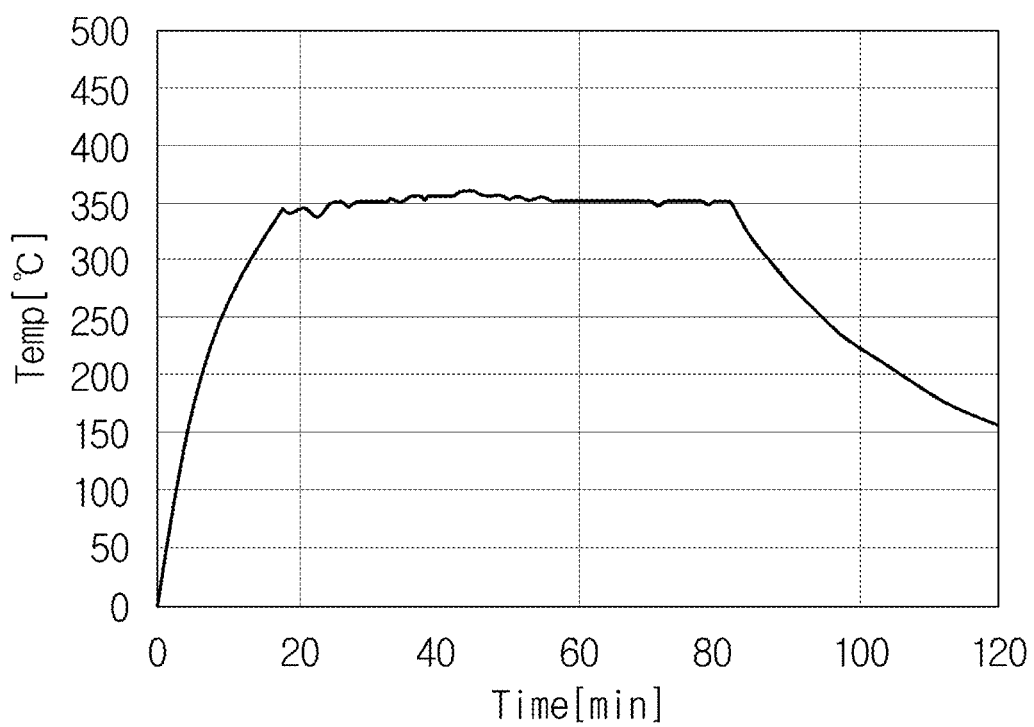
FIG. 47 is a view showing a temperature profile in the experimental configuration example for obtaining the relationship between the decomposition effect of the contaminant by the catalyst coating layer and the temperature.

Next, it shows an example in which a decomposition of an oil stain is possible in a temperature range of 400° C. or lower when a $SiO_2$ film, which has a thickness of nm-order and is made of a Polysilazane based coating solution, is disposed between a catalyst containing Ag and the $MnO_2$, as the cocatalyst, and a surface of a metal component of a material. As shown in FIG. 46, an oil stain fixedly adhered on a surface of the catalyst and a surface of an enamel as a comparative object was generated randomly. Further, a temperature environment in the cooking chamber 1 was realized with a temperature profile shown in FIG. 47, and a decomposition speed of the oil stain was compared with the conditions. FIG. 47 shows a case in which a set temperature in the cooking chamber 1 is 350° C. It has been confirmed that a temperature fluctuation, when the high temperature is maintained, is minimized by the ON/OFF control of the heater 5. However, if an average temperature is the same even if there is variation, it is expected that no large difference will occur in the result.

Figure 48:
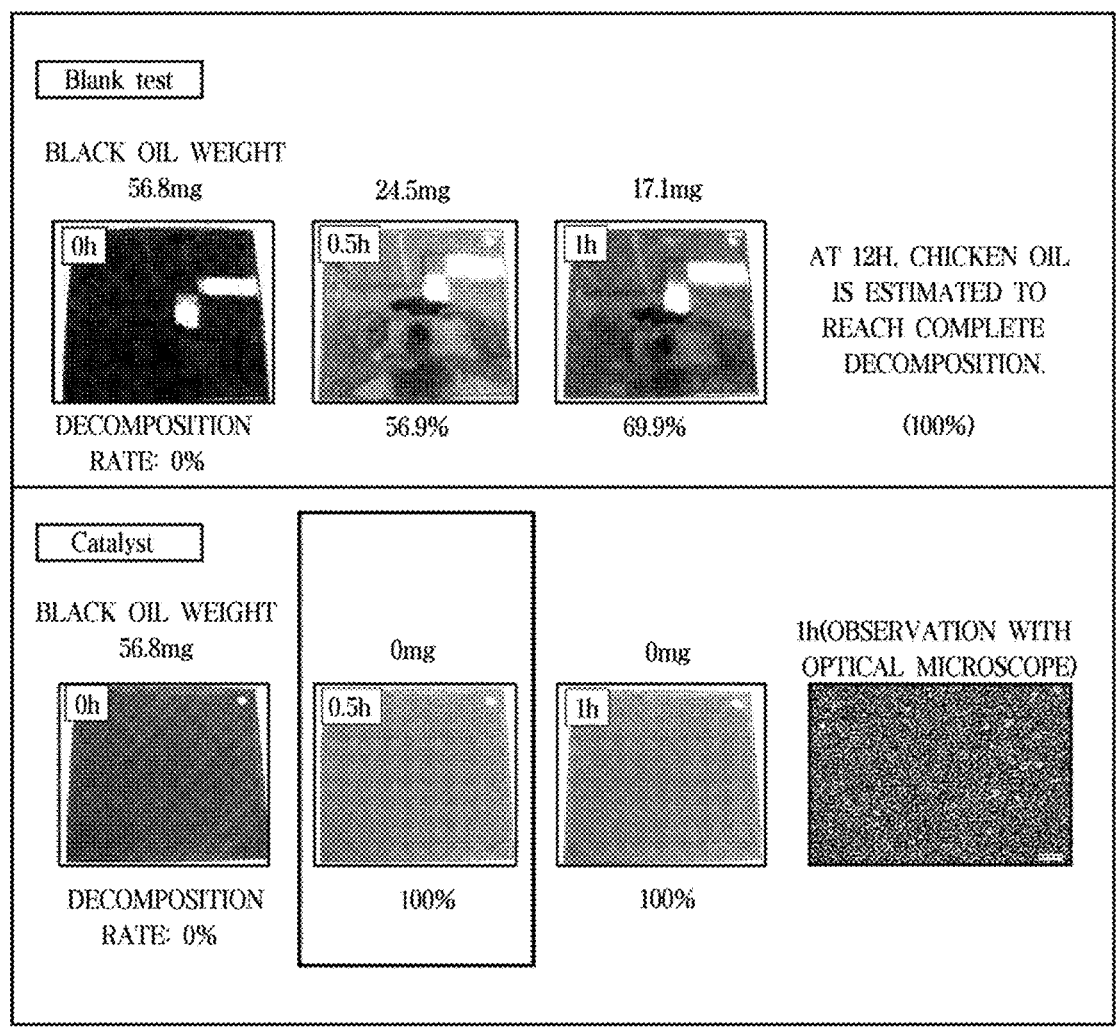
FIG. 48 is an experimental result showing a decomposition effect of a contaminant by a catalyst coating layer at 380° C.

FIG. 48 shows an experimental result under a condition that a set temperature is 380° C. A decomposition rate was determined by a decrease rate in weight measurement. Under the condition of 380° C., it is possible for contaminants on the surface of the catalyst to be completely decomposed for 0.5 hour (30 minutes). Observation with an optical microscope revealed no oil stain stuck to black.

Figure 49:
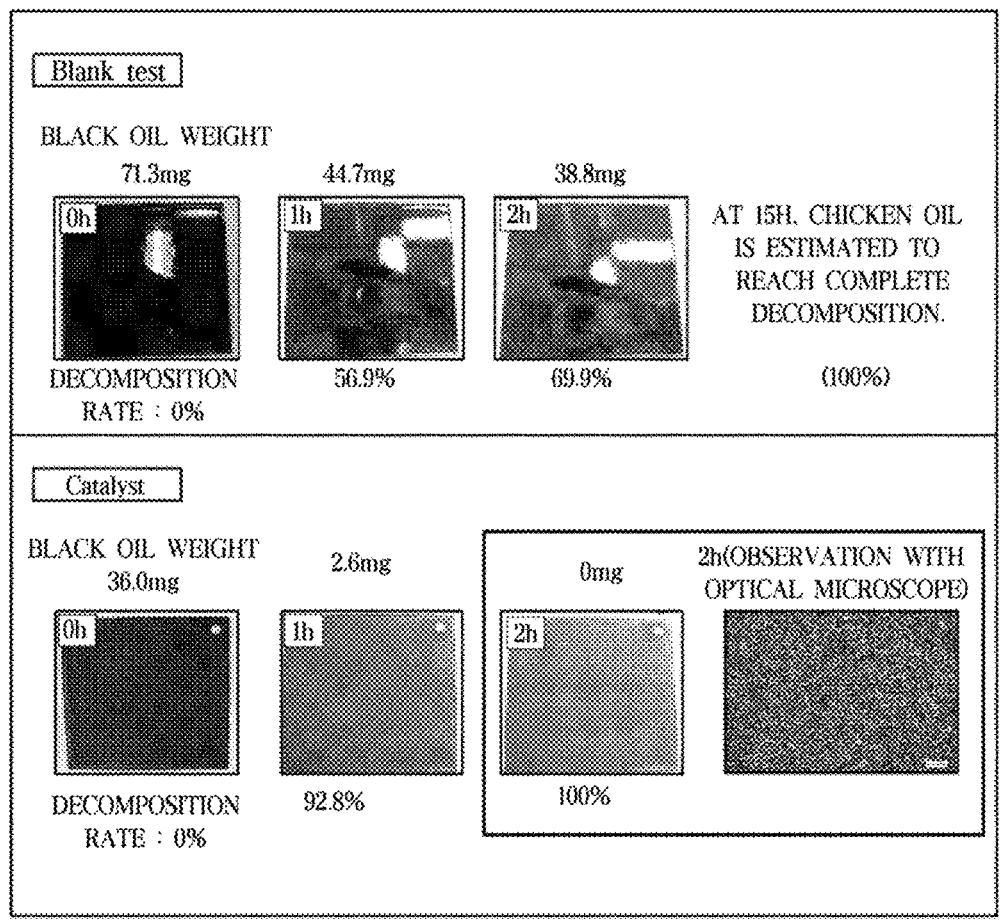
FIG. 49 is an experimental result showing a decomposition effect of a contaminant by a catalyst coating layer at 350° C.

FIG. 49 shows an experimental result under a condition that a set temperature is 350° C. As a decomposition rate is lowered, it takes 2 hours for complete decomposition. Therefore, in the cleaning mode, it can be seen that when a cleaning, under a condition that a set temperature in the cooking chamber 1 is 380° C. and an operation time is within 2 hours, is performed, the cleaning can be performed at a cleaning time equivalent to the conventional cleaning mode.

Figure 50:
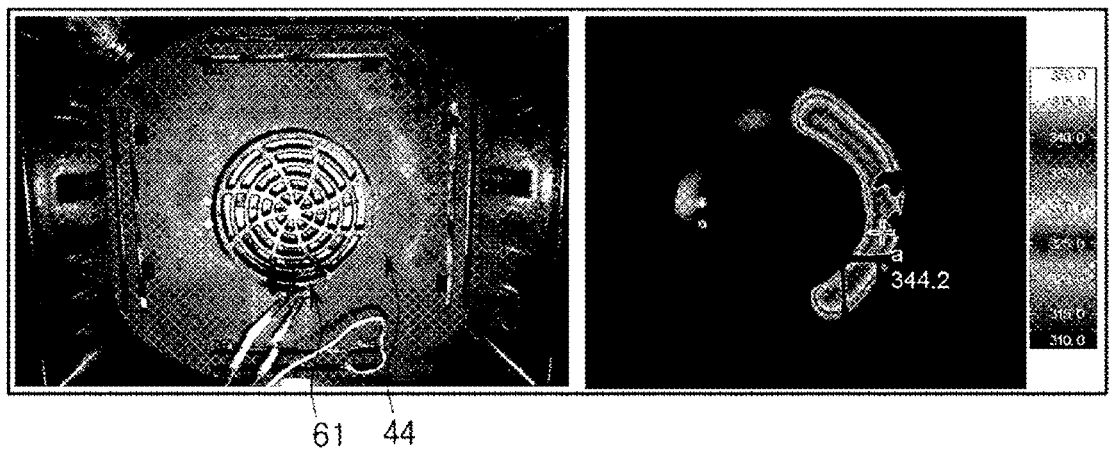
FIG. 50 is a view showing a sixth modification of the fourth embodiment of the present disclosure.

Next, a sixth modification of the fourth embodiment of the present disclosure will be described. In the sixth modification, not only the entire inside of the cooking chamber 1 is heated, but only a portion where the catalyst coating layer is formed is locally heated during cooking to decompose contaminants. That is, a cleanliness of the cooking chamber inner wall 4 can be maintained for a long period of time without executing the cleaning mode which consumes a large amount of electric power and takes a long time. In FIG. 50, as an experiment, only a part is carried out at 380° C. by a nichrome wire. As shown in the left drawing of FIG. 50, it can be seen that a cleanliness is maintained in the heated part because the contaminants are decomposed in the heated part. Therefore, in the sixth modification, a catalyst coating layer heating heater may be brought close to a portion where the catalyst coating layer is formed, so that a decomposition reaction occurs even in the heating cooking. The catalyst coating layer and the catalyst coating layer heating heater may be designed so that a distance therebetween is, for example, 1 mm or less. As described above, the oven 100 may further include the catalyst coating layer heating heater installed in the cooking chamber 1 to heat the catalyst coating layer.

Figure 51:
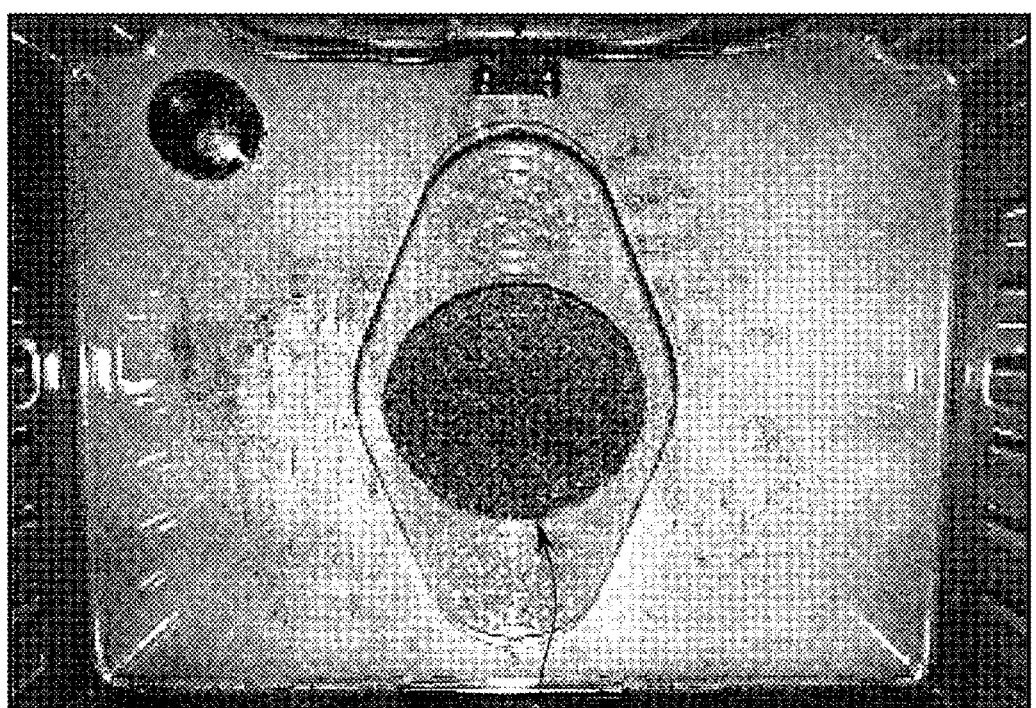
FIG. 51 is a view showing a seventh modification of the fourth embodiment of the present disclosure.

Next, a seventh modification of the fourth embodiment of the present disclosure will be described. In the seventh modification, in the inside of the cooking chamber 1, a member having a large specific surface area and no liquid repellency is disposed in an air flow path formed by the fan 61. For example, as shown in FIG. 51, a filter may be disposed at the inlet of the fan 61 so as to exhibit a function as the contaminant collection portion 44. By forming the catalyst coating layer on the filter described above, it is possible to decompose the contaminants deposited in the contaminant collecting portion 44, thereby preventing a small oil stain from being deposited on the coating film 43 over a long period of time. That is, the contaminant collecting portion 44 may include the filter disposed at least one of the inlet and the outlet of the fan 61. Preferably, the filter may be disposed at the inlet of the fan 61.

Further, the filter may be formed of a porous material, and the catalyst coating layer may be appropriately selected. Particularly, the filter may be formed of at least one of a porous material and a fibrous material.

In addition, combinations and modifications of various embodiments may be carried out without departing from the spirit of the present disclosure.

While the present disclosure has been particularly described with reference to exemplary embodiments, it should be understood by those of skilled in the art that various changes in form and details may be made without departing from the spirit and scope of the present disclosure.

The invention claimed is:

1. An oven comprising:
   a main body;
   a cooking chamber provided inside the main body; and
   a coating film formed on at least a part of a cooking chamber inner wall, and having a liquid repellency and a heat resistance,
   wherein the coating film comprises:
   a base comprising silsesquioxane; and
   a coating material comprising at least one of a silicon-based liquid repellent agent and an alkyl-based liquid repellent agent.

2. The oven according to claim 1, wherein the coating film has a water contact angle of 100° or more, and a thickness of 0.2 μm or more and 3 μm or less.

3. The oven according to claim 1, wherein the coating film has an oil contact angle of 40° or more, and a thickness of 0.2 μm or more and 3 μm or less.

4. The oven according to claim 1, further comprising:
   a contaminant collecting portion having a liquid repellency smaller than that of the coating film.

5. The oven according to claim 4, further comprising:
   a door rotatably installed at the main body to open or close the cooking chamber,
   wherein the contaminant collecting portion is provided on an inner surface of the door toward the cooking chamber.

6. An oven comprising:
   a main body;
   a cooking chamber provided inside the main body;
   a main heater disposed inside the cooking chamber;

a fan disposed inside the cooking chamber to circulate air heated by the main heater;

a coating film formed on at least a part of a cooking chamber inner wall and having a liquid repellency; and a contaminant collecting portion having a liquid repellency smaller than that of the coating film and provided on the cooking chamber inner wall with which air circulated by the fan collides wherein the contaminant collecting portion comprises a plurality of vanes installed along an outer circumferential direction of the fan to gradually deflect an air flow discharged from the fan in a tangential direction of the fan from a centrifugal direction of the fan.

7. The oven according to claim 6, wherein a surface energy of the coating film is 20 mJ/m$^2$ or less, and a surface energy of the contaminant collecting portion is 25 mJ/m$^2$ or more.

8. The oven according to claim 6, wherein the contaminant collecting portion comprises:
a body detachably installed on the cooking chamber inner wall; and
a waste liquid receiver provided to collect a contaminant separated from the body by contaminant's own weight.

9. The oven according to claim 6, wherein a plurality of protrusions are formed between the plurality of vanes.

10. The oven according to claim 6, wherein the contaminant collecting portion comprises a filter disposed at least one of an inlet and an outlet of the fan, and
the filter is formed of at least one of a porous material and a fibrous material.

11. The oven according to claim 6, wherein the contaminant collecting portion is detachably provided on the cooking chamber inner wall.

12. The oven according to claim 11, wherein the contaminant collecting portion is detachable by a magnetic force.

13. The oven according to claim 6, wherein: the contaminant collecting portion comprises a catalyst coating layer, and
the catalyst coating layer comprises:
a catalyst comprising at least one of Ag, Pt, Pd, Au, Cu, Ru, Ti and Ni; and
a cocatalyst comprising at least one of $MnO_2$, $CeO_2$, $Al_2O_3$, $Bi_2O_3$, SnO, $TiO_2$, $Cr_2O_3$, $Co_2O_3$, $Fe_2O_3$, CuO, $ZrO_2$, SrO, LaO, $V_2O_5$, $Li_2O$, ZnO, MgO, NiO, CuO and BaO.

14. The oven according to claim 13, further comprising:
a catalyst coating layer heater installed in the cooking chamber to heat the catalyst coating layer,
wherein a distance between the catalyst coating layer and the catalyst coating layer heater is 1 mm or less.

15. The oven according to claim 6, wherein the coating film comprises:
a base comprising silsesquioxane; and
a coating material comprising at least one of a silicon-based liquid repellent agent and an alkyl-based liquid repellent agent.

16. The oven according to claim 15, wherein the coating film has a water contact angle of 100° or more, and a thickness of 0.2 μm or more and 3 μm or less.

17. The oven according to claim 15, wherein the coating film has an oil contact angle of 40° or more, and a thickness of 0.2 μm or more and 3 μm or less.

18. The oven according to claim 15, wherein the coating film comprises at least one layer.

19. The oven according to claim 18, wherein the at least one layer comprises:
a first layer applied to at least a part of the cooking chamber inner wall; and
a second layer applied on the first layer before the first layer is cured.

* * * * *